(12) United States Patent
Aragaki et al.

(10) Patent No.: US 8,768,054 B2
(45) Date of Patent: *Jul. 1, 2014

(54) IMAGE PROCESSING DEVICE, IMAGE PROCESSING METHOD, AND COMPUTER-READABLE STORAGE MEDIUM STORING IMAGE PROCESSING PROGRAM

(75) Inventors: Hideya Aragaki, Hino (JP); Takahiro Saito, Yokohama (JP); Yuki Ishii, Chigasaki (JP)

(73) Assignees: Olympus Corporation, Tokyo (JP); Kanagawa University, Yokohama-shi, Kanagawa (JP)

( * ) Notice: Subject to any disclaimer, the term of this patent is extended or adjusted under 35 U.S.C. 154(b) by 732 days.

This patent is subject to a terminal disclaimer.

(21) Appl. No.: 12/644,533

(22) Filed: Dec. 22, 2009

(65) Prior Publication Data

US 2010/0111414 A1    May 6, 2010

Related U.S. Application Data

(63) Continuation of application No. PCT/JP2008/061804, filed on Jun. 24, 2008.

(30) Foreign Application Priority Data

Jun. 25, 2007    (JP) .................................. 2007-166369

(51) Int. Cl.
 *G06K 9/00* (2006.01)
 *G06K 9/40* (2006.01)

(52) U.S. Cl.
 USPC ............ 382/167; 382/164; 382/168; 382/266

(58) Field of Classification Search
 None
 See application file for complete search history.

(56) References Cited

U.S. PATENT DOCUMENTS 6,804,408 B1 * 10/2004 Gallagher et al. ............ 382/274
7,595,825 B2    9/2009 Tsuruoka (Continued)

FOREIGN PATENT DOCUMENTS

| JP | 10-210323 A | 8/1998 |
|---|---|---|
| JP | 2001-216512 A | 8/2001 |

(Continued)

OTHER PUBLICATIONS

Jean-Francois Aujol, Guy Gilboa, Tony Chan & Stanley Osher, "Structure-Texture Image Decomposition-Modeling, Algorithms, and Parameter Selection," International Journal of Computer Vision, vol. 67, Issue 1 (Apr. 2006) pp. 111-136, Year of Publication: 2006 (UCLA, Department of Mathematics, Los Angeles, California, pp. 1-23).

Primary Examiner — Amir Alavi
Assistant Examiner — Kenny Cese
(74) Attorney, Agent, or Firm — Holtz Holtz Goodman & Chick PC

(57) ABSTRACT

An image processing device separates an original image signal into a plurality of components including a first component serving as a skeleton component and a second component obtained after the first component is separated from the original image signal, obtains a signal level of the first component or the original image signal, sets a tone conversion coefficient to be applied during tone conversion based on the signal level of the first component or the original image signal, performs tone conversion processing on the first component using the tone conversion coefficient, obtains the signal level of the first component, sets a noise reduction processing parameter on the basis of the signal level of the first component, and reduces a noise of the second component using the noise reduction processing parameter and the tone conversion coefficient.

31 Claims, 39 Drawing Sheets

(56) References Cited

U.S. PATENT DOCUMENTS

| | | | |
|---|---|---|---|
| 8,189,940 B2* | 5/2012 | Saito et al. | 382/254 |
| 2004/0057632 A1* | 3/2004 | Gindele | 382/274 |
| 2005/0123214 A1* | 6/2005 | Takahira | 382/266 |
| 2006/0050783 A1* | 3/2006 | Le Dinh et al. | 375/240.2 |
| 2006/0066736 A1* | 3/2006 | Tsuruoka | 348/241 |
| 2006/0152630 A1* | 7/2006 | Miyazawa | 348/606 |
| 2007/0165282 A1* | 7/2007 | Sambongi et al. | 358/3.21 |

FOREIGN PATENT DOCUMENTS

| | | |
|---|---|---|
| JP | 2003-348379 A | 12/2003 |
| JP | 2004-266757 A | 9/2004 |
| JP | 2005-175718 A | 6/2005 |
| JP | 2005-318063 A | 11/2005 |
| JP | 2006-148248 A | 6/2006 |
| JP | 2007-088913 A | 4/2007 |

* cited by examiner

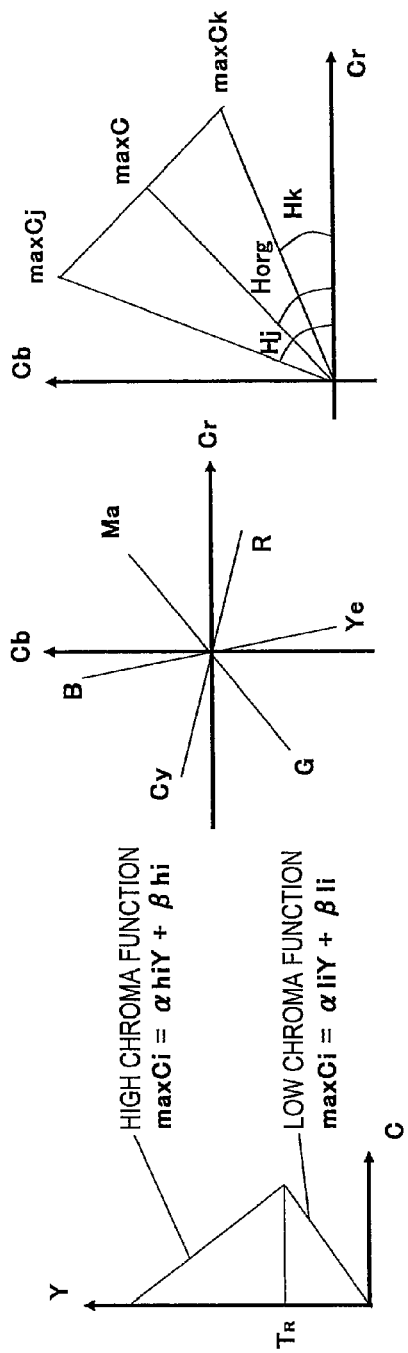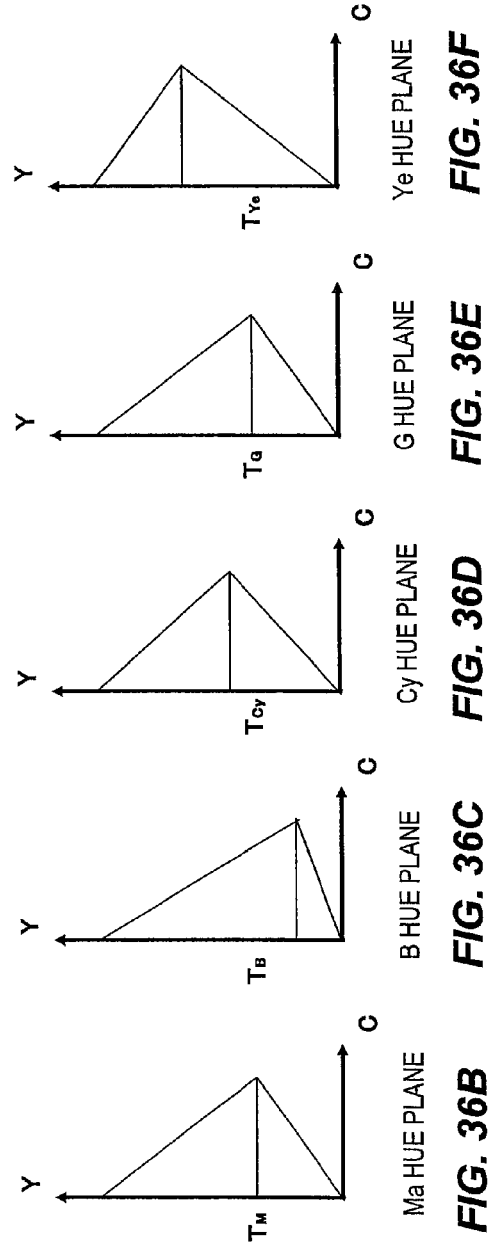

IMAGE PROCESSING DEVICE, IMAGE PROCESSING METHOD, AND COMPUTER-READABLE STORAGE MEDIUM STORING IMAGE PROCESSING PROGRAM

CROSS REFERENCE TO RELATED APPLICATIONS

This application is a continuation of International Patent Application No. PCT/JP2008/061804, filed on Jun. 24, 2008, which claims the benefit of Japanese Patent Application No. JP2007-166369, which were filed on Jun. 25, 2007, which are incorporated by reference as if fully set forth.

TECHNICAL FIELD OF THE INVENTION

This invention relates to image processing for subjecting an image signal to tone conversion, and more particularly to a technique for suppressing amplification of signal level-dependent noise through tone conversion.

BACKGROUND OF THE INVENTION

In current digital still cameras, video cameras, and so on, a bit-width (approximately 10 to 12 bits) of a signal in an input system and a processing system is set to be wider than a bit-width (normally 8 bits) of a final output signal to prevent image quality deterioration due to cancellation of significant digits during digital signal processing. In this case, tone conversion must be performed to match the bit-width of an output system.

Conventionally, tone conversion processing is performed on the basis of a fixed tone characteristic in relation to a standard scene or a tone characteristic corresponding to a main object in an image signal. Further, a method of determining a tone characteristic for each region of the image signal and performing conversion adaptively has been proposed.

With all of these methods, noise component amplification often occurs as a side effect of the tone conversion processing. Hence, JP2005-318063A proposes a method of suppressing noise amplification by setting limits on individual tone characteristics of each region when tone conversion processing is performed adaptively on each region of an image signal. Further, JP10-210323A proposes a method of improving contrast without making a noise component conspicuous by separating an image signal into a noise component and a signal component and performing tone conversion on the signal component.

SUMMARY OF THE INVENTION

According to an aspect of the present invention, an image processing device includes a component separation unit which separates an original image signal into a plurality of components including a first component serving as a skeleton component and a second component obtained after the first component is separated from the original image signal, a tone conversion signal level acquisition unit which obtains a signal level of the first component or the original image signal, a tone conversion coefficient setting unit which sets a tone conversion coefficient to be applied during tone conversion based on the signal level of the first component or the original image signal, a tone conversion unit which performs tone conversion processing on the first component using the tone conversion coefficient, a noise reduction signal level acquisition unit which obtains the signal level of the first component, a parameter setting unit which sets a noise reduction processing parameter on the basis of the signal level of the first component, and a noise reduction processing unit which reduces a noise of the second component using the noise reduction processing parameter and the tone conversion coefficient.

According to another aspect of the present invention, an image processing method includes separating an original image signal into a plurality of components including a first component serving as a skeleton component and a second component obtained after the first component is separated from the original image signal, obtaining a signal level of the first component or the original image signal, setting a tone conversion coefficient to be applied during tone conversion based on the signal level of the first component or the original image signal, performing tone conversion processing on the first component using the tone conversion coefficient, obtaining the signal level of the first component, setting a noise reduction processing parameter on the basis of the signal level of the first component, and reducing a noise of the second component using the noise reduction processing parameter and the tone conversion coefficient.

According to yet another aspect of the present invention, a computer-readable storage medium storing an image processing program is provided. The image processing program includes a component separation step for separating an original image signal into a plurality of components including a first component serving as a skeleton component and a second component obtained after the first component is separated from the original image signal, a tone conversion signal level acquisition step for obtaining a signal level of the first component or the original image signal, a tone conversion coefficient setting step for setting a tone conversion coefficient to be applied during tone conversion based on the signal level of the first component or the original image signal, a tone conversion step for performing tone conversion processing on the first component using the tone conversion coefficient, a noise reduction signal level acquisition step for obtaining the signal level of the first component, a parameter setting step for setting a noise reduction processing parameter on the basis of the signal level of the first component, and a noise reduction processing step for reducing a noise of the second component using the noise reduction processing parameter and the tone conversion coefficient.

Embodiments and advantages of this invention will be described in detail below with reference to the attached figures.

BRIEF DESCRIPTION OF THE DRAWINGS

FIGS. 36A to 36H are views illustrating modeling of a maximum chroma value in the YCbCr color space.

DESCRIPTION OF THE PREFERRED EMBODIMENTS

[First Embodiment]

Figure 1:
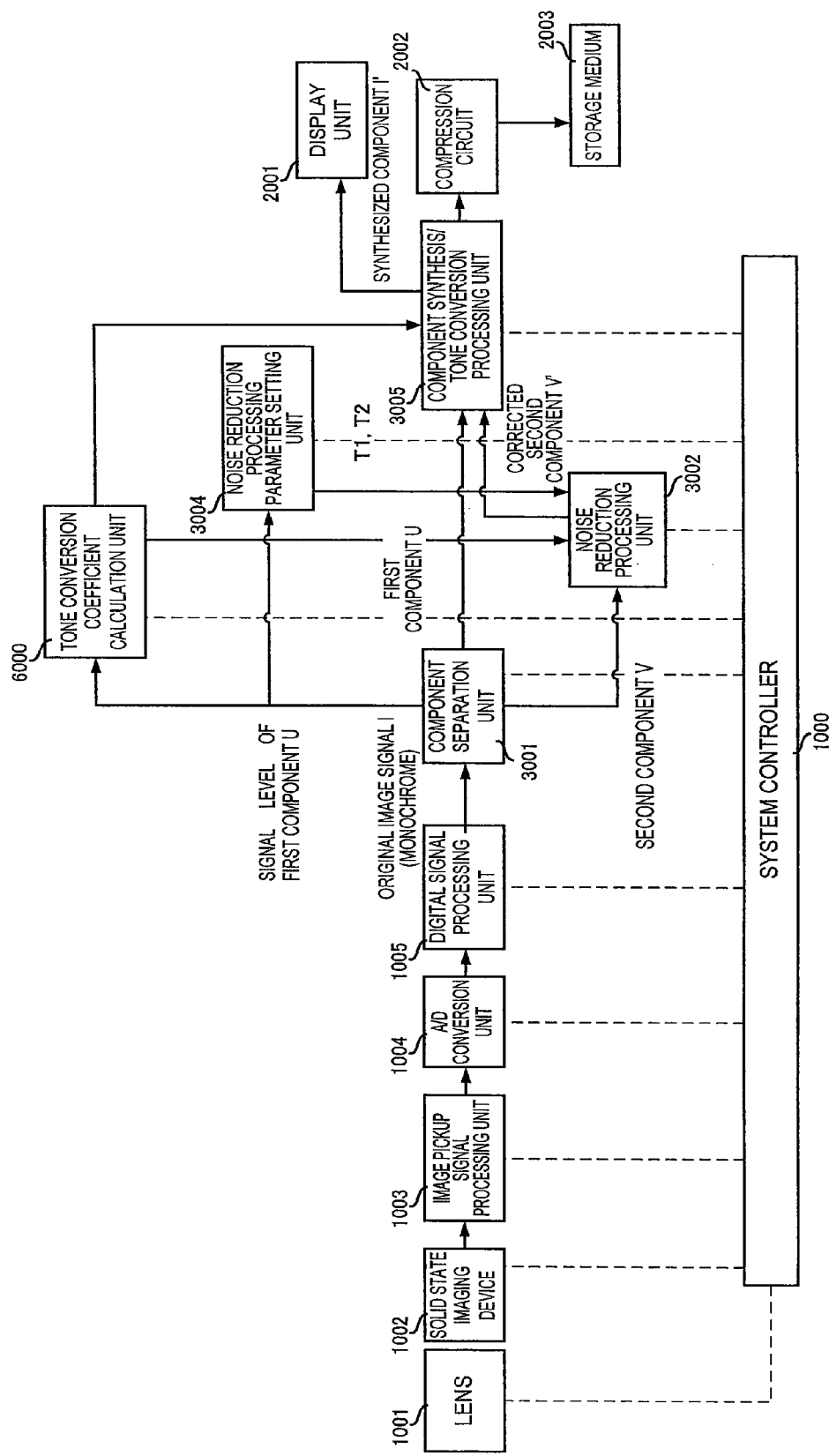
FIG. 1 is a system diagram showing an imaging apparatus according to a first embodiment.

FIG. 1 is a system diagram showing an imaging apparatus according to a first embodiment of this invention. In FIG. 1, solid lines indicate data signal lines and broken lines indicate control signal lines. Further, each processing unit is controlled by a system controller 100.

An original image is passed through a lens 1001 and converted into an electric signal by a solid state imaging device 1002 such as a CCD or a CMOS, and then subjected to CDS (Correlated Double Sampling)/differential sampling, analog gain adjustment, and so on in an image pickup signal processing unit 1003. The electric signal is then converted into a digital signal by an A/D conversion unit 1004, whereupon the digital signal is converted into an image signal (original image signal I) having a predetermined tone curve by a digital signal processing unit 1005. In the first embodiment, the solid state imaging device 1002 is a monochrome imaging device, and the original image signal I is a monochrome signal.

The original image signal I is separated into a first component U and a second component V by a component separation unit 3001. The first component U is a skeleton component (a geometrical image structure) of the original image signal I, which includes a flat component (a gently varying component) and an edge component, and is defined as "a component representing global characteristics, which is constituted by a sharp edge included in the original image signal I and a flat region compartmentalized by the edge and exhibiting gentle luminance variation" or "a component formed by removing detailed structural components (texture components hereafter) such as textures from the original image signal I". The second component V is defined as a remaining component of the original image signal I following separation of the first component U, which includes texture components and noise. Since the original image signal I is a monochrome signal, both of the components U, V separated from the original image signal I are luminance components.

Figure 2:
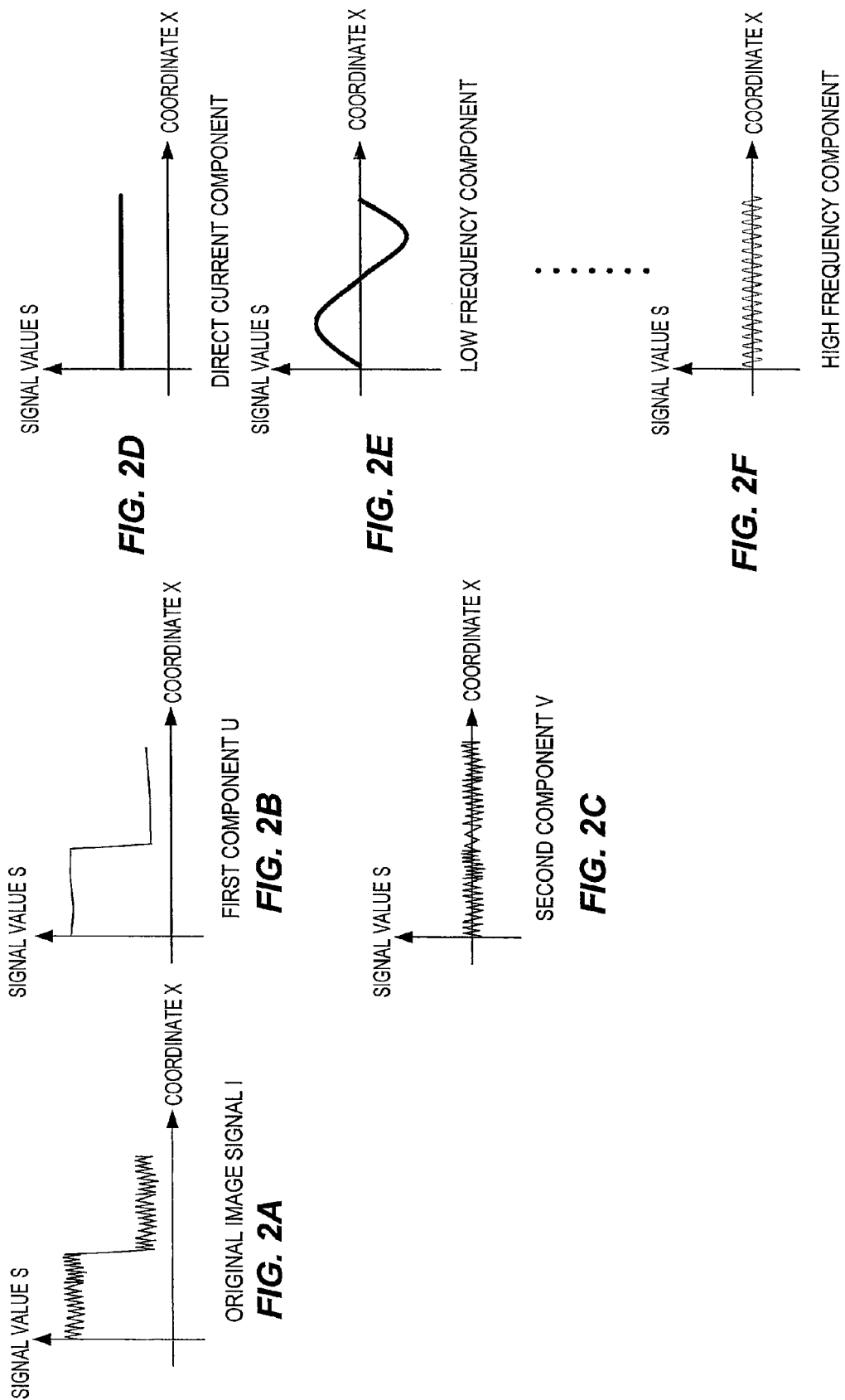
FIGS. 2A to 2C show examples of an original image signal I and a first component U and a second component V obtained by subjecting the original image signal I to component separation.
FIGS. 2D to 2F show examples of a direct current component, a low frequency component and a high frequency component generated when separation based on frequency components, such as a Fourier transform, is performed.

FIGS. 2B and 2C show examples of the first component U and the second component V generated when the original image signal I shown in FIG. 2A is subjected to component separation (here, a one-dimensional signal is shown for ease of description). A sharp edge representing global characteristics included in the original image signal I is included in the first component U, whereas a fine oscillation component is included in the second component V.

For comparison, FIGS. 2D to 2F show examples of a direct current component, a low frequency component, and a high frequency component generated when separation based on frequency components, such as a Fourier transform, is performed. The sharp edge representing the global characteristics included in the original image signal I is expressed as a linear sum of each component, and is therefore not included in one specific component alone.

It should be noted that for ease of description, a case in which the original image signal I is separated into two components is described here, but the original image signal I may be separated into three or more components. Further, component separation may be performed using an addition type separation method or a multiplication type separation method, and these methods will be described in detail below.

A tone conversion coefficient calculation unit 6000 extracts a local region of a predetermined size centering on a target pixel from the first component U and calculates a histogram in the local region on the basis of a signal level. The tone conversion coefficient calculation unit 6000 then sets a tone curve on the basis of the calculated histogram, calculates a tone conversion coefficient to be applied to each pixel during tone conversion processing based on the conversion curve, and transmits the calculated tone conversion coefficient to a component synthesis/tone conversion processing unit 3005 and a noise reduction processing unit 3002. Calculation of the tone conversion coefficient will be described in detail below.

Figure 3:
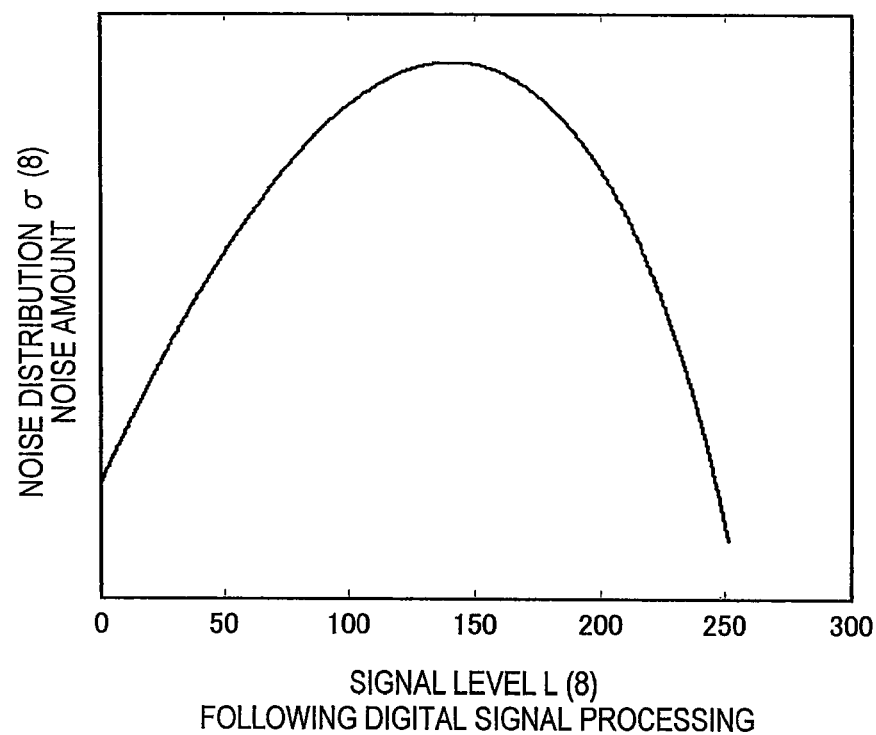
FIG. 3 is a model of signal level-noise distribution following digital signal processing.

A noise reduction processing parameter setting unit 3004 obtains a noise distribution σ (noise amount) corresponding to the signal level of the first component U by referring to a noise level-noise distribution model shown in FIG. 3 or approximation data thereof. Since the first component U is a skeleton component of the original image signal I, the noise distribution σ obtained from the signal level of the first component U is substantially equal to the noise distribution σ included in the original image signal I. The noise reduction processing parameter setting unit 3004 then sets noise reduction processing parameters T1, T2 corresponding to the noise distribution σ and transmits the set parameters T1, T2 to the noise reduction processing unit 3002.

The noise reduction processing parameters T1, T2 are respectively set at values commensurate with the noise distribution σ using Equation (1), for example.

$$T1 = k\sigma$$

$$T2 = -k\sigma$$

Here, k is a coefficient of ½, for example. The signal level-noise distribution model will be described in detail below.

The noise reduction processing unit 3002 performs soft-thresholding processing (coring processing) on the second component V using the noise reduction processing parameters T1, T2 and the tone conversion coefficient. The second component V includes noise equivalent to the noise included in the original image signal I, and therefore, through this processing, the noise included in the second component V can be reduced effectively. A value obtained by the noise reduction processing unit 3002 is then transmitted to the component synthesis/tone conversion processing unit 3005 as a corrected second component V'. The soft-thresholding processing will be described in detail below.

The component synthesis/tone conversion processing unit 3005 multiplies the first component U by the tone conversion coefficient calculated by the tone conversion coefficient calculation unit 6000 and then synthesizes the result with the corrected second component V' at a predetermined ratio, for example 1:1, to obtain a synthesized component I' having reduced noise relative to the original image signal I. The synthesized component I' is transmitted to a display unit 2001 such as an LCD and transmitted via a compression circuit 2002 to a storage medium 2003 constituted by a flash memory or the like.

Figure 4:
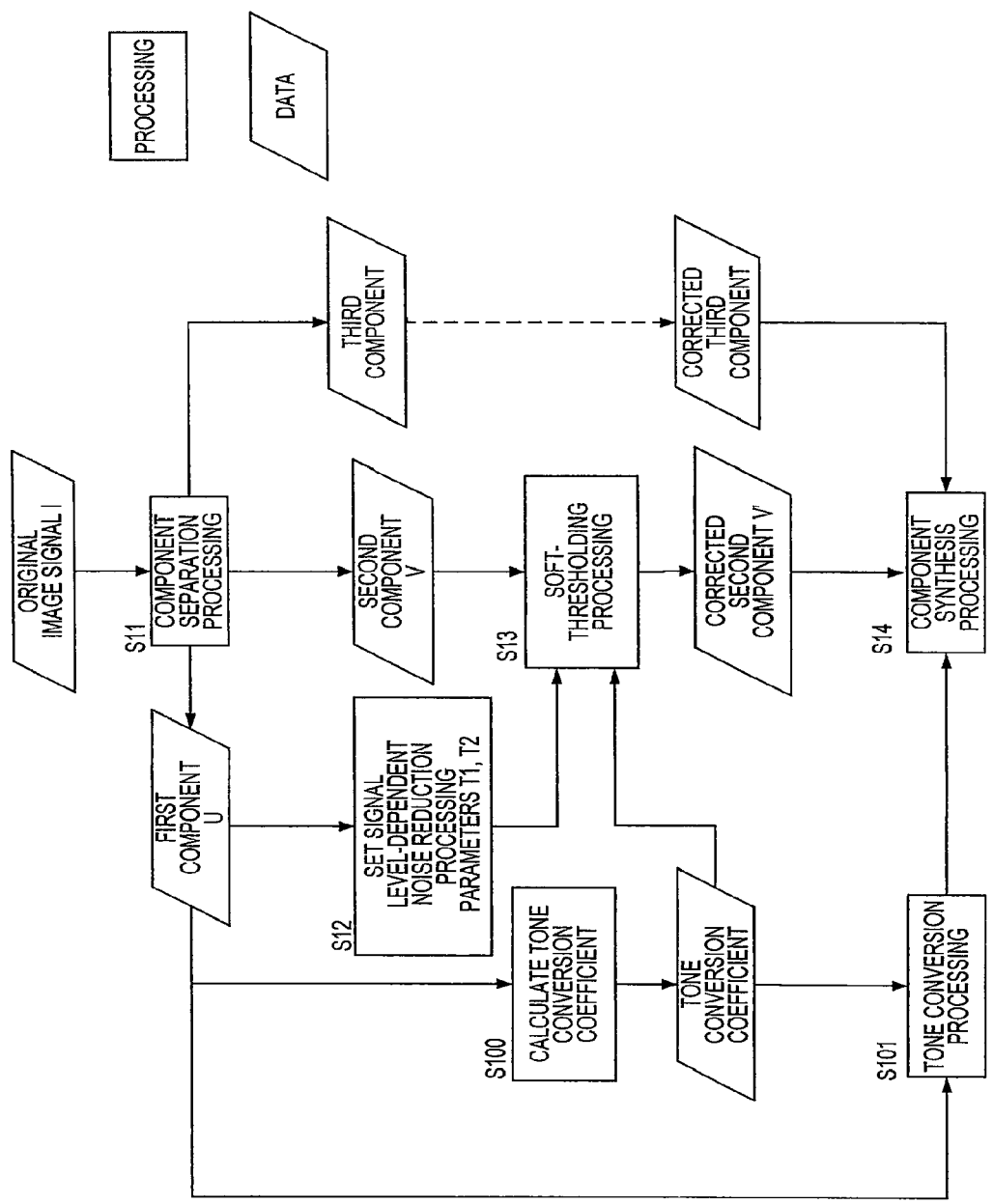
FIG. 4 is a flowchart corresponding to processing performed from a component separation unit to a component synthesis processing unit according to the first embodiment.

FIG. 4 shows a flow executed when the processing from the component separation unit 3001 to the component synthesis/tone conversion processing unit 3005 is realized by software processing. A software program is stored on a computer-readable storage medium or in a ROM of a computer, and the stored program is read to a RAM and executed by a CPU of the computer. Here, the computer-readable storage medium is a magnetic disk, a magneto-optical disk, a CD-ROM, a DVD-ROM, a semiconductor memory, or similar. Alternatively, the program may be transmitted to the computer via a communication line, whereupon the computer executes the program upon reception thereof (likewise hereafter). For reference, processing performed in a case where the original image signal I is separated into three components is indicated in FIG. 4 by broken lines, but here, a case in which the original image signal I is separated into two components will be described.

In a step S11, the original image signal I is separated into the first component U and the second component V.

In a step S12, the noise distribution σ is obtained on the basis of the signal level of the first component U by referring to the signal level-noise distribution model shown in FIG. 3 or approximation data thereof. The noise reduction processing parameters T1, T2 are then set in accordance with the noise distribution σ.

In a step S100, a local region of a predetermined size centering on a target pixel is extracted from the first component U, and a histogram is calculated in the local region on the basis of a signal level. A tone curve is then set on the basis of the calculated histogram, whereupon a tone conversion coefficient to be applied to each pixel during tone conversion processing based on the conversion curve is calculated.

In a step S13, soft-thresholding processing using the noise reduction processing parameters T1, T2 and the tone conversion coefficient is performed on the second component V, thereby reducing the noise included in the second component V such that the corrected second component V' is obtained.

In a step S101, tone conversion processing is performed by multiplying the first component U by the tone conversion coefficient, and in a step S14, the tone conversion-processed first component U is synthesized with the corrected second component V' to obtain the tone-converted synthesized component I' having reduced noise relative to the original image signal I.

Next, component separation of the original image signal I, performed by the component separation unit 3001, will be described in detail. When the first component U is extracted from the original image signal I, processing for maintaining a skeleton component of the original image signal I, which includes a flat component (a gently varying component) and an edge component, is used. As noted above, component separation may be performed using an addition type separation method or a multiplication type separation method.

These methods will now be described in sequence.

Addition Type Separation

In addition type separation, the original image signal I is expressed as the sum of the first component U and the second component V, as shown in Equation (2).

$$I = U + V \tag{2}$$

First, a separation method using a bounded variation function and a norm will be described.

An A2BC variation model (Aujol-Aubert-Blanc-Feraud-Chambolle model) described in the document (Jean-Francois Aujol, Guy Gilboa, Tony Chan & Stanley Osher, Structure-Texture Image Decomposition-Modeling, Algorithms, and Parameter Selection, International Journal of Computer Vision, Volume 67, Issue 1 (Apr. 2006) Pages: 111-136, Year of Publication: 2006) is used to perform separation. A property of the first component U determined as an optimal solution is modeled as a BV (Bounded Variation Function Space) constituted by a plurality of "gentle luminance variation small part regions" compartmentalized by discrete boundaries, and the energy of the first component U is defined by a TV (Total Variation) norm J(U) shown in Equation (3).

$$J(U) = \int \|\nabla U\| dx\, dy \tag{3}$$

Meanwhile, a function space of the second component V in Equation (2) is modeled as an oscillation function space G. The oscillation function space G is a function space expressed by oscillation generating functions g1, g2, as shown in Equation (4). The energy thereof is defined as G norm//V//G in Equation (5).

$$V_{(x,y)} = \partial g_{1_{(x,y)}} + \partial_x g_{2_{(x,y)}}; g_1, g_2 \in L_\infty(R^2) \tag{4}$$

$$\|V\|_G = \inf_{g1,g2} \{\|(g_1)^2 + (g_2)^2\|_{L_\infty}; V = \partial_x g_1 + \partial_x g_2\} \tag{5}$$

A separation problem of the original image signal I is formulated as a variation problem of Equation (6) for minimizing an energy functional. This variation problem can be solved using Chambolle's projection method.

$$\inf_{U,V \in G_\mu} \left\{ J(U) + \frac{1}{2\alpha} \|I - U - V\|_{L2}^2 \right\} \tag{6}$$

$$\alpha > 0, \mu > 0, G_\mu = \{V \in G \mid \|V\|_G \le \mu\}$$

As a result, the second component V separated from the original image signal I receives a noise effect, whereas the first component U receives substantially no noise effect, and therefore the skeleton component (geometrical image structure) is extracted without blunting the edges.

Other examples of addition type separation methods include reduction separation using a linear filter and adaptive smoothing using a median filter, a morphology filter, and so on. Examples of addition type separation methods that do not depend on a bounded variation function are listed below.

EXAMPLE 1

In this method, a lower order component of an orthogonal basis expansion performed on the original image signal I is set as the first component U, and the remainder of the original image signal I following extraction of the first component U is set as the second component V.

EXAMPLE 2

In this method, a result obtained by performing median filter processing on the original image signal I is set as the first component U, and the remainder of the original image signal I following extraction of the first component U is set as the second component V.

EXAMPLE 3

In this method, a result obtained by applying a multi-value morphology filter on the original image signal I is set as the first component U, and the remainder of the original image signal I following extraction of the first component U is set as the second component V.

EXAMPLE 4

In this method, a result obtained by implementing reduction processing and expansion processing on the original image signal I is set as the first component U, and the remainder of the original image signal I following extraction of the first component U is set as the second component V.

EXAMPLE 5

In this method, a result obtained by applying a bilateral filter on the original image signal I is set as the first component U, and the remainder of the original image signal I following extraction of the first component U is set as the second component V.

Multiplication Type Separation

Next, a multiplication type separation method will be described. In multiplication type separation, the original image signal I is expressed by the product of the first component U and the second component V. When a logarithmic original image signal obtained by subjecting the original image signal I to logarithmic conversion is set as f, the original image signal I can be converted into an addition type separation problem, as shown in Equation (7).

$$I = U * V$$

$$f = u + v;$$

$$f = \log I, u = \log U, v = \log V \tag{7}$$

Here, a separation method employing a bounded variation function and a norm, similarly to the above method, will be described. A multiplication type separation problem can be solved using an A2BC variation model in a logarithmic region, similarly to addition type separation. An A2BC variation model in a logarithmic region will now be described briefly in relation to multiplication type separation.

A function space of a logarithmic first component u in Equation (7) is modeled as a BV (Bounded Variation Function Space) constituted by a plurality of "gentle luminance variation small part regions" compartmentalized by discrete boundaries, similarly to the first component U in the addition type separation model described above, and the energy of the logarithmic first component u is defined by a TV (Total Variation) norm J(u) shown in Equation (8).

$$J(u) = \int \|\nabla u\| dx\, dy \tag{8}$$

Meanwhile, a function space of a logarithmic second component v in Equation (7) is modeled as an oscillation function space G. The oscillation function space G is a function space expressed by oscillation generating functions g1, g2, as shown in Equation (9), and the energy thereof is defined as G norm//v//G in Equation (10).

$$v_{(x,y)} = \partial_x g_{1(x,y)} + \partial_x g_{2(x,y)}; g_1, g_2 \in L_\infty(R^2) \quad (9)$$

$$\|v\|_G = \inf_{g1,g2} \{\|(g_1)^2 + (g_2)^2\|_{L_\infty}; v = \partial_x g_1 + \partial_x g_2\} \quad (10)$$

Hence, the separation problem of the logarithmic original image signal f is formulated as a variation problem of Equation (11) for minimizing an energy-functional.

$$\inf_{u,v \in G_\mu} \left\{ J(u) + \frac{1}{2\alpha} \|f - u - v\|_{L2}^2 \right\} \quad (11)$$

$$\alpha > 0, \mu > 0, G_\mu = \{v \in G \mid \|v\|_G \leq \mu\}$$

As a result, the second component V separated from the original image signal I receives a noise effect, whereas the first component U receives substantially no noise effect, and therefore the skeleton component (geometrical image structure) is extracted without blunting the edges.

Next, the signal level-noise distribution model referenced by the noise reduction processing parameter setting unit 3004 will be described.

When the noise included in the original image signal I is assumed to be Gauss noise, the noise distribution σ (noise amount) increases on a quadratic curve relative to a post-A/D conversion signal level $L_0$. As disclosed in JP2005-17518A, when the signal level-noise distribution model is represented by a quadratic function, Equation (12) is obtained.

$$\sigma = \alpha L_0^2 + \beta L_0 + \gamma \quad (12)$$

Figure 5:
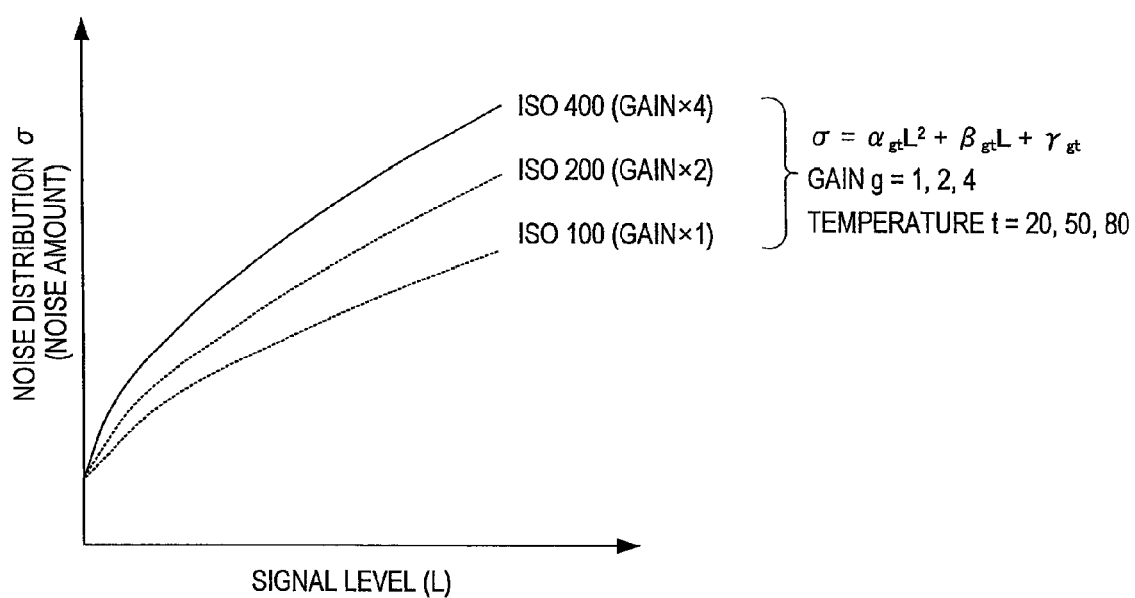
FIG. 5 is a characteristic diagram showing a relationship between the signal level and the noise distribution immediately after A/D conversion.

Here, α, β, γ are constant terms. However, the noise distribution σ varies according not only to the signal level, but also to the temperature of the device and the gain. FIG. 5 shows an example thereof, in which the noise distribution σ relative to three ISO sensitivity values (gains) 100, 200, 400 relating to the gain at a certain temperature t is plotted. The individual curves take forms indicated by Equation (12), but coefficients thereof differ according to the gain-related ISO sensitivity. When the temperature is set at t, the gain is set at gi, and the signal level-noise distribution model is formulated taking the above into account, $$\sigma = \alpha_{gt} L_0^2 + \beta_{gt} L_0 + \gamma_{gt} \quad (13)$$

is obtained. Here, $\alpha_{gt}, \beta_{gt}, \gamma_{gt}$ are constant terms determined in accordance with the temperature t and the gain gi. In the case of a full color image, this noise model can be applied to each color independently.

However, in the first embodiment, component separation and noise reduction processing are performed subsequent to the processing of the digital signal processing unit 1005, and therefore the model described above cannot be used as is. Hence, in addition to the characteristics of the signal level-noise distribution model described above, the characteristics of the digital signal processing unit 1005 are taken into account so that a signal level-noise distribution model relating to the signal level following digital signal processing is obtained.

Figure 6:
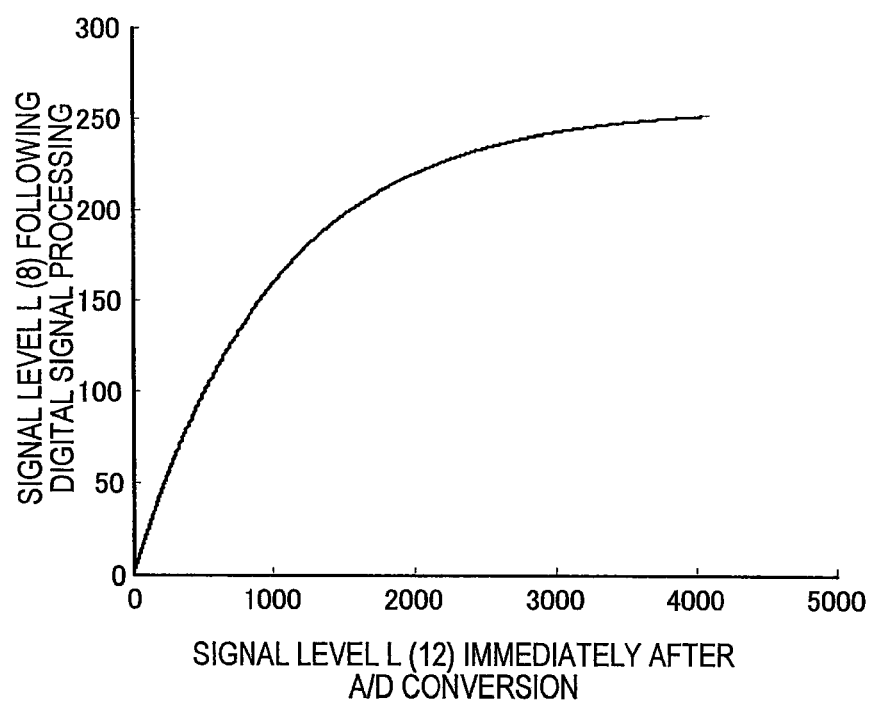
FIG. 6 is a characteristic diagram showing an input/output characteristic of a digital signal processing unit.

For example, in the case of knee processing or γ conversion, in which the digital signal processing unit 1005 tone-converts a 12 bit input signal into an 8 bit output signal, the digital signal processing unit 1005 has an input/output signal characteristic such as that shown in FIG. 6. In the figure, L(12) denotes the signal level immediately after A/D conversion, and L(8) denotes the signal level following digital signal processing.

Hence, when the signal level-noise distribution characteristic immediately after A/D conversion, shown in Equation (12) or Equation (13), and the characteristic of the digital signal processing unit 1005, shown in FIG. 6, are taken into account, the relationship between a post-digital signal processing signal level Y(8) and the noise distribution σ takes the form of a unimodal curve shown in FIG. 3 (the signal level-noise distribution model).

The noise reduction processing parameter setting unit 3004 obtains the noise distribution σ by referring to the signal level-noise distribution model shown in FIG. 3, and sets the noise reduction processing parameters T1, T2 in accordance therewith. For ease, data obtained by approximating FIG. 3 using a polygonal line may be referenced instead of FIG. 3.

Next, the tone conversion coefficient calculation processing will be described.

Figure 7:
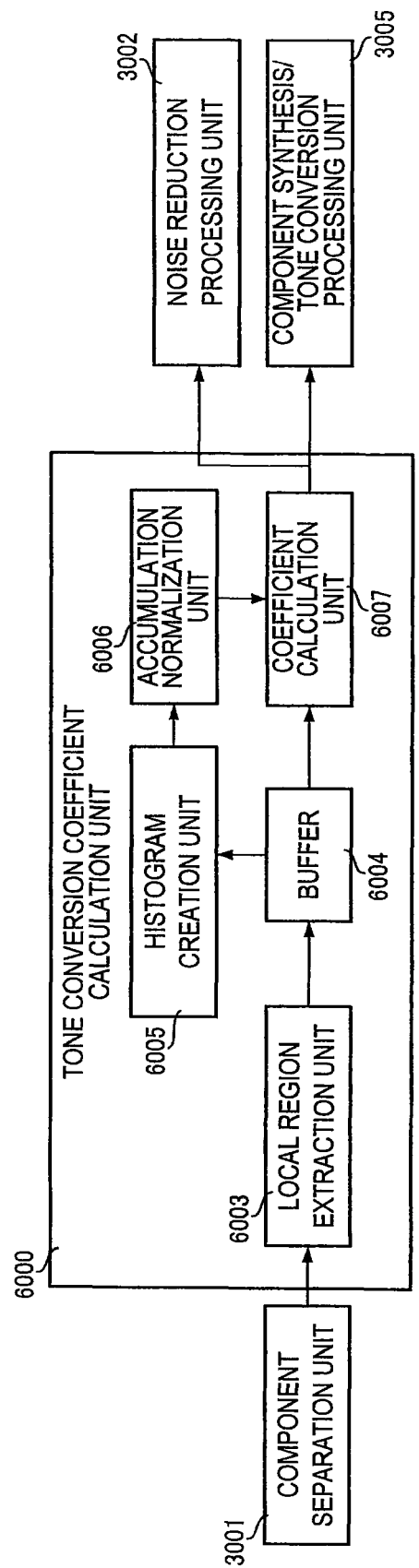
FIG. 7 is a constitutional diagram of a tone conversion coefficient calculation unit.

FIG. 7 shows an example of the constitution of the tone conversion coefficient calculation unit 6000, in which the tone conversion coefficient calculation unit 6000 is constituted by a local region extraction unit 6003, a buffer 6004, a histogram creation unit 6005, an accumulation normalization unit 6006, and a coefficient calculation unit 6007. The component separation unit 3001 is connected to the local region extraction unit 6003, and the local region extraction unit 6003 is connected to the buffer 6004. The buffer 6004 is connected to the histogram creation unit 6005 and the coefficient calculation unit 6007, and the histogram creation unit 6005 is connected to the accumulation normalization unit 6006. The accumulation normalization unit 6006 is connected to the coefficient calculation unit 6007. The coefficient calculation unit 6007 is connected to the component synthesis/tone conversion processing unit 3005 and the noise reduction processing unit 3002.

The local region extraction unit 6003 extracts a rectangular region of a predetermined size centering on a target pixel, in this example a local region of 16×16 pixel units, for example, from the first component U separated by the component separation unit 3001. A signal of the local region extracted by the local region extraction unit 6003 is stored in the buffer 6004.

On the basis of the signal in the buffer 6004, the histogram creation unit 6005 creates a histogram for each local region and transfers the created histograms to the accumulation normalization unit 6006. The accumulation normalization unit 6006 creates an accumulated histogram by accumulating the histograms, and generates a tone curve by normalizing the accumulated histograms in accordance with a bit-width. In this embodiment, the bit-width of the image signal output by the digital signal processing unit 1005 is assumed to be 8 bits, and therefore the tone curve has an 8 bit input and an 8 bit output. The tone curve is transferred to the coefficient calculation unit 6007.

The coefficient calculation unit 6007 calculates a tone conversion coefficient relating to the signal level of the region on the basis of the tone curve from the accumulation normalization unit 6006.

When the tone curve is set as to, the input signal level is set as $AV_c$, and the tone conversion coefficient is set as g, g is obtained from Equation (14).

$$g = t(AV_C)/AV_c \quad (14)$$

The tone conversion coefficient g is transferred to the component synthesis/tone conversion processing unit 3005 and the noise reduction processing unit 3002 for use in the subsequent tone conversion processing and noise reduction processing.

Figure 8:
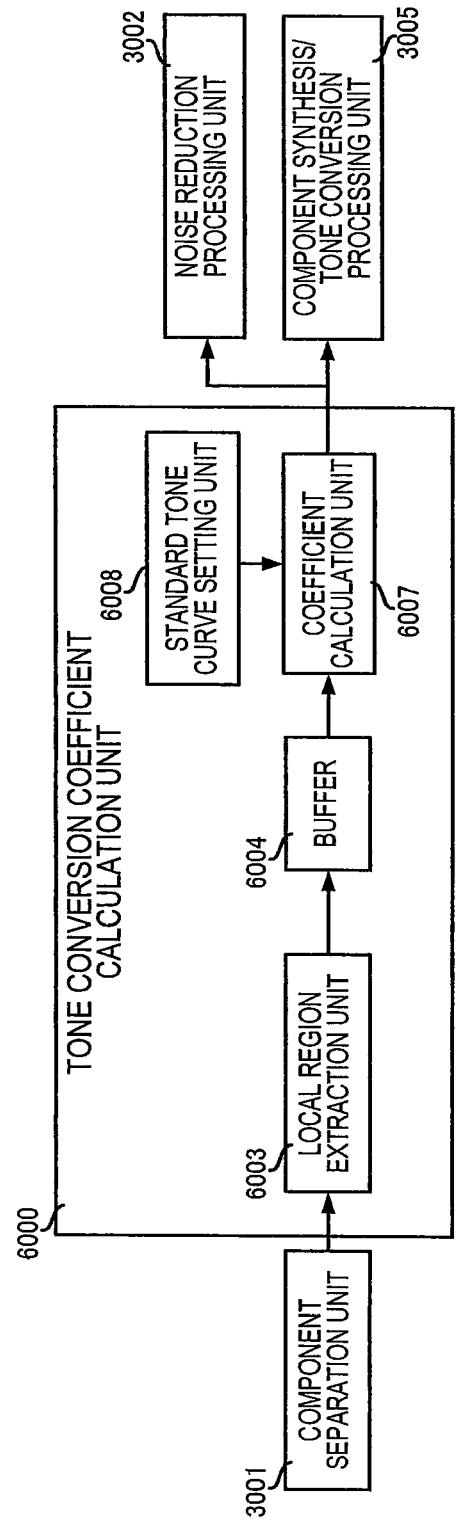
FIG. 8 is a constitutional diagram showing a first other constitution of the tone conversion coefficient calculation unit.

In the above example, a tone curve based on a histogram is calculated for each local region, but the invention need not be limited to this constitution. As shown in FIG. 8, for example, a constitution (first other constitution) in which a standard tone curve is used fixedly may be employed.

FIG. 8 shows a constitution in which the histogram creation unit 6005 and the accumulation normalization unit 6006 have been removed from the tone conversion coefficient calculation unit 6000 shown in FIG. 7 and a standard tone curve setting unit 6008 has been added. The basic constitution is identical to the tone conversion coefficient calculation unit 6000 shown in FIG. 7, and therefore identical names and reference numerals have been allocated to identical parts. Only different parts will be described below.

The buffer 6004 is connected to the coefficient calculation unit 6007. The standard tone curve setting unit 6008 is connected to the coefficient calculation unit 6007.

In this constitution, the coefficient calculation unit 6007 reads a standard tone curve from the standard tone curve setting unit 6008 and then calculates a tone conversion coefficient relating to the signal level of the region on the basis of the tone curve. In this case, an improvement effect decreases in scenes with a large contrast ratio, but the processing speed can be increased.

Figure 9:
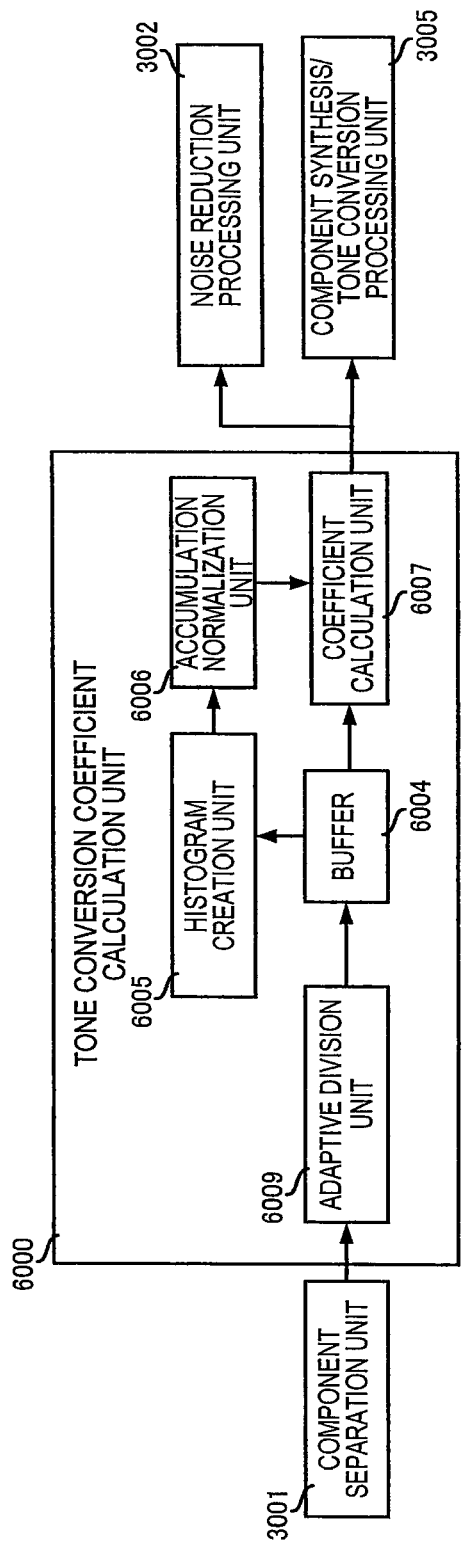
FIG. 9 is a constitutional diagram showing a second other constitution of the tone conversion coefficient calculation unit.

Further, as shown in FIG. 9, a constitution (second other constitution) in which the original image signal I is subjected to adaptive region division and a tone conversion coefficient is calculated for each region may be employed.

FIG. 9 shows a constitution in which the local region extraction unit 6003 has been removed from the tone conversion coefficient calculation unit 6000 shown in FIG. 7 and an adaptive division unit 6009 has been added. The basic constitution is identical to the tone conversion coefficient calculation unit 6000 shown in FIG. 7, and therefore identical names and reference numerals have been allocated to identical parts. Only different parts will be described below.

The component separation unit 3001 is connected to the adaptive division unit 6009. The adaptive division unit 6009 is connected to the buffer 6004.

The adaptive division unit 6009 reads rectangular regions of a predetermined size, in this example rectangular regions of 8×8 pixel units, for example, from the original image signal I in sequence, and performs division into uniform regions and labeling processing on the basis of a moment or an entropy value based on a predetermined characteristic quantity of the region, for example a statistic from a co-occurrence matrix for use in texture analysis, or on the basis of a luminance value and so on. Here, a well-known labeling technique is used such that an identical label is attached to regions having identical texture and luminance values and so on, for example. Once the labeling described above is complete, rectangular regions attached with identical labels are extracted as a single region and transferred to the buffer 6004.

In the above example, region division is performed on the basis of texture and luminance information, but the invention need not be limited to this constitution. For example, an increase in processing speed and so on can be achieved by using the texture only. With the constitution described above, highly precise region division using the texture, luminance, and so on can be performed, and as a result, the tone conversion processing can be performed more effectively.

Figure 10:
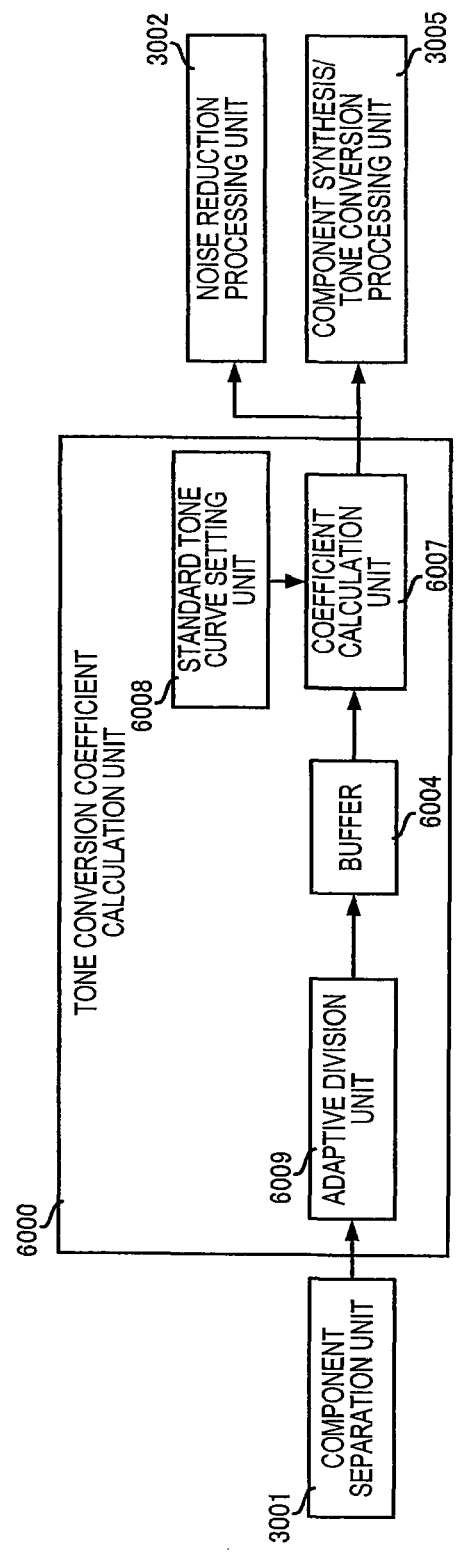
FIG. 10 is a constitutional diagram showing a third other constitution of the tone conversion coefficient calculation unit.

Further, as shown in FIG. 10, a constitution (third other constitution) in which the original image signal I is subjected to adaptive region division and a standard tone curve is used fixedly for each region may be employed.

FIG. 10 shows a constitution in which the local region extraction unit 6003 has been removed from the tone conversion coefficient calculation unit 6000 shown in FIG. 8 and the adaptive division unit 6009 has been added. The basic constitution is identical to the tone conversion coefficient calculation unit 6000 shown in FIG. 8, and therefore identical names and reference numerals have been allocated to identical parts. Only different parts will be described below.

The component separation unit 3001 is connected to the adaptive division unit 6009. The adaptive division unit 6009 is connected to the buffer 6004.

The adaptive division unit 6009 reads rectangular regions of a predetermined size, in this example rectangular regions of 8×8 pixel units, for example, from the original image signal I in sequence, and performs division into uniform regions and labeling processing on the basis of a moment or an entropy value based on a predetermined characteristic quantity of the region, for example a statistic from a co-occurrence matrix for use in texture analysis or on the basis of a luminance value and so on.

With the constitution described above, highly precise region division using the texture, luminance, and so on can be performed, and as a result, the tone conversion processing can be performed more effectively.

Next, soft-thresholding processing using the noise reduction processing parameters T1, T2 will be described.

As noted above, the second component V separated from the original image signal I includes noise, and therefore the noise reduction processing unit 3002 reduces the noise included in the second component V through the soft-thresholding processing (coring processing) to be described below.

Figure 11:
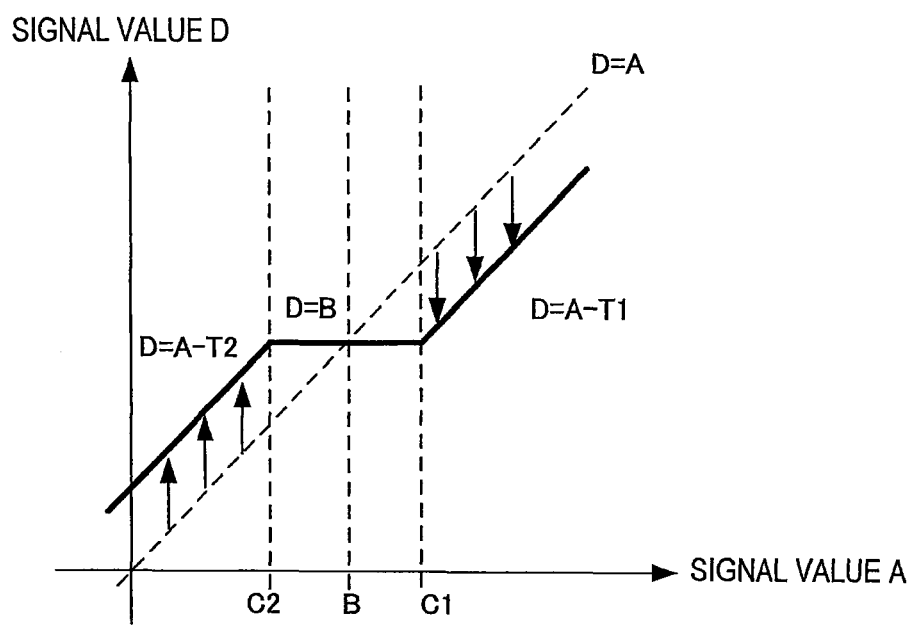
FIG. 11 is a view illustrating soft-thresholding processing.

The soft-thresholding processing is signal processing in which a reference value is B, an upper limit threshold is $C1=B+T1$ ($T1>0$), a lower limit threshold is $C2=B+T2$ ($T2<0$), and a relationship between a pre-processing signal value A and a post-processing signal value D is expressed by Equation (15) and a graph shown in FIG. 11.

$$B+T1<A\ D=A-T1$$

$$B+T2<A<B+T1\ D=B$$

$$A<B+T2\ D=A-T2 \tag{15}$$

Figure 12:
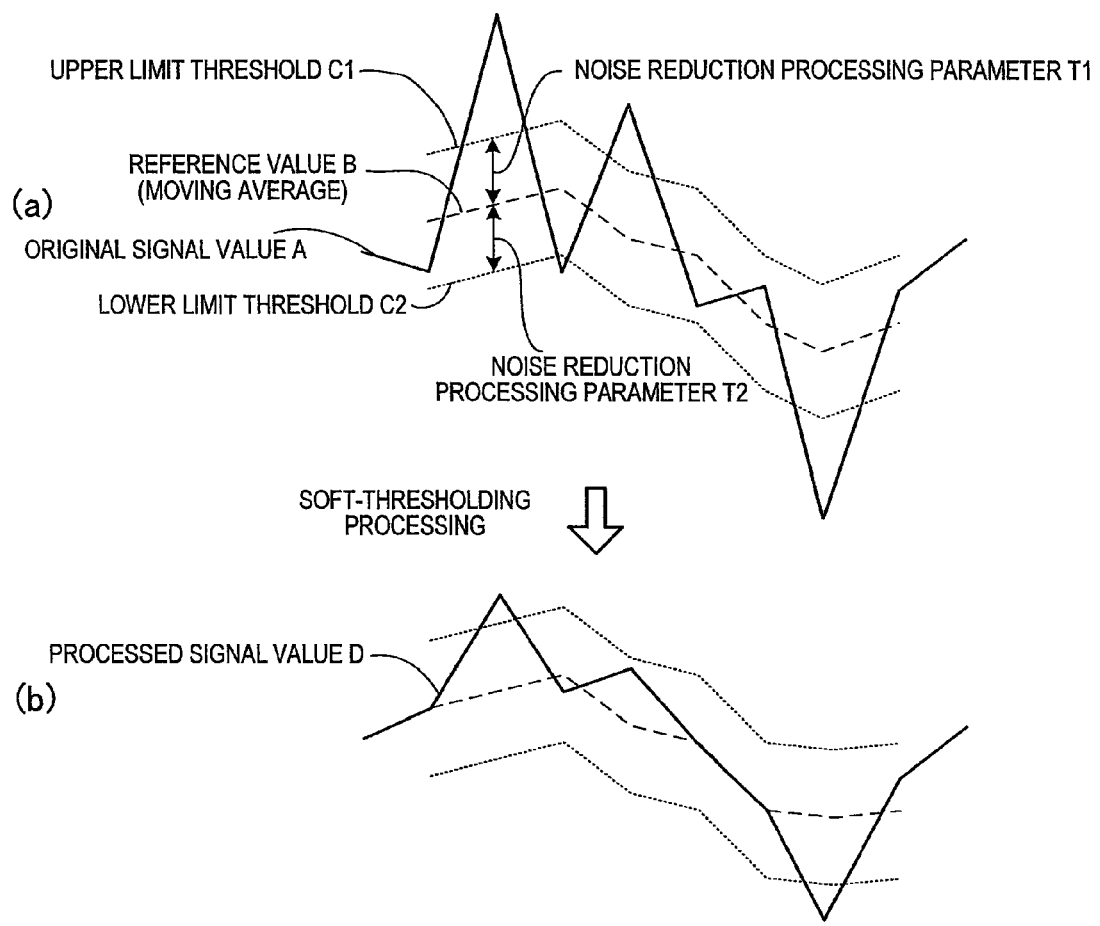
FIG. 12 is a view illustrating the soft-thresholding processing.

FIGS. 12A and 12B show the manner in which the soft-thresholding processing is performed. When soft-thresholding processing is performed on the one-dimensional signal value A shown in FIG. 12A, the signal value D shown in FIG. 12B is obtained. Here, a moving average of the signal value A is used as the reference value B.

Figure 13:
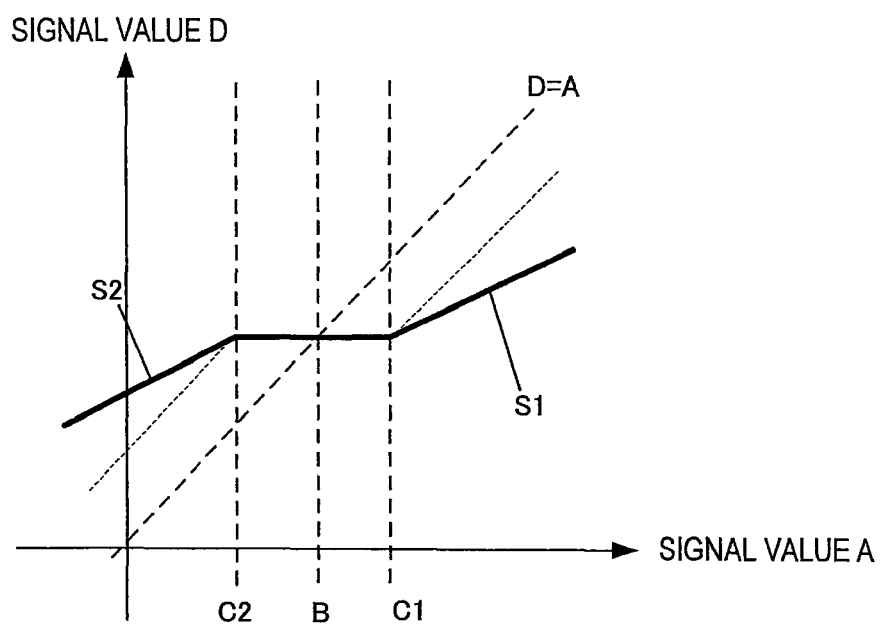
FIG. 13 is a view illustrating the soft-thresholding processing.

Further, as illustrated by Equation (16) and a graph shown in FIG. 13, depending on the characteristics of the input signal, gradients S1 (<1), S2 (<1) may be set within ranges A>C1, A<C2, and more powerful noise reduction may be performed in accordance with a difference with the reference value B in these ranges.

$$B+T1<A\ D=S1\times(A-B-T1)+B$$

$$B+T2<A<B+T1\ D=B$$

$$A<B+T2\ D=S2\times(A-B-T2)+B \tag{16}$$

Figure 14:
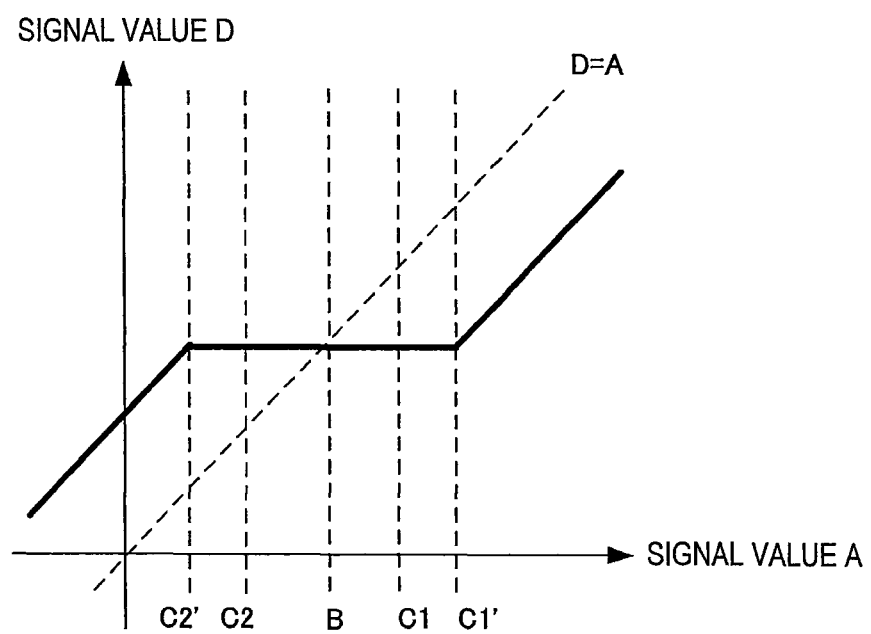
FIG. 14 is a view illustrating the soft-thresholding processing.

Further, as illustrated by Equation (17) and a graph shown in FIG. 14, depending on the characteristics of the input signal, the upper limit threshold and the lower limit threshold may be set at $C1'=B+(G1\times T1)$ ($T1>0$) and $C2'=B+(G2\times T2)$ ($T2<0$), respectively, and the noise reduction effect may be adjusted by adjusting the threshold range. Here, G1 and G2 are threshold range adjustment parameters. For example, when G1<1, G2<1 is set, the threshold range narrows, thereby weakening the noise reduction effect, and when G1>1, G2>1 is set, the threshold range widens such that noise reduction can be performed more powerfully.

$$B+(G1 \times T1) < A \quad D=A-(G1 \times T1)$$

$$B+(G2 \times T2) < A < B+(G1 \times T1) \quad D=B$$

$$A < B+(G2 \times T2) \quad D=A-(G2 \times T2) \tag{17}$$

Figure 15:
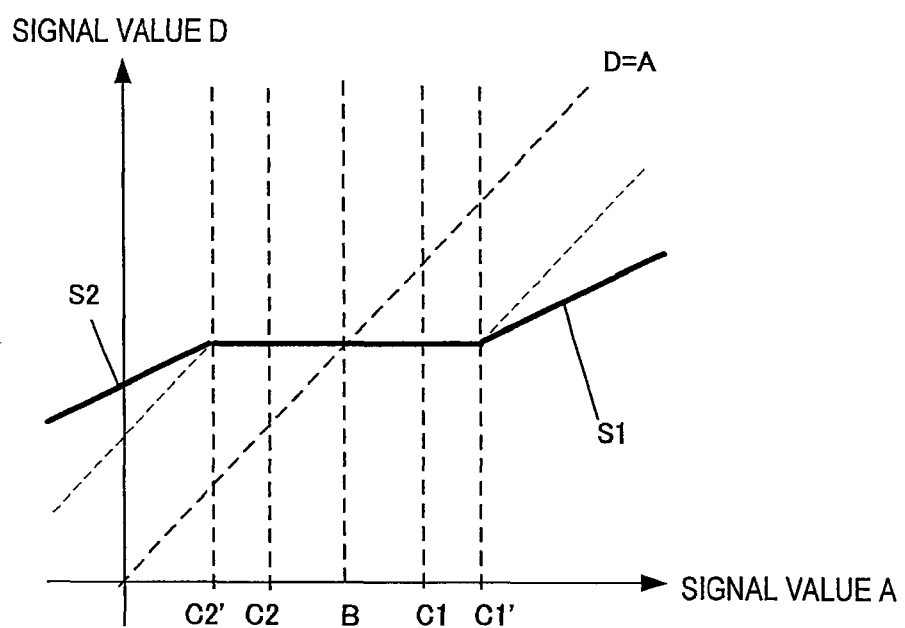
FIG. 15 is a view illustrating the soft-thresholding processing.

Further, as illustrated by Equation (18) and a graph shown in FIG. 15, depending on the characteristics of the input signal, the noise reduction effect can be adjusted by setting the upper limit threshold and the lower limit threshold at C1'=B+(G1×T1) (T1>0) and C2'=B+(G2×T2) (T2<0), respectively, and setting the gradients S1 (<1), S2 (1) within ranges A>C1', A<C2'. Here, G1 and G2 are threshold range adjustment parameters. For example, when G1<1, G2<1 is set, the threshold range narrows, thereby weakening the noise reduction effect, and when G1>1, G2>1 is set, the threshold range widens such that noise reduction can be performed more powerfully.

Furthermore, within the ranges A>(G1×T1), A<(G2×T2), noise reduction can be performed more powerfully in accordance with the difference with the reference value B.

$$B+(G1 \times T1) < A \quad D=S1 \times (A-B-(G1 \times T1))+B$$

$$B+(G2 \times T2) < A < B+(G1 \times T1) \quad D=B$$

$$A < B+(G2 \times T2) \quad D=S2 \times (A-B-(G2 \times T2))+B \tag{18}$$

Depending on the component separation method, for example the multiplication type separation shown in Equation (7) and so on, when tone conversion processing is performed by multiplying the tone conversion coefficient g directly by the first component V, the tone conversion processing may affect the second component V. At this time, a residual noise component that cannot be removed completely from the second component V by the noise reduction processing is amplified by the subsequent tone conversion processing (multiplication of the tone conversion coefficient), causing the image quality to deteriorate, and therefore processing is preferably performed to adjust the noise reduction effect in accordance with the tone conversion coefficient during the noise reduction processing.

For example, when multiplication of the tone conversion coefficient is performed during multiplication separation, the effect of the tone conversion coefficient g on the second component V can be suppressed by multiplying the tone conversion coefficient g in accordance with Equation (19).

$$g \times U + U \times (V-1) \tag{19}$$

In the first embodiment, the soft-thresholding processing shown in Equation (18) and FIG. 15 is performed on the second component V separated from the original image signal I while taking into account the effect of tone conversion on the second component V. Here, by interlocking the gradients S1, S2 and the threshold range setting parameters G1, G2 with the tone conversion coefficient as shown in Equation (20) and Equation (21), respectively, noise can be suppressed more powerfully when amplification due to tone conversion is large.

$$S1=Cks \times g \quad S2=Cks \times g \tag{20}$$

$$G1=Ckg \times g \quad G2=Ckg \times g \tag{21}$$

Here, g is the tone conversion coefficient, and Cks, Ckg are predetermined weighting coefficients.

The second component V is obtained by removing the first component U, which is a skeleton component, from the original image signal I, and therefore the reference value B may be considered to take a value of 0.

Figure 16:
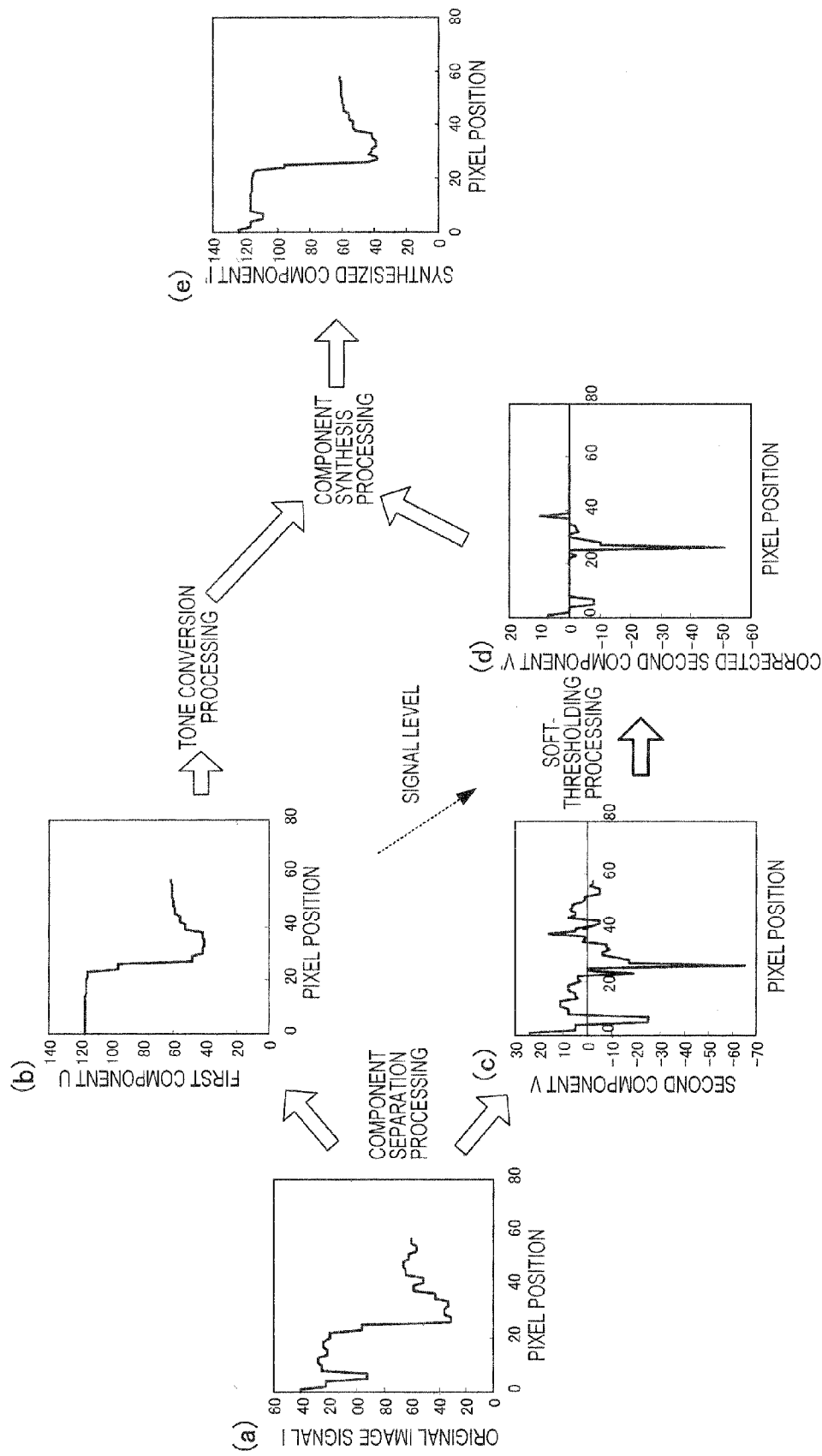
FIG. 16 is a view showing the manner in which noise is reduced by noise reduction processing.

FIG. 16 shows the manner in which the noise of the original image signal I is reduced by the component separation and noise reduction processing described above and noise amplification due to the tone conversion processing is suppressed.

FIG. 16A shows the original image signal I expressed in a single dimension and including noise.

FIG. 16B shows the first component U separated from the original image signal I by the component separation unit 3001. The first component U is a skeleton component including a flat component and an edge component, and includes substantially no noise.

FIG. 16C shows the second component V obtained by the component separation unit 3001. The second component V is the remaining component after the first component U has been extracted from the original image signal I, and includes noise equivalent to the noise included in the original image signal I.

FIG. 16D shows a result obtained when the soft-thresholding processing is performed on the second component V. The corrected second component V' is reduced in noise in comparison with the second component V. To obtain the noise distribution σ by referring to the signal level-noise distribution model, it is normally necessary to estimate a noiseless original signal, but in the first embodiment, the noise distribution σ is obtained using the signal level of the first component U, which is a skeleton component, instead. It should be noted that here, for simplification, the noise distribution σ is obtained by referring to data approximating the signal level-noise distribution model shown in FIG. 3 using a polygonal line.

FIG. 16E shows a result obtained when the tone conversion coefficient g is multiplied by the first component U shown in FIG. 16B and then synthesized with the corrected second component V' shown in FIG. 16D at 1:1 by the component synthesis/tone conversion processing unit 3005. As can be seen by comparing FIG. 16A with FIG. 16E, the synthesized component I' is subjected to tone conversion processing in which noise is reduced such that noise amplification does not occur while maintaining the edge component relative to the original image signal I. It should be noted that a mixing ratio employed during synthesis may be set arbitrarily.

Next, actions and effects of the first embodiment will be described.

When signal level-dependent noise included in the original image signal I is estimated from the signal level, a noiseless original image signal I must be estimated, but when the signal level of the first component U, which is a skeleton component, is used, the noise included in the original image signal I can be estimated with a high degree of precision. Meanwhile, the second component V remaining after the first component U is extracted from the original image signal I includes noise equivalent to the noise included in the original image signal I.

Therefore, by setting the noise reduction processing parameters T1, T2 for reducing the noise of the second component V on the basis of the signal level of the first component U and reducing the noise of the second component V using these parameters T1, T2, the noise of the second component V can be reduced effectively, whereby noise reduction processing resulting in high image quality can be provided. The edge component is included in the skeleton first component, and therefore the edge does not deteriorate as a result of the noise reduction processing.

Further, in the tone conversion processing, the tone conversion coefficient g is calculated using the signal level of the first component U, which is a skeleton component, or the signal level of the original image signal I, the tone conversion coefficient g is multiplied by the first component U, and the result is synthesized with the second component V. Hence, the tone conversion processing does not affect the noise included in the second component V, and therefore tone conversion processing that suppresses noise amplification and results in high image quality can be provided.

It should be noted that any signal level-dependent signal processing may be used as the noise reduction processing method. For example, a comparison result obtained by comparing a threshold corresponding to the noise reduction processing parameters T1, T2 to the second component V and the soft-thresholding processing for correcting the second component V in accordance with the tone conversion coefficient may be used, as described above. When the noise reduction effect is controlled by setting the soft threshold on the basis of the tone conversion coefficient, highly precise noise reduction processing with which amplification of the noise included in the second component due to the tone conversion processing is suppressed becomes possible.

Furthermore, with regard to the detailed structural components included in the second component V, image quality control relating to detailed structures, such as contrast enhancement in the detailed portions, may be performed by implementing second tone conversion processing or the like, which is different to the tone conversion processing performed on the first component U, on the second component V and then synthesizing the second component V with the first component U. By performing tone conversion processing on both the first component U and the second component V, a more natural image is obtained.

The second tone conversion processing is performed by multiplying the second component V or the post-noise reduction processing second component V' by a predetermined gain, a tone conversion coefficient g' subjected to adjustment processing such as predetermined weighting, or similar, for example. By performing the second tone conversion processing on the post-noise reduction processing second component V', amplification of the noise included in the second component V can be suppressed. When the second tone conversion processing is performed on the pre-noise reduction processing second component V, an increase in the noise included in the second component V must be suppressed. When the predetermined gain is used, for example, the gain must be reduced sufficiently, and when the tone conversion coefficient g' is used, the tone conversion coefficient g' is set to have an inclination opposite to the tone conversion coefficient g, or in other words to decrease as the tone conversion coefficient g increases.

The tone conversion coefficient calculation unit 6000 may be connected directly to the digital signal processing unit 1005 rather than the component separation unit 3001 such that the tone conversion coefficient is calculated from the original image signal I by a similar method to that of a case in which the input is the first component U. According to this constitution, component separation and tone conversion coefficient calculation are performed in parallel, enabling an increase in processing speed.

Further, either addition type separation or multiplication type separation may be used as the component separation method, and the original image signal I may be separated into three or more components rather than two components.

Moreover, the noise reduction processing executed on the second to Nth components is not limited to the soft-thresholding processing described above, and any signal level-based noise reduction processing method may be employed.

[Second Embodiment]

Embodiments from the second embodiment onward relate to a full color image. Identical reference symbols have been allocated to constitutions that are identical to the constitutions of the first embodiment, and description thereof has been omitted.

Figure 17:
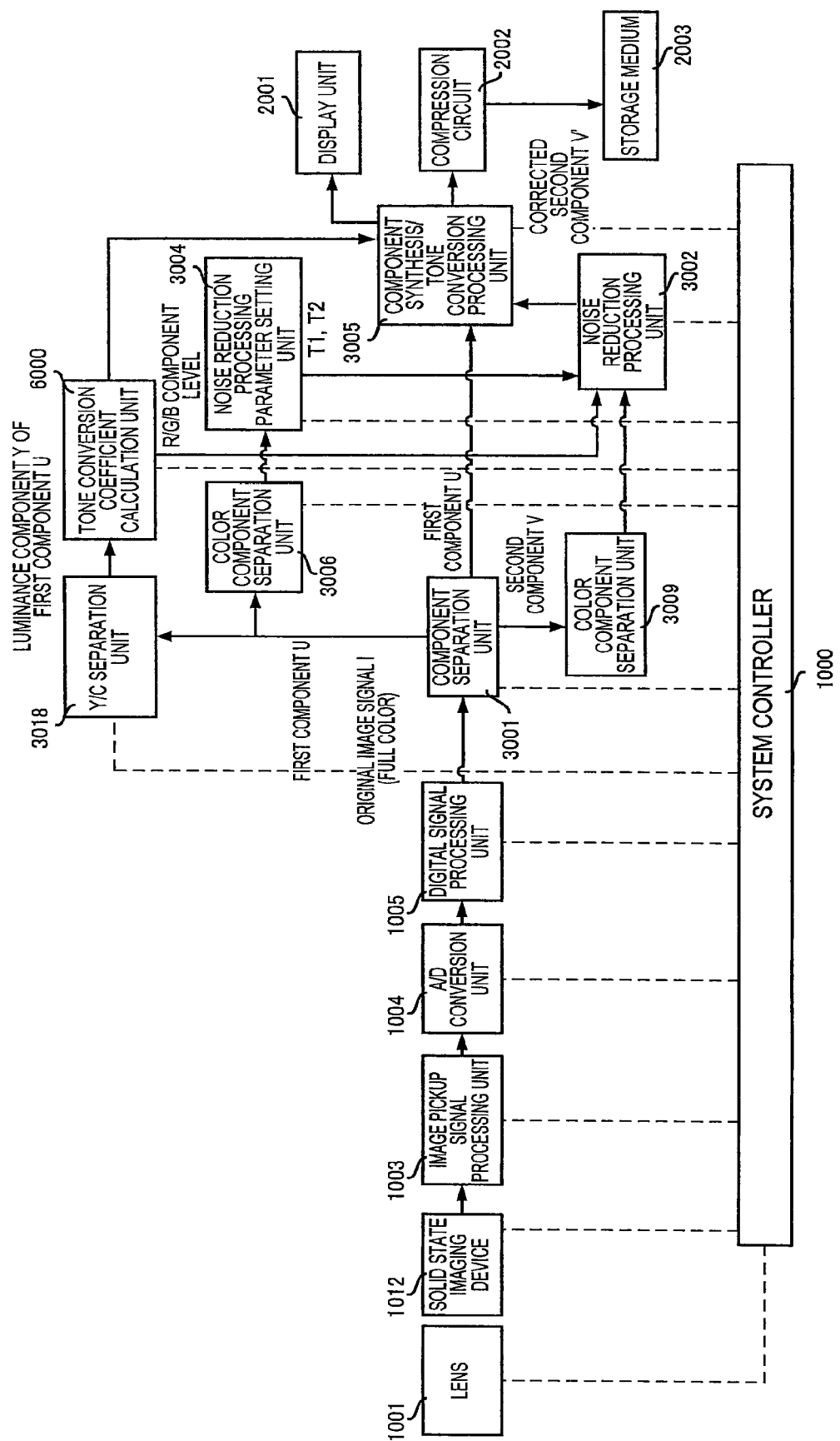
FIG. 17 is a system diagram showing an imaging apparatus according to a second embodiment.

FIG. 17 is a system diagram showing an imaging apparatus according to the second embodiment, wherein a solid state imaging device 1012 is a full color imaging device having a color filter array disposed on its front surface. The solid state imaging device 1012 may be a single plate device or a multi-plate device.

The component separation unit 3001 is connected to a Y/C separation unit 3018, a color component separation unit 3006, and a color component separation unit 3009. The Y/C separation unit 3018 is connected to the tone conversion coefficient calculation unit 6000. The color component separation unit 3006 is connected to the noise reduction processing parameter setting unit 3004. The color component separation unit 3009 is connected to the noise reduction processing unit 3002.

The first component U transferred from the component separation unit 3001 is separated into a luminance component Y and color difference components Cb, Cr in the Y/C separation unit 3018. Conversion from an R component, a G component, and a B component constituting the first component U into the luminance component Y and the color difference components Cb, Cr is performed in accordance with Equation (22).

$$Y = 0.29900R + 0.58700G + 0.11400B$$

$$Cb = -0.16874R - 0.33126G + 0.50000B$$

$$Cr = 0.50000R - 0.41869G - 0.08131B \quad (22)$$

The separated luminance component Y is transferred to the tone conversion coefficient calculation unit 6000, whereupon a tone conversion coefficient is calculated using a similar method to the first embodiment on the basis of a signal level of the luminance signal Y.

The color component separation unit 3006 separates the first component U into respective color components (an R component, a G component, and a B component) and transfers the separated color components to the noise reduction processing parameter setting unit 3004.

The noise reduction processing parameter setting unit 3004 obtains the noise distribution σ of each color component on the basis of the signal level of each color component by referring to the signal level-noise distribution model shown in FIG. 3 or approximation data thereof. The noise reduction processing parameters T1, T2 of each color component are then set at values corresponding to the noise distribution σ of the corresponding color component, for example values commensurate with the noise distribution σ.

The color component separation unit 3009 separates the second component V obtained from the component separation unit 3001 into its respective color components and transfers the separated color components to the noise reduction processing unit 3002.

The noise reduction processing unit 3002 performs the soft-thresholding processing described in the first embodiment on each color component of the second component V individually to reduce the noise included in each color component.

The component synthesis/tone conversion processing unit 3005 multiplies the tone conversion coefficient calculated by the tone conversion coefficient calculation unit 6000 by each color component of the first component U, and then synthesizes the resulting color components with the corresponding color components of the corrected second component V'.

Figure 18:
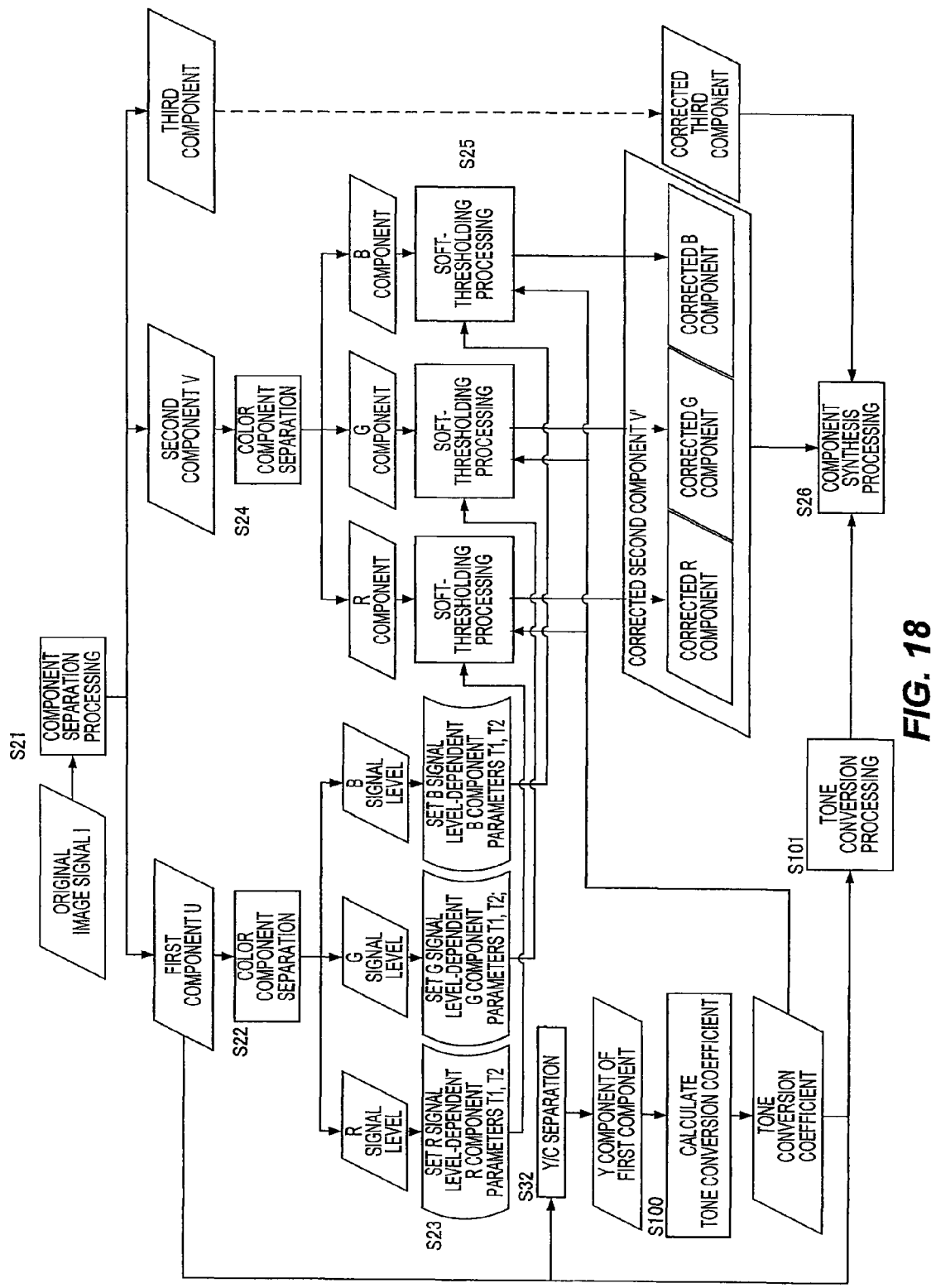
FIG. 18 is a flowchart corresponding to processing performed from a component separation unit to a component synthesis/tone conversion processing unit according to the second embodiment.

FIG. 18 shows a flow executed when the processing from the component separation unit 3001 to the component synthesis/tone conversion processing unit 3005 is realized by software processing. A software program is stored on a computer-readable storage medium or in a ROM of a computer, and the stored program is read to a RAM and executed by a CPU of the computer. For reference, processing performed in a case where the original image signal I is separated into three components is indicated in FIG. 18 by broken lines, but here, a case in which the original image signal I is separated into two components will be described.

In a step S21, the original image signal I is separated into the first component U and the second component V.

In a step S22, the first component U is separated into its respective color components, and the signal level of each color component is obtained.

In a step S23, the noise distribution σ of each color component is obtained on the basis of the signal level of each color component by referring to the signal level-noise distribution model shown in FIG. 3 or approximation data thereof. The noise reduction processing parameters T1, T2 are then set in relation to each color component of the second component V in accordance with the noise distribution σ of each color component.

In a step S32, each color signal of the first component U is converted into the luminance signal Y and the color difference signals Cr, Cb.

In the step S100, a local region of a predetermined size centering on a target pixel is extracted from the luminance signal Y of the first component U, and a histogram is calculated in the local region on the basis of a signal level. A tone curve is then set on the basis of the calculated histogram, whereupon a tone conversion coefficient to be applied to each pixel during tone conversion processing based on the conversion curve is calculated.

In a step S24, the second component V is separated into its respective color components.

In a step S25, soft-thresholding processing employing the noise reduction processing parameters T1, T2 and the tone conversion coefficient of the corresponding color component is performed individually on each color component of the second component V. A value obtained from the soft-thresholding processing is then set as the corrected second component V'.

In the step S101, tone conversion processing is performed by multiplying each color signal of the first component U by the tone conversion coefficient.

In a step S26, the tone-converted first component U and the corrected second component V' are synthesized to obtain the synthesized component I' having reduced noise relative to the original image signal I.

According to the second embodiment, even when the original image signal I includes a plurality of color components, noise reduction processing and tone conversion processing resulting in high image quality can be performed while suppressing edge component deterioration, similarly to the first embodiment.

It should be noted that either addition type separation or multiplication type separation may be used as the component separation method. Moreover, the noise reduction processing executed on the second component V is not limited to soft-thresholding processing, and any signal level-dependent signal processing method may be applied.

Further, similarly to the first embodiment, second tone conversion processing, which is different to the tone conversion processing performed on the first component U, may be performed on the second component V or the corrected second component V'. By performing tone conversion processing on the second component V or corrected second component V' also, a more natural image is obtained.

[Third Embodiment]

Figure 19:
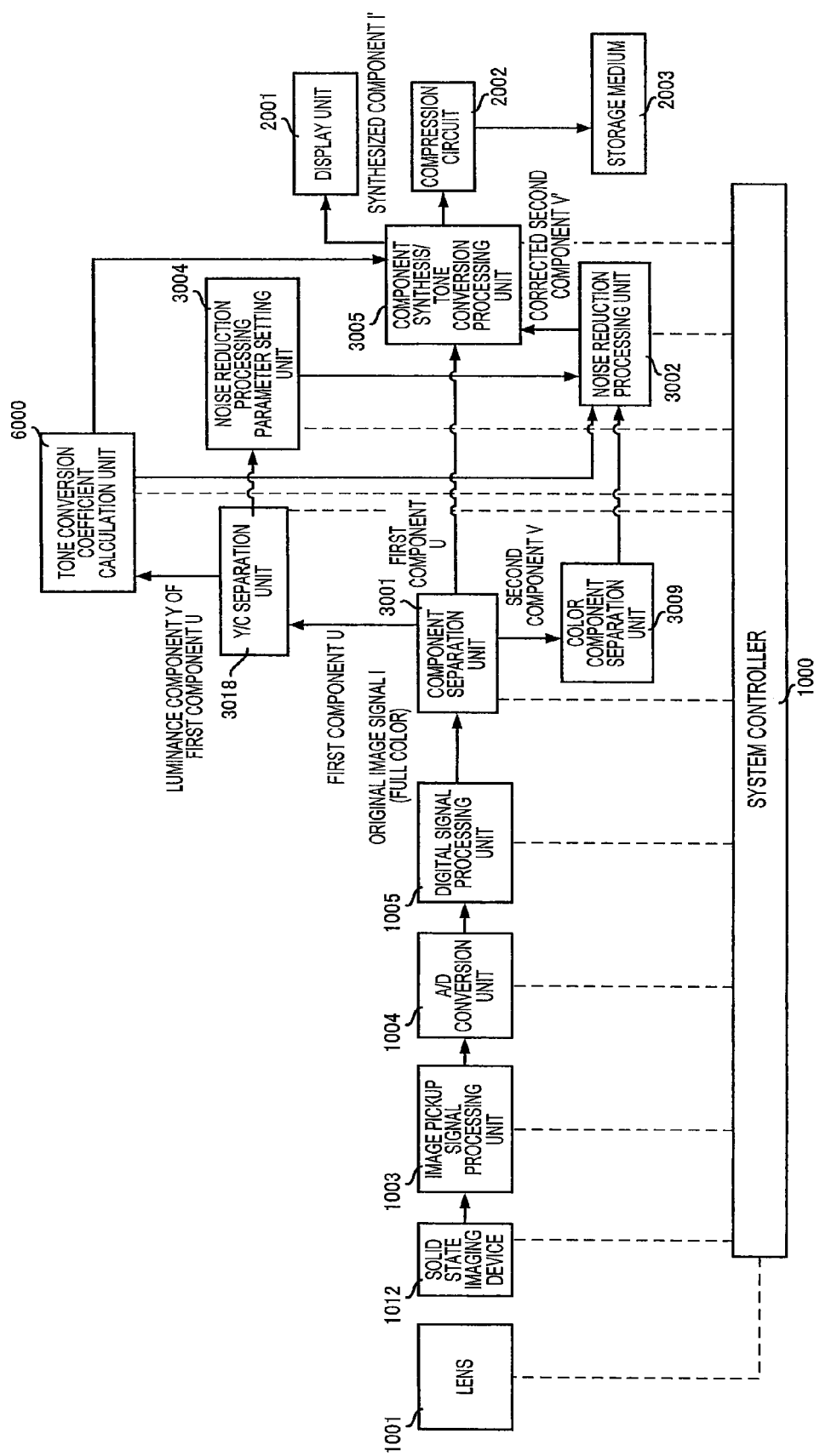
FIG. 19 is a system diagram showing an imaging apparatus according to a third embodiment.

FIG. 19 is a system diagram showing an imaging apparatus according to a third embodiment. Identical reference symbols have been allocated to constitutions that are identical to the constitutions of the preceding embodiments, and description thereof has been omitted.

In the third embodiment, the color component separation unit 3006 is omitted. The Y/C separation unit 3018 separates the first component U into the luminance component Y and the color difference components Cb, Cr. Conversion from the R component, G component, and B component constituting the first component U into the luminance component Y and the color difference components Cb, Cr is performed in accordance with Equation (22).

The noise reduction processing parameter setting unit 3004 obtains the noise distribution σ of each color component corresponding to the signal level of the luminance component Y by referring to the signal level-noise distribution model shown in FIG. 3 or approximation data thereof. Here, the distribution model, or the approximation data, is created by measuring and modeling the noise amount relative to the luminance component Y for each of the R, G, B signals in advance.

The noise reduction processing parameters T1, T2 of each color component are then set at values corresponding to the noise distribution σ of the corresponding color component, for example values commensurate with the noise distribution σ.

The color component separation unit 3009 separates the second component V obtained from the component separation unit 3001 into its respective color components. The noise reduction processing unit 3002 performs the soft-thresholding processing described above on each color component individually to reduce the noise included in each color component.

Figure 20:
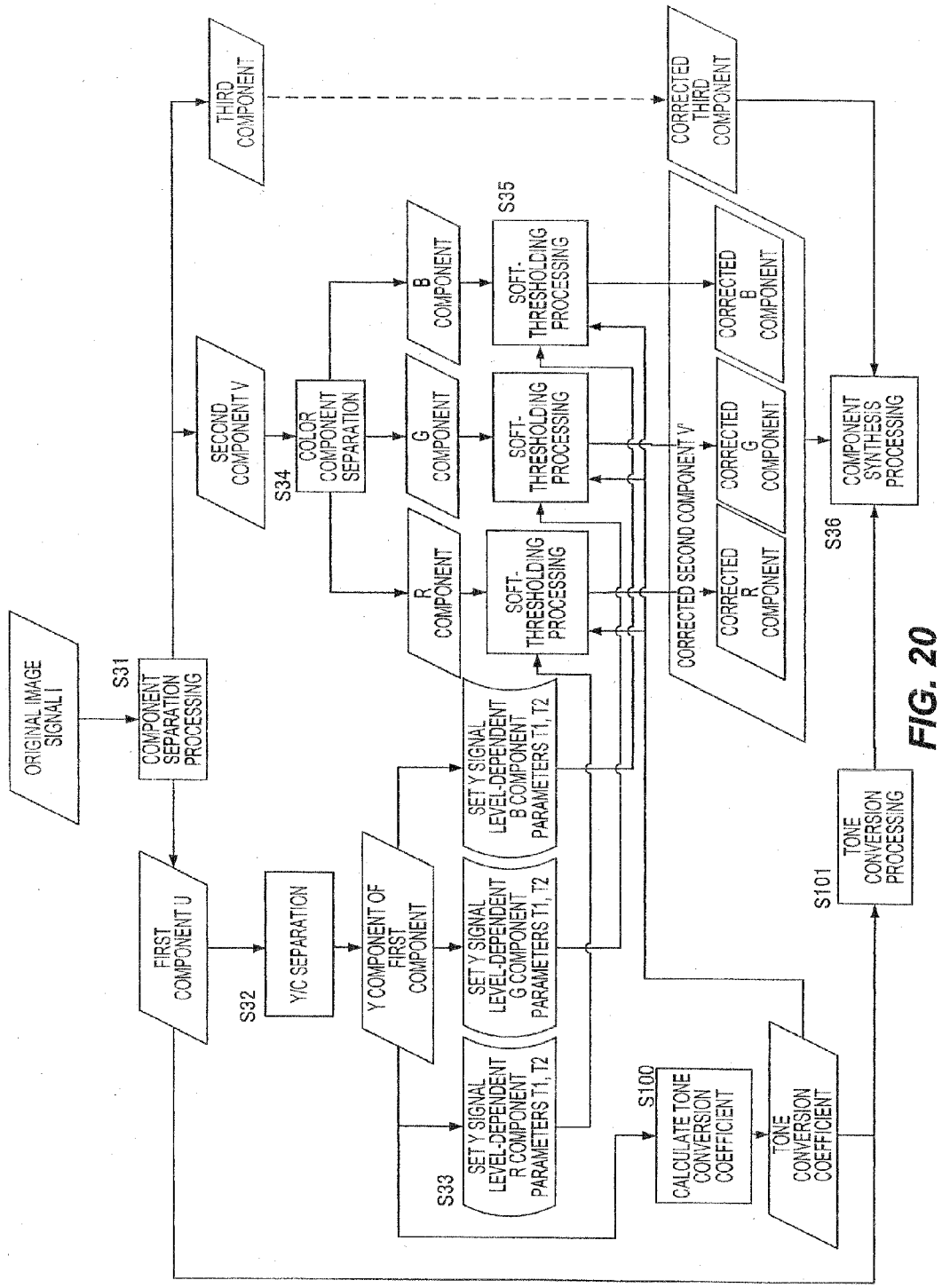
FIG. 20 is a flowchart corresponding to processing performed from a component separation unit to a component synthesis/tone conversion processing unit according to the third embodiment.

FIG. 20 shows a flow executed when the processing from the component separation unit 3001 to the component synthesis/tone conversion processing unit 3005 is realized by software processing. A software program is stored on a computer-readable storage medium or in a ROM of a computer, and the stored program is read to a RAM and executed by a CPU of the computer. For reference, processing performed in a case where the original image signal I is separated into three components is indicated in FIG. 20 by broken lines, but here, a case in which the original image signal I is separated into two components will be described.

In a step S31, the original image signal I is separated into the first component U and the second component V.

In a step S32, each color signal of the first component U is converted into the luminance signal Y and the color difference signals Cr, Cb.

In a step S33, the noise distribution σ is obtained in accordance with the signal level of the luminance component Y of the first component U by referring to the signal level-noise distribution model shown in FIG. 3 or approximation data thereof. The noise reduction processing parameters T1, T2 are then set in relation to each color component of the second component V in accordance with the noise distribution σ.

In a step S34, the second component V is separated into its respective color components.

In the step S100, a local region of a predetermined size centering on a target pixel is extracted from the luminance signal Y of the first component U, and a histogram is calculated in the local region on the basis of a signal level. A tone curve is then set on the basis of the calculated histogram, whereupon a tone conversion coefficient to be applied to each pixel during tone conversion processing based on the conversion curve is calculated.

In a step S35, soft-thresholding processing employing the noise reduction processing parameters T1, T2 and the tone conversion coefficient is performed individually on each color component of the second component V to obtain the corrected second component V'.

In the step S101, tone conversion processing is performed by multiplying each color signal of the first component by the tone conversion coefficient.

In a step S36, the tone conversion-processed first component U and the corrected second component V' are synthesized to obtain the synthesized component I' having reduced noise relative to the original image signal I.

According to the third embodiment, even when the original image signal I includes a plurality of color components, noise reduction processing and tone conversion processing resulting in high image quality can be performed while suppressing edge component deterioration, similarly to the first embodiment.

It should be noted that either addition type separation or multiplication type separation may be used as the component separation method. Moreover, the noise reduction processing executed on the second component V is not limited to soft-thresholding processing, and any signal level-dependent signal processing method may be applied.

Furthermore, in this embodiment, the luminance component Y is separated from the first component U, and the noise reduction processing parameters T1, T2 and the tone conversion coefficient are set and calculated in accordance with the signal level of the luminance component Y. However, the signal level of a signal obtained by interpolating the G component, which most closely reflects the luminance component Y, may be used instead of the signal level of the luminance component Y.

Further, similarly to the first embodiment, second tone conversion processing, which is different to the tone conversion processing performed on the first component U, may be performed on the second component V or the corrected second component V'. By performing tone conversion processing on the second component V or corrected second component V' also, a more natural image is obtained.

[Fourth Embodiment]

Figure 21:
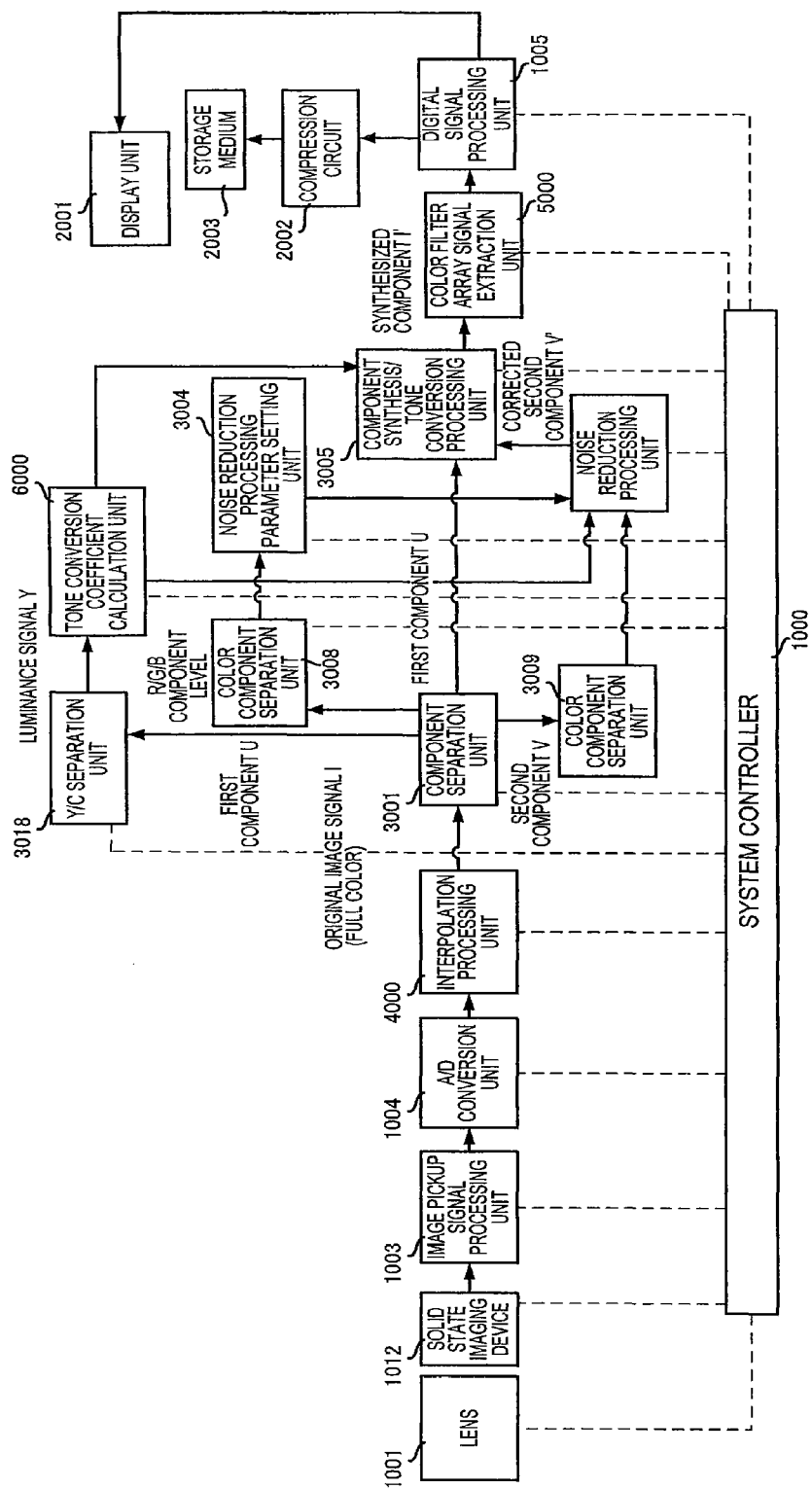
FIG. 21 is a system diagram showing an imaging apparatus according to a fourth embodiment.

FIG. 21 is a system diagram showing an imaging apparatus according to a fourth embodiment. Identical reference symbols have been allocated to constitutions that are identical to the constitutions of the preceding embodiments, and description thereof has been omitted.

In the first embodiment, the component separation unit 3001 to the component synthesis/tone conversion processing unit 3005 are disposed after the digital signal processing unit 1005, but in the fourth embodiment, as shown in FIG. 21, these elements are disposed before the digital signal processing unit 1005 such that component separation and noise reduction processing are performed on the signal immediately after A/D conversion (i.e. prior to digital signal processing). In this case, in addition to component separation, a signal obtained via the color filter array is demosaiced by an interpolation processing unit 4000 in order to obtain a full color signal (the original image signal I).

In the fourth embodiment, similarly to the second embodiment, the noise reduction processing parameters T1, T2 are set for each color component on the basis of the signal level of each color component using a signal level-noise distribution model. In the fourth embodiment, signal separation and noise reduction processing are performed prior to digital signal processing, and therefore the noise distribution σ is obtained by referring to a signal level-noise distribution model illustrated in FIG. 22 or Equations (12) and (13) rather than the model shown in FIG. 3.

The subsequent noise reduction processing performed on the second component V through soft-thresholding processing and synthesis processing of the first component U and corrected second component V' are similar to the second embodiment.

According to the fourth embodiment, an original image signal I including a plurality of color components can be subjected to noise reduction processing and tone conversion processing resulting in high image quality while suppressing edge component deterioration, similarly to the first embodiment. Furthermore, since color separation and noise reduction processing are performed prior to digital image processing, the ability of the component separation unit 3001 to separate the noise component from the skeleton component is improved.

It should be noted that either addition type separation or multiplication type separation may be used as the component separation method. Moreover, the noise reduction processing executed on the second component V is not limited to soft-thresholding processing, and any signal level-dependent signal processing method may be applied.

Furthermore, in the fourth embodiment, the noise distribution σ is obtained on the basis of the signal level of each color component, and the noise reduction processing parameters T1, T2 and the tone conversion coefficient are set and calculated in accordance therewith. However, the signal level of the luminance component Y, which is obtained by converting all of the color components immediately after A/D conversion, or the signal level of a signal obtained by interpolating the G component, which most closely reflects the luminance component Y, may be used instead of the signal level of each color component.

Further, similarly to the first embodiment, second tone conversion processing, which is different to the tone conversion processing performed on the first component U, may be performed on the second component V or the corrected second component V'. By performing tone conversion processing on the second component V or corrected second component V' also, a more natural image is obtained.

[Fifth Embodiment]

In a noiseless color image, a local inter-color correlation coefficient (to be referred to hereafter as a "correlation coefficient") evaluated in a 3×3 proximal region takes a positive value close to 1, whereas a color image including noise includes pixels having a reduced correlation coefficient such that the correlation coefficient evaluated in a proximal region decreases. It may therefore be said that the amount of noise included in an image signal increases as the value of the correlation coefficient decreases.

Hence, in a fifth embodiment, the noise reduction processing parameters T1, T2 used in the soft-thresholding processing are corrected in accordance with the correlation between the color components. In so doing, the width of the soft-thresholding processing narrows in regions having a high correlation such that the original image signal I is maintained, whereas the width of the soft-thresholding processing in regions having a low correlation is widened such that the original image signal I can be flattened, enabling more precise noise reduction processing.

Figure 23:
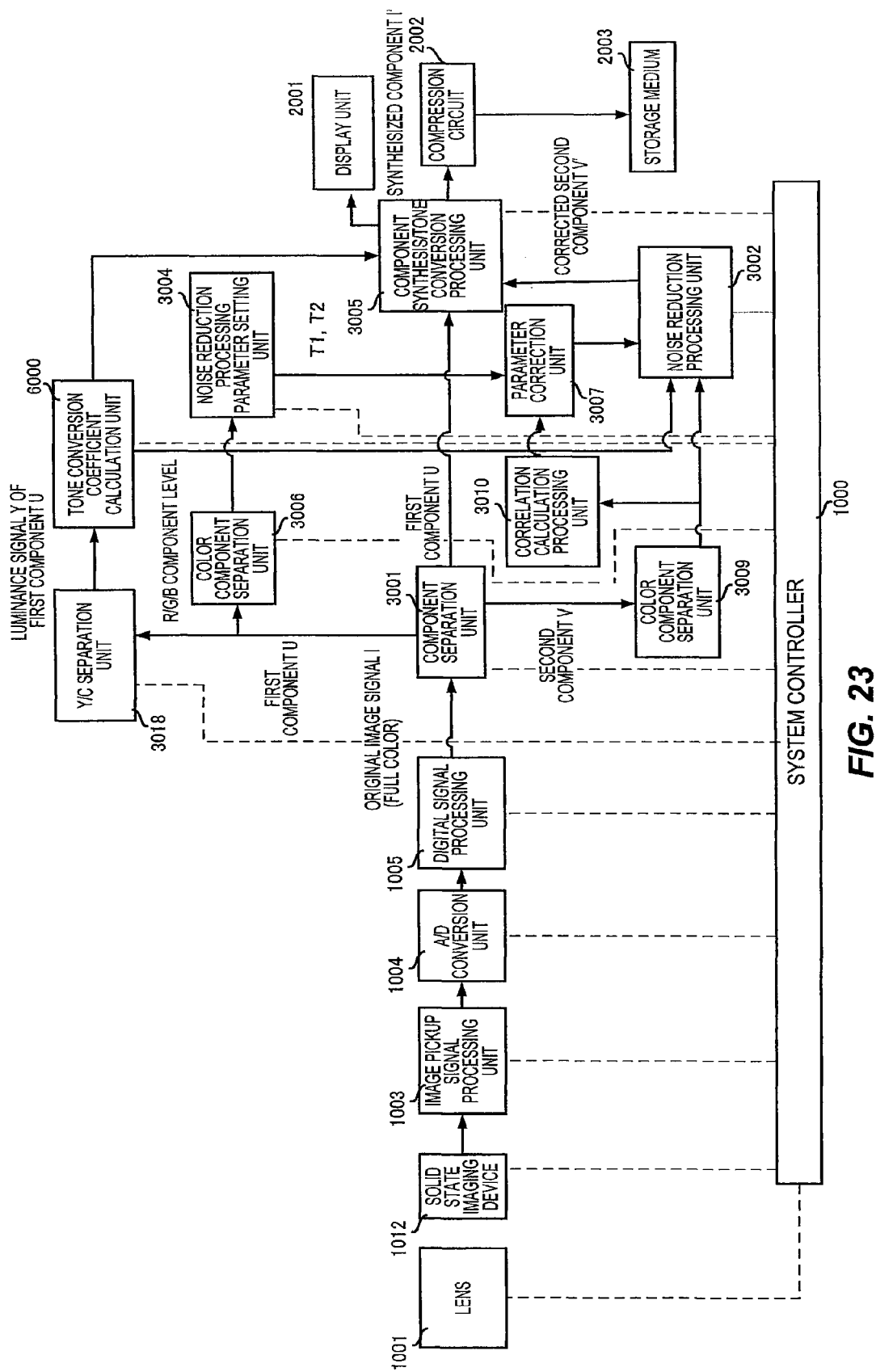
FIG. 23 is a system diagram showing an imaging apparatus according to a fifth embodiment.

FIG. 23 is a system diagram showing an imaging apparatus according to the fifth embodiment. Identical reference symbols have been allocated to constitutions that are identical to the constitutions of the preceding embodiments, and description thereof has been omitted.

In the fifth embodiment, correction of the noise reduction processing parameters T1, T2 in accordance with the inter-color component correlation is implemented together with the soft-thresholding processing performed after component separation in the second embodiment. The inter-color component correlation is calculated in relation to the second component V separated from the original image signal I.

The first component U separated from the original image signal I is transmitted to the color component separation unit 3006, and the color component separation unit 3006 obtains the signal level of each color component.

Similarly to the second embodiment, the noise reduction processing parameter setting unit 3004 obtains the noise distribution σ of each color component on the basis of the signal level of each color component by referring to a signal level-noise distribution model. The noise reduction processing parameters T1, T2 of each color component are then set at values corresponding to the noise distribution σ of the corresponding color component, for example values commensurate with the noise distribution σ.

The second component V separated from the original image signal I is separated into its respective color components by the color component separation unit 3009, whereupon the separated color components are transmitted to a correlation calculation processing unit 3010.

As will be described below, the correlation calculation processing unit 3010 calculates a correlation coefficient of each color component in a proximal region including a target pixel position, and outputs a minimum correlation coefficient r, which is a minimum value of the calculated correlation coefficient.

A parameter correction unit 3007 calculates a correction coefficient Ct of the noise reduction processing parameters T1, T2 on the basis of the minimum correlation coefficient r, and multiplies the calculated correction coefficient Ct by the noise reduction processing parameters T1, T2 of each color component to correct the noise reduction processing parameters T1, T2 of each color component.

The noise reduction processing unit 3002 performs soft-thresholding processing using the corrected noise reduction processing parameters T1, T2 and the tone conversion coefficient individually on each color component of the second component V to reduce the noise included in each color component. The noise reduction processing unit 3002 then outputs an obtained signal as the corrected second component V'.

The component synthesis/tone conversion processing unit 3005 multiplies the first component U by the tone conversion coefficient calculated by the tone conversion coefficient calculation unit 6000 and then synthesizes the result with the corrected second component V' at a predetermined ratio, for example 1:1, to obtain the synthesized component I' subjected to noise reduction and tone conversion processing relative to the original image signal I.

The content of the correlation calculation processing and correction of the noise reduction processing parameters T1, T2 in accordance with the correlation between the corrected color components of the noise reduction processing parameters T1, T2 will now be described using a specific example. To simplify the description, it is assumed here that the second component V is one-dimensional. The second component V is a residual component remaining after the first component U is extracted from the original image signal I, which includes noise and detailed structural parts such as textures, and therefore the second component V varies about zero.

Figure 24:
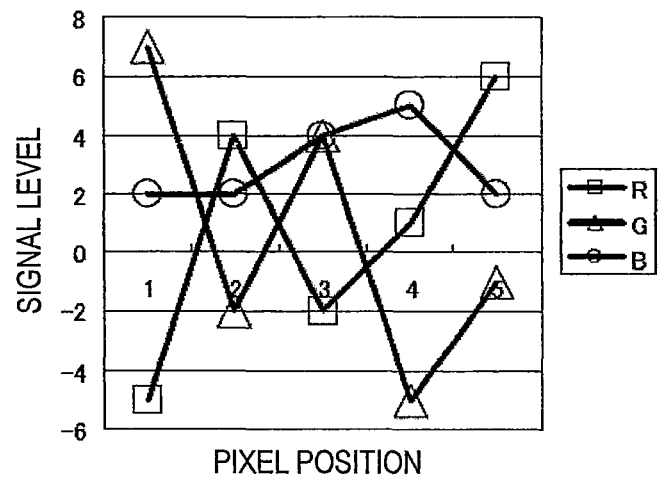
FIG. 24 is a view showing an example of a one-dimensional image signal in which no correlation exists between color components.
Figure 25:
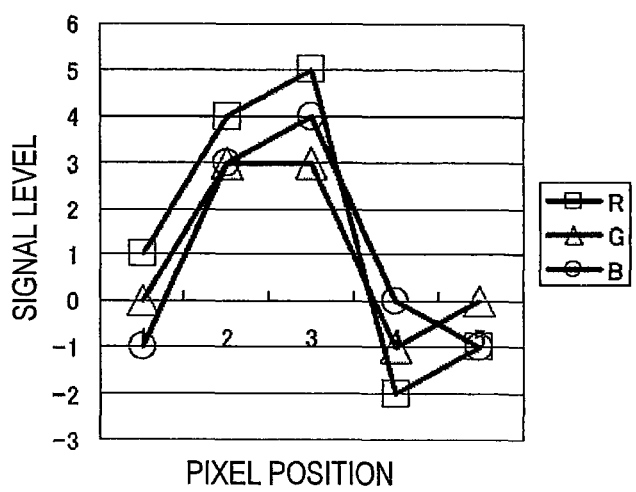
FIG. 25 is a view showing an example of a one-dimensional image signal in which a correlation exists between the color components.

FIGS. 24 and 25 show relationships between a pixel position of the second component V and a signal level of each color component.

In the example shown in FIG. 24, there is no correlation between the color components, and the signal level of each color component in each pixel position is as follows.

| PIXEL POSITION | R | G | B |
| --- | --- | --- | --- |
| 1 | −5 | 7 | 2 |
| 2 | 4 | −2 | 2 |
| 3 | −2 | 4 | 4 |
| 4 | 1 | −5 | 5 |
| 5 | 6 | −1 | 2 |

When respective correlation coefficients between R and G, G and B, and B and R are determined, the following correlation coefficients are obtained.

Correlation Coefficients

| R-G | G-B | B-R |
| --- | --- | --- |
| −0.75148 | −0.36622 | −0.19914 |

Hence, the minimum correlation coefficient r is −0.75148.

In the example shown in FIG. 25, on the other hand, correlation exists between the color components, and the signal level of each color component in each pixel position is as follows.

| PIXEL POSITION | R | G | B |
| --- | --- | --- | --- |
| 1 | 1 | 0 | −1 |
| 2 | 4 | 3 | 3 |
| 3 | 5 | 3 | 4 |
| 4 | −2 | −1 | 0 |
| 5 | −1 | 0 | −1 |

When respective correlation coefficients between R and G, G and B, and B and R are determined, the following correlation coefficients are obtained.

Correlation Coefficients

| R-G | G-B | B-R |
| --- | --- | --- |
| 0.964023 | 0.911685 | 0.873891 |

Hence, the minimum correlation coefficient r is 0.873891.

When the minimum correlation coefficient r is calculated in the manner described above, the noise reduction processing parameters T1, T2 are respectively corrected using the minimum correlation coefficient r in accordance with Equation (23).

$$T1 \leftarrow c(1-r)^2 T1$$

$$T2 \leftarrow c(1-r)^2 T2 \tag{23}$$

The noise reduction processing parameters T1, T2 are respectively corrected in accordance with Equation (23). When c=1, the correction coefficient Ct of the noise reduction processing parameters T1, T2 is $(1-r)^2$, giving 3.0677 in the case shown in FIG. 24 and 0.01590 in the case shown in FIG. 25.

Hence, when there is no correlation between the color components, as in FIG. 24, correction is performed such that the gap between the upper limit threshold and lower limit threshold of the soft threshold widens, and as a result, the signal is smoothed. When correlation exists between the color components as in FIG. 25, on the other hand, correction is performed such that the gap between the upper limit threshold and lower limit threshold of the soft threshold narrows, and as a result, only slight correction is performed such that the signal is maintained.

Hence, according to the fifth embodiment, the noise reduction processing parameters T1, T2 of the soft-thresholding processing are corrected in accordance with the correlation between the color components, and therefore, of the varying components included in the original image signal I, a component resulting from noise can be differentiated from a component resulting from structures such as textures included in the original image such that deterioration of the latter component can be suppressed through noise reduction processing. Further, by performing tone conversion on the noise-reduced image signal, noise amplification accompanying the tone conversion can be suppressed.

It should be noted that here, the noise distribution σ is determined from a representative signal level and the noise reduction processing parameters T1, T2 are set in accordance therewith. However, the signal level of the luminance component Y obtained by converting all of the color components or the signal level of a signal obtained by interpolating the G component, which most closely reflects the luminance component Y, may be used instead of the representative signal level.

Figure 26:
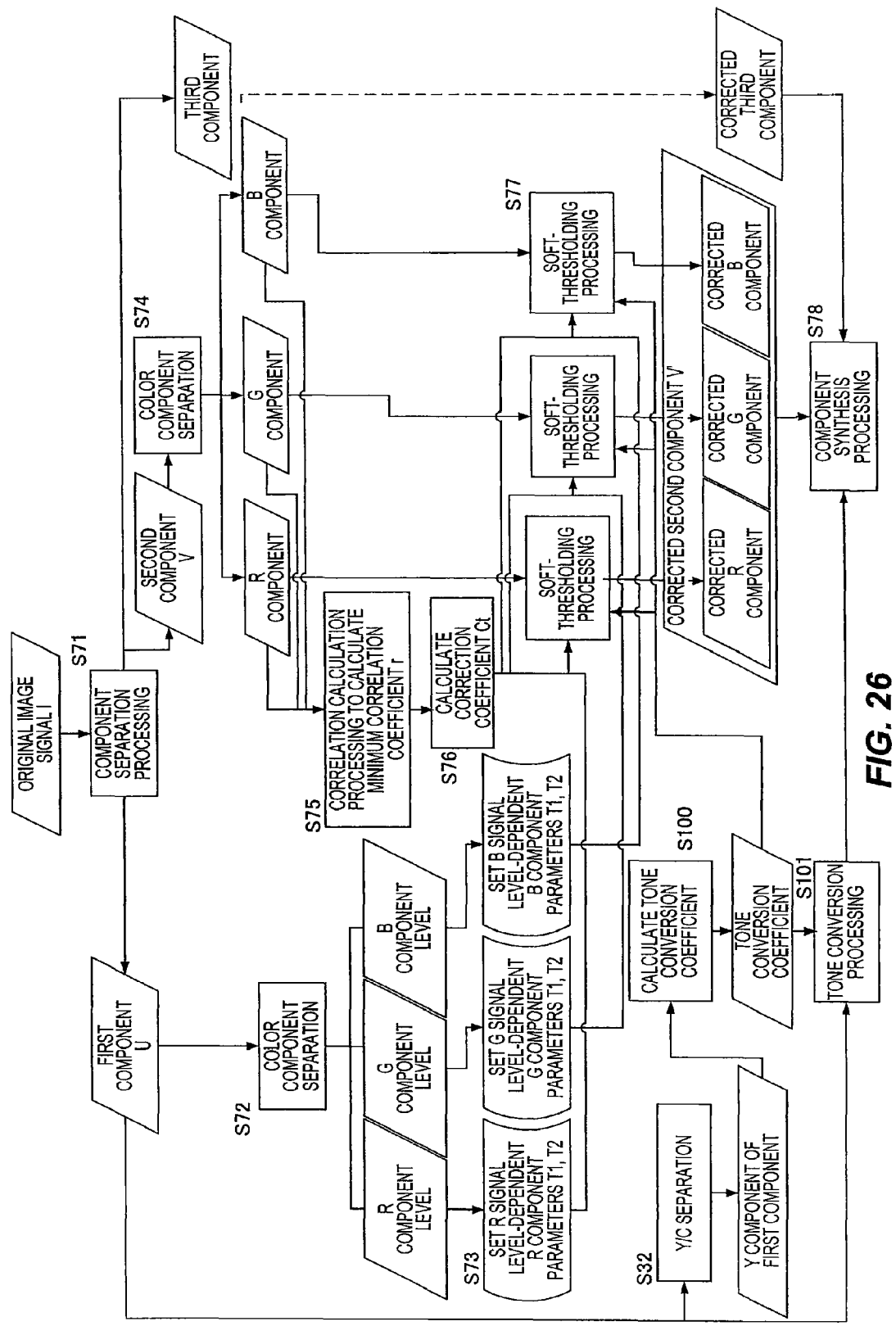
FIG. 26 is a flowchart corresponding to processing performed from a component separation unit to a component synthesis/tone conversion processing unit according to the fifth embodiment.

FIG. 26 shows a flow executed when the processing from the component separation unit 3001 to the component synthesis/tone conversion processing unit 3005 is realized by software processing. A software program is stored on a computer-readable storage medium or in a ROM of a computer, and the stored program is read to a RAM and executed by a CPU of the computer. For reference, processing performed in a case where the original image signal I is separated into three components is indicated in FIG. 26 by broken lines, but here, a case in which the original image signal I is separated into two components will be described.

In a step S71, the original image signal I is separated into the first component U and the second component V.

In a step S72, the first component U is separated into its respective color components, and the signal level of each color component is obtained.

In a step S73, the noise distribution σ is obtained on the basis of the signal level of each color component by referring to the signal level-noise distribution model shown in FIG. 3 or approximation data thereof. The noise reduction processing parameters T1, T2 are then set in relation to each color component in accordance with the noise distribution σ.

In a step S74, the second component V is separated into its respective color components.

In a step S75, the correlation between the respective color components of the second component V is calculated, whereupon the minimum correlation coefficient r is calculated.

In a step S76, the correction coefficient Ct of the noise reduction processing parameters T1, T2 of each color signal obtained in the step S73 is calculated on the basis of the minimum correlation coefficient r.

In the step S32, each color signal of the first component U is converted into the luminance signal Y and the color difference signals Cr, Cb.

In the step S100, a local region of a predetermined size centering on a target pixel is extracted from the luminance signal Y of the first component U, and a histogram is calculated in the local region on the basis of a signal level. A tone curve is then set on the basis of the calculated histogram, whereupon a tone conversion coefficient to be applied to each pixel during tone conversion processing based on the conversion curve is calculated.

In a step S77, the noise reduction processing parameters T1, T2 are corrected by multiplying the correction coefficient Ct by the noise reduction processing parameters T1, T2. The corrected second component V' is then obtained by performing soft-thresholding processing on each color component of the second component V using the corrected noise reduction processing parameters T1, T2.

In the step S101, tone conversion processing is performed by multiplying the first component U by the tone conversion coefficient.

In a step S78, the tone-converted first component U and the corrected second component V' are synthesized to obtain the synthesized component I' relating to the original image signal I.

According to the fifth embodiment, even when the original image signal I includes a plurality of color components, noise reduction processing and tone conversion processing resulting in high image quality can be performed while suppressing edge component deterioration, similarly to the first embodiment.

Further, by correcting the noise reduction processing parameters T1, T2 of the soft-thresholding processing in accordance with the correlation between the color components, a component resulting from noise and a component resulting from structures such as textures included in the original image can be distinguished from each other among the varying components included in the second component V, and deterioration of the latter component can be suppressed through noise reduction processing.

It should be noted that either addition type separation or multiplication type separation may be used as the component separation method. Moreover, the noise reduction processing executed on the second component V is not limited to soft-thresholding processing, and any signal level-dependent signal processing method may be applied.

Here, the noise distribution σ is obtained on the basis of the signal level of each color signal of the first component U and the noise reduction processing parameters T1, T2 are set in accordance therewith. However, the signal level of the luminance component Y separated from the first component U or the signal level of a signal obtained by interpolating the G component, which most closely reflects the luminance component Y, may be used instead of the signal level of each color signal of the first component U.

Furthermore, here, the tone conversion coefficient is calculated on the basis of the signal level of the luminance component Y of the first component U. However, the signal level of a signal obtained by interpolating the G component, which most closely reflects the luminance component Y, may be used instead of the signal level of the luminance component Y of the first component U.

Further, similarly to the first embodiment, second tone conversion processing, which is different to the tone conversion processing performed on the first component U, may be performed on the second component V or the corrected second component V'. By performing tone conversion processing on the second component V or corrected second component V' also, a more natural image is obtained.

[Sixth Embodiment]

Figure 27:
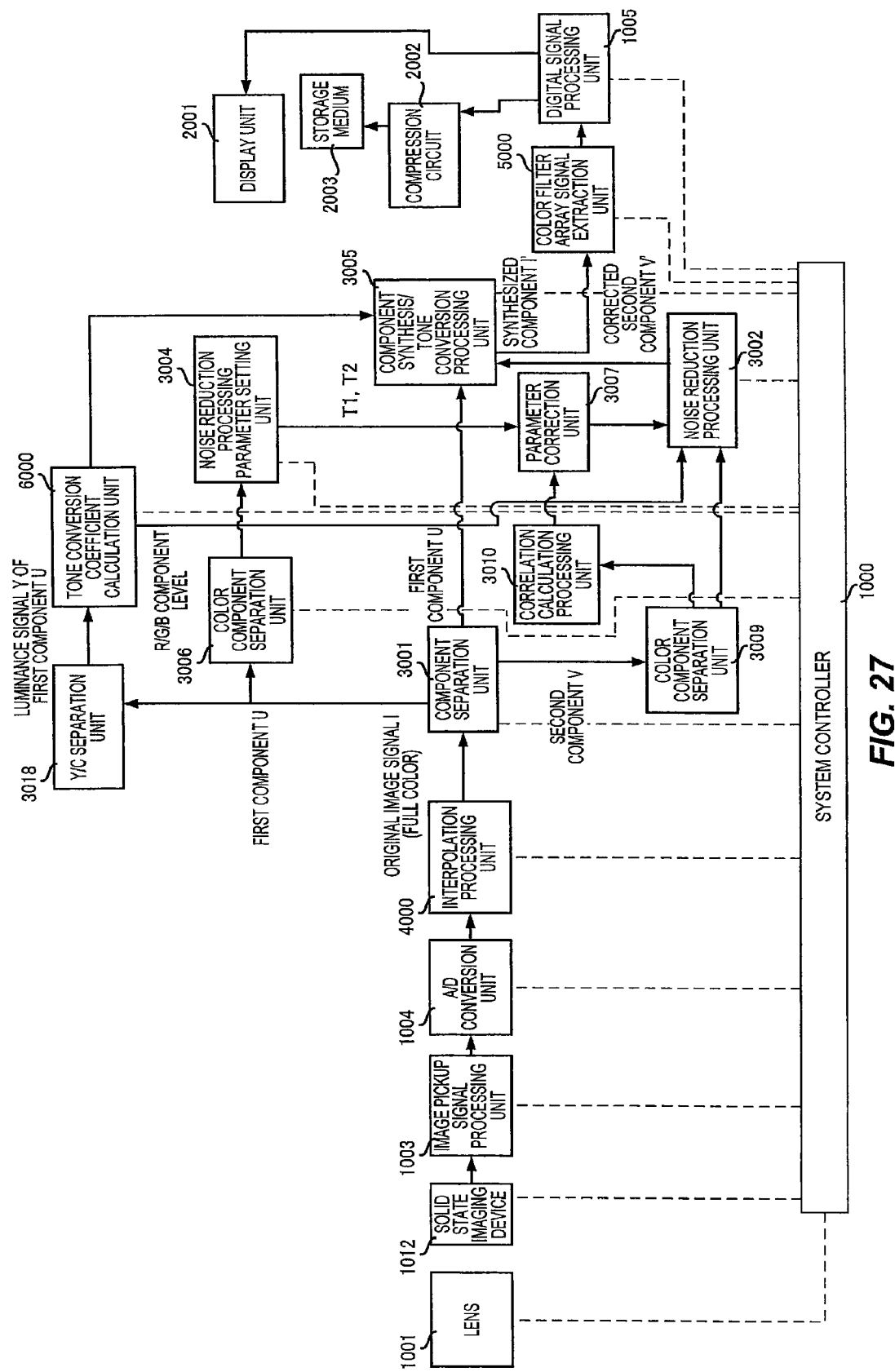
FIG. 27 is a system diagram showing an imaging apparatus according to a sixth embodiment.

FIG. 27 is a system diagram showing an imaging apparatus according to a sixth embodiment. Identical reference symbols have been allocated to constitutions that are identical to the constitutions of the preceding embodiments, and description thereof has been omitted.

In the sixth embodiment, similarly to the fourth embodiment, component separation and noise reduction processing are performed on the signal immediately after A/D conversion (i.e. prior to digital signal processing). In this case, in addition to component separation, a signal obtained via the color filter array is demosaiced by the interpolation processing unit 4000 in order to obtain a full color signal (the original image signal I).

Figure 22:
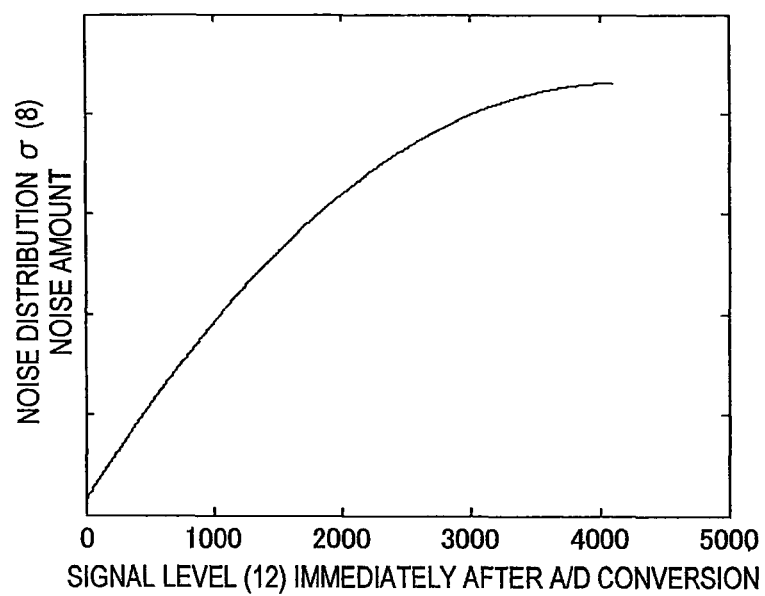
FIG. 22 is a model of signal level-noise distribution prior to digital signal processing.

Further, since component separation and noise reduction processing are performed prior to digital signal processing, the noise reduction processing parameter setting unit 3004 obtains the noise distribution σ of each color component using the model illustrated in FIG. 22 or Equations (12) and (13) as the signal level-noise distribution model of each color component instead of the model shown in FIG. 3. The noise reduction processing parameters T1, T2 of each color component are set at values corresponding to the noise distribution σ of the corresponding color component, for example values that are commensurate with the noise distribution σ.

The subsequent noise reduction processing employing soft-thresholding processing is similar to that of the other embodiments. Further, correction of the noise reduction processing parameters T1, T2 using the correlation between the color components is implemented in accordance with the minimum correlation coefficient r using Equation (23).

The corrected second component V' output from the noise reduction processing unit 3002 is synthesized with the first component U by the component synthesis/tone conversion processing unit 3005, whereupon the synthesized component I' is transmitted to a color filter array signal extraction unit 5000. The color filter array signal extraction unit 5000 extracts a position signal corresponding to the arrangement of the color filter array from the synthesized component I' and transmits an image signal to the digital signal processing unit 1005.

According to the sixth embodiment, even when the original image signal I includes a plurality of color components, noise reduction processing and tone conversion processing resulting in high image quality can be performed while suppressing edge component deterioration, similarly to the first embodiment.

Further, by correcting the noise reduction processing parameters T1, T2 of the soft-thresholding processing in accordance with the correlation between the color components, a component resulting from noise and a component resulting from structures such as textures included in the original image can be distinguished from each other among the varying components included in the second component V, and deterioration of the latter component can be suppressed through noise reduction processing.

Furthermore, since color separation and noise reduction processing are performed prior to digital image processing, the ability of the component separation unit 3001 to separate the noise component from the skeleton component is improved.

It should be noted that either addition type separation or multiplication type separation may be used as the component separation method. Moreover, the noise reduction processing executed on the second component V is not limited to soft-thresholding processing, and any signal level-dependent signal processing method may be applied.

Here, the noise distribution σ is obtained on the basis of the signal level of each color signal of the first component U and the noise reduction processing parameters T1, T2 are set in accordance therewith. However, the signal level of the luminance component Y obtained by converting all of the color components immediately after A/D conversion or the signal level of a signal obtained by interpolating the G component, which most closely reflects the luminance component Y, may be used instead of the signal level of each color signal of the first component U.

Furthermore, here, the tone conversion coefficient is calculated on the basis of the signal level of the luminance component Y of the first component U. However, the signal level of a signal obtained by interpolating the G component, which most closely reflects the luminance component Y, may be used instead of the signal level of the luminance component Y of the first component U.

Further, similarly to the first embodiment, second tone conversion processing, which is different to the tone conversion processing performed on the first component U, may be performed on the second component V or the corrected second component V'. By performing tone conversion processing on the second component V or corrected second component V' also, a more natural image is obtained.

[Seventh Embodiment]

Figure 28:
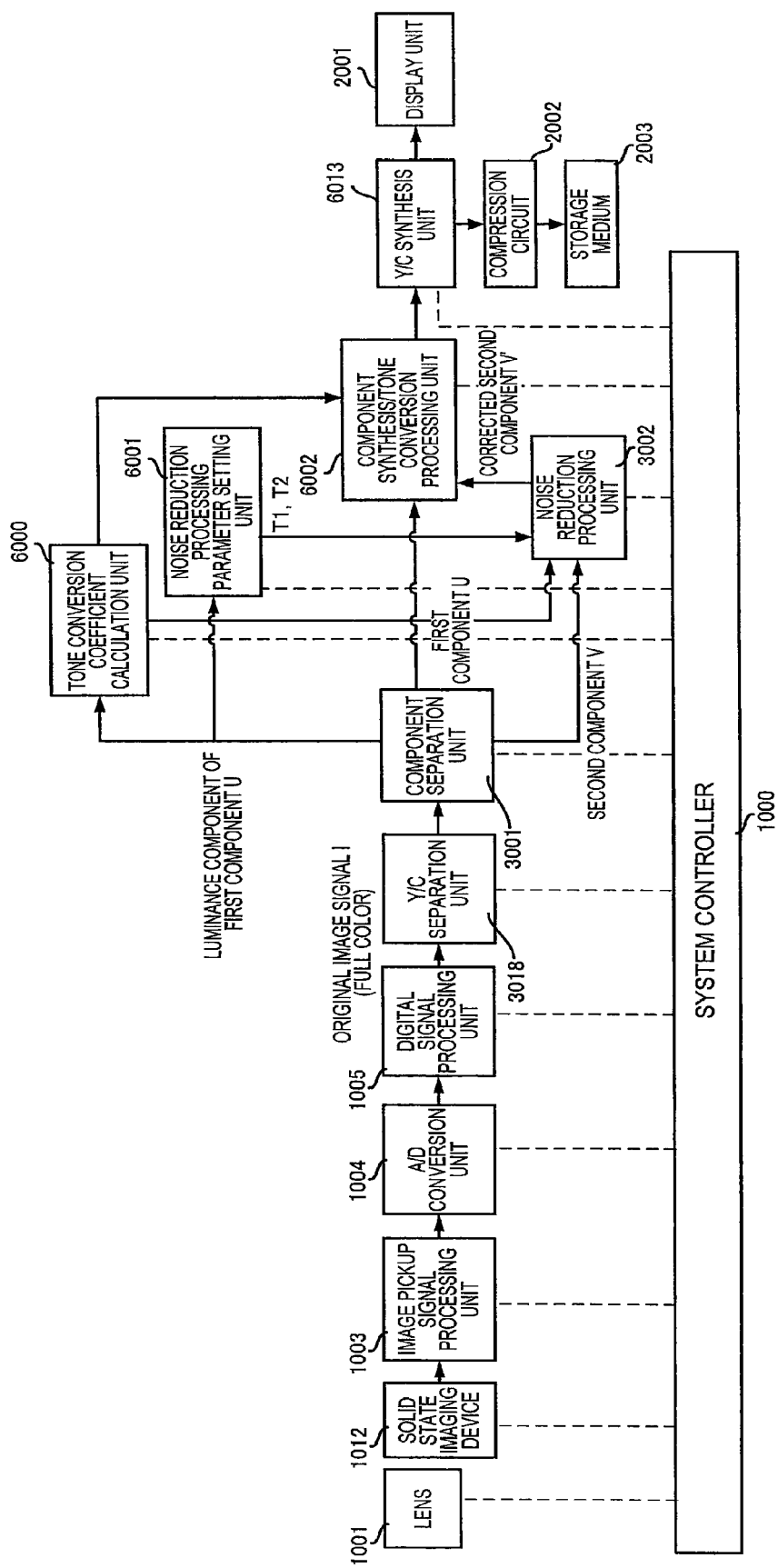
FIG. 28 is a system diagram showing an imaging apparatus according to a seventh embodiment.

FIG. 28 is a system diagram showing an imaging apparatus according to a seventh embodiment. Identical reference symbols have been allocated to constitutions that are identical to the constitutions of the preceding embodiments, and description thereof has been omitted.

The digital signal processing unit 1005 is connected to the component separation unit 3001 via the Y/C separation unit 3018. The component separation unit 3001 is connected to the tone conversion coefficient calculation unit 6000, a noise reduction processing parameter setting unit 6001, a component synthesis/tone conversion processing unit 6002, and the noise reduction processing unit 3002. The tone conversion coefficient calculation unit 6000 is connected to the component synthesis/tone conversion processing unit 6002 and the noise reduction processing unit 3002. The noise reduction processing parameter setting unit 6001 is connected to the noise reduction processing unit 3002. The noise reduction processing unit 3002 is connected to the component synthesis/tone conversion processing unit 6002. The component synthesis/tone conversion processing unit 6002 is connected to a Y/C synthesis unit 6013. The Y/C synthesis unit 6013 is connected to the display unit 2001 and the compression circuit 2002.

Next, a signal flow of the imaging apparatus shown in FIG. 28 will be described.

Image data generated by the digital signal processing unit 1005 are transmitted to the Y/C separation unit 3018 and converted into a signal of a predetermined color space. In this embodiment, a YCbCr color space is used as the color space, and conversion from an RGB signal to the YCbCr color space is performed on the basis of Equation (22). The separated luminance signal and color difference signals are set as Yorg, Cborg, Crorg, respectively.

An image signal Iorg including the luminance signal Yorg and the color difference signals Cborg, Crorg is transmitted from the Y/C separation unit 3018 to the component separation unit 3001.

The component separation unit 3001 separates the respective signals included in the image signal Iorg into the first component U and the second component V. A first component U_Yorg of the separated luminance signal is transmitted to the tone conversion coefficient calculation unit 6000 and the noise reduction processing parameter setting unit 6001. Further, first components U_Yorg, U_Cborg, U_Crorg of the luminance signal and color difference signals are transmitted to the component synthesis/tone conversion processing unit 6002, while second components V_Yorg, V_Cborg, V_Crorg of the luminance signal and color difference signals are transmitted to the noise reduction processing unit 3002.

The tone conversion coefficient calculation unit 6000 extracts a local region of a predetermined size centering on a target pixel from the first component U_Yorg of the luminance signal and calculates a histogram in the local region on the basis of a signal level. The tone conversion coefficient calculation unit 6000 then sets a tone curve on the basis of the calculated histogram, calculates a tone conversion coefficient to be applied to each pixel during tone conversion processing based on the conversion curve, and transmits the calculated tone conversion coefficient to the component synthesis/tone conversion processing unit 6002 and the noise reduction processing unit 3002.

Figure 29:
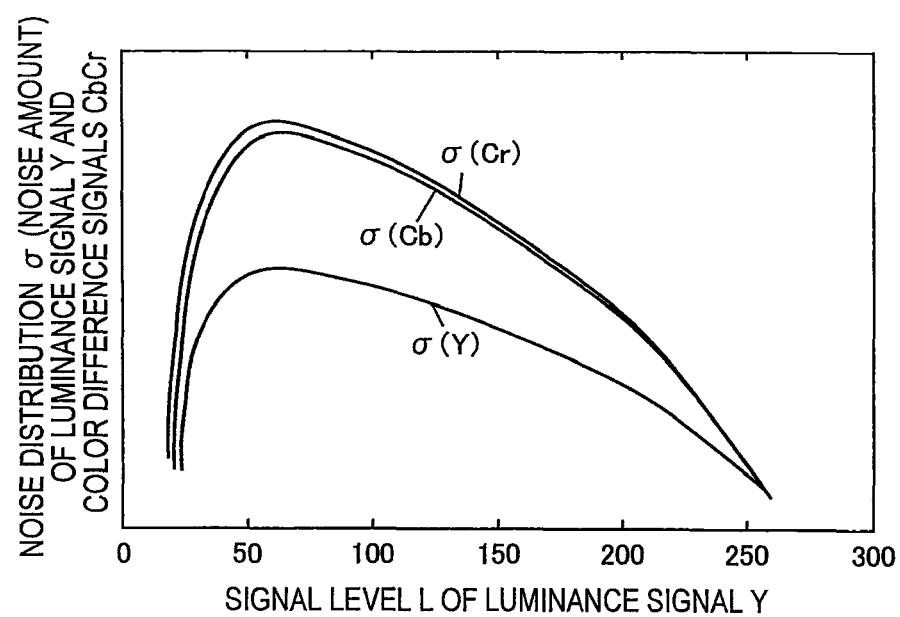
FIG. 29 is a model of noise distribution in a luminance signal Y and color difference signals Cb, Cr relative to the signal level of the luminance signal Y.

The noise reduction processing parameter setting unit 6001 obtains the noise distribution σ relating to the second components of the luminance signal Y and the color difference signals Cb, Cr in accordance with the signal level of the luminance signal Y by referring to a noise level-noise distribution model shown in FIG. 29 or approximation data thereof.

The noise reduction processing parameter setting unit 6001 then sets noise reduction processing parameters T1, T2 corresponding to the respective signals and transmits the set parameters T1, T2 to the noise reduction processing unit 3002. The noise reduction processing parameters T1, T2 are set at values corresponding to the noise distribution σ of the corresponding signal (the luminance signal Y or the color difference signals Cb, Cr), for example values commensurate with the noise distribution σ.

The noise reduction processing unit 3002 performs soft-thresholding processing (coring processing) on the second components V_Yorg, V_Cborg, V_Crorg using the noise reduction processing parameters T1, T2 of each signal and the tone conversion coefficient. The noise included in the second components V_Yorg, V_Cborg, V_Crorg can be reduced effectively by this processing. Obtained values are then transmitted to the component synthesis/tone conversion processing unit 6002 as corrected second components V'_Yorg, V'_Cborg, V'_Crorg of the luminance signal and the color difference signals. The component synthesis/tone conversion processing unit 6002 multiplies the first component U_Yorg by the tone conversion coefficient calculated by the tone conversion coefficient calculation unit 6000. The tone conversion coefficient calculation unit 6000 may also perform chroma adjustment by multiplying the first components U_Cborg, U_Crorg of the color difference signals by a predetermined coefficient based on the tone conversion coefficient. The tone conversion coefficient calculation unit 6000 then synthesizes the tone-converted first component U'_Yorg and the first components U'_Cborg, U'_Crorg with the corrected second components V'_Yorg, V'_Cborg, V'_Crorg at a predetermined ratio, for example 1:1, to obtain synthesized components Ytra, Cbtra, Crtra of the luminance signal and color difference signals having reduced noise relative to the original image signal I. The component synthesis/tone conversion processing unit 6002 transmits the converted synthesized components Ytra, Cbtra, Crtra to the Y/C synthesis unit 6013. The Y/C synthesis unit 6013 calculates an RGB signal on the basis of the synthesized components Ytra, Cbtra, Crtra using Equation (24), and then transmits the calculated RGB signal to the display unit 2001 and the compression circuit 2002.

$$R = Y + 1.40200 Cr$$

$$G = Y - 0.34414 Cb - 0.71414 Cr$$

$$B = Y + 1.77200 Cb \tag{24}$$

Figure 30:
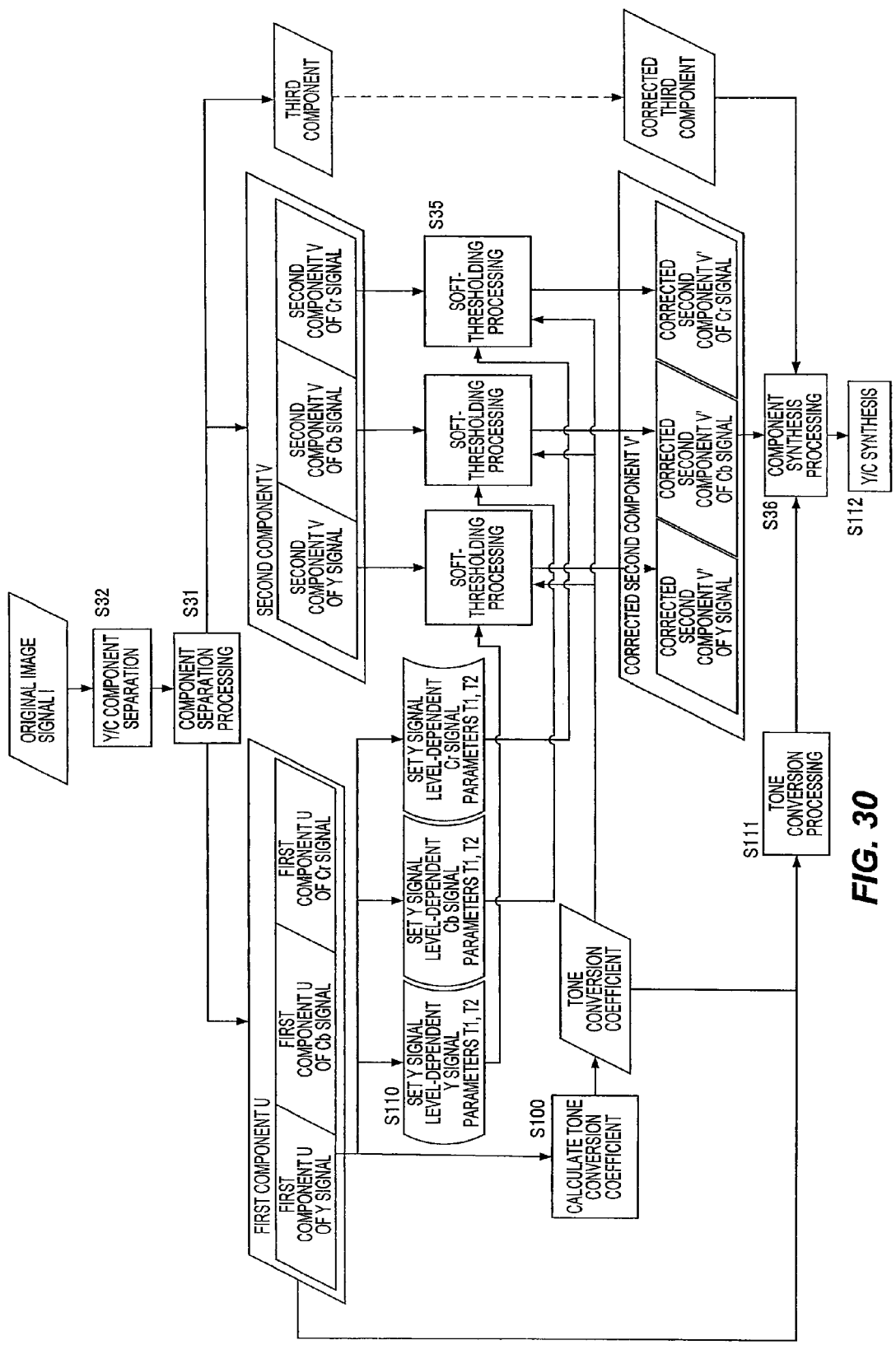
FIG. 30 is a flowchart corresponding to processing performed from a Y/C separation unit to a Y/C synthesis unit according to the seventh embodiment.

FIG. 30 shows a flow executed when the processing from the Y/C separation unit 3018 to the Y/C synthesis unit 6013 is realized by software processing. A software program is stored on a computer-readable storage medium or in a ROM of a computer, and the stored program is read to a RAM and executed by a CPU of the computer. For reference, processing performed in a case where the original image signal I is separated into three components is indicated in FIG. 30 by broken lines, but here, a case in which the original image signal I is separated into two components will be described.

In the step S32, the original image signal I is separated into the luminance signal Y and the color difference signals Cb, Cr.

In the step S31, the luminance signal Y and the color difference signals Cb, Cr are respectively separated into the first component U and the second component V.

In a step S110, the noise distribution σ is obtained in accordance with the signal level of the luminance component Y of the first component U by referring to the signal level-noise distribution model shown in FIG. 29 or approximation data thereof. The noise reduction processing parameters T1, T2 relating to the second components V of the luminance signal Y and the color difference signals Cb, Cr are then set in accordance with the noise distribution σ.

In the step S100, a local region of a predetermined size centering on a target pixel is extracted from the first component U of the luminance signal Y, and a histogram is calculated in the local region on the basis of a signal level. A tone curve is then set on the basis of the calculated histogram, whereupon a tone conversion coefficient to be applied to each pixel during tone conversion processing based on the conversion curve is calculated.

In the step S35, soft-thresholding processing using the noise reduction processing parameters T1, T2 set in the step S110 and the tone conversion coefficient calculated in the step S100 is performed individually on the respective second components V of the luminance signal Y and the color difference signals Cb, Cr to obtain the respective corrected second components V' of the luminance signal Y and the color difference signals Cb, Cr.

In a step S111, tone conversion processing is performed by multiplying the tone conversion coefficient by the first component of the luminance signal Y.

In the step S36, the tone conversion-processed first components U and the corrected second components V' are synthesized to obtain tone conversion-processed and noise reduction-processed synthesized components relating respectively to the luminance signal Y and the color difference signals Cb, Cr.

In a step S112, an RGB signal is generated from the respective synthesized components of the luminance signal Y and the color difference signals Cb, Cr on the basis of Equation (24).

According to the seventh embodiment, the luminance signal is processed alone, independently of the color difference signals, and therefore picture forming processing and correction processing can be performed such that no artificiality occurs in color representations such as hue and chroma. Furthermore, by processing the luminance signal alone, color noise amplification caused by the tone conversion processing can be suppressed in relation to color noise that is mistakenly separated into the first component U in cases where it is difficult to distinguish the color noise from an edge structure, for example color noise formed on a cluster, and as a result, high-quality noise reduction processing can be realized.

It should be noted that here, a YCbCr color space is used as the color space, but this invention is not limited thereto, and any other color space capable of defining a luminance signal, such as a CIE Lab color space or an HSL color space, may be used instead.

For example, when a CIE Lab color space is used, the luminance signal is defined by a lightness index L, and when an HSL color space is used, the luminance signal is defined using a luminance L.

Either addition type separation or multiplication type separation may be used as the component separation method. Moreover, the noise reduction processing executed on the second component V is not limited to soft-thresholding processing, and any signal level-dependent signal processing method may be applied.

Further, similarly to the first embodiment, second tone conversion processing, which is different to the tone conversion processing performed on the first component U, may be performed on the second component V or the corrected second component V'. By performing tone conversion processing on the second component V or corrected second component V' also, a more natural image is obtained.

[Eighth Embodiment]

Figure 31:
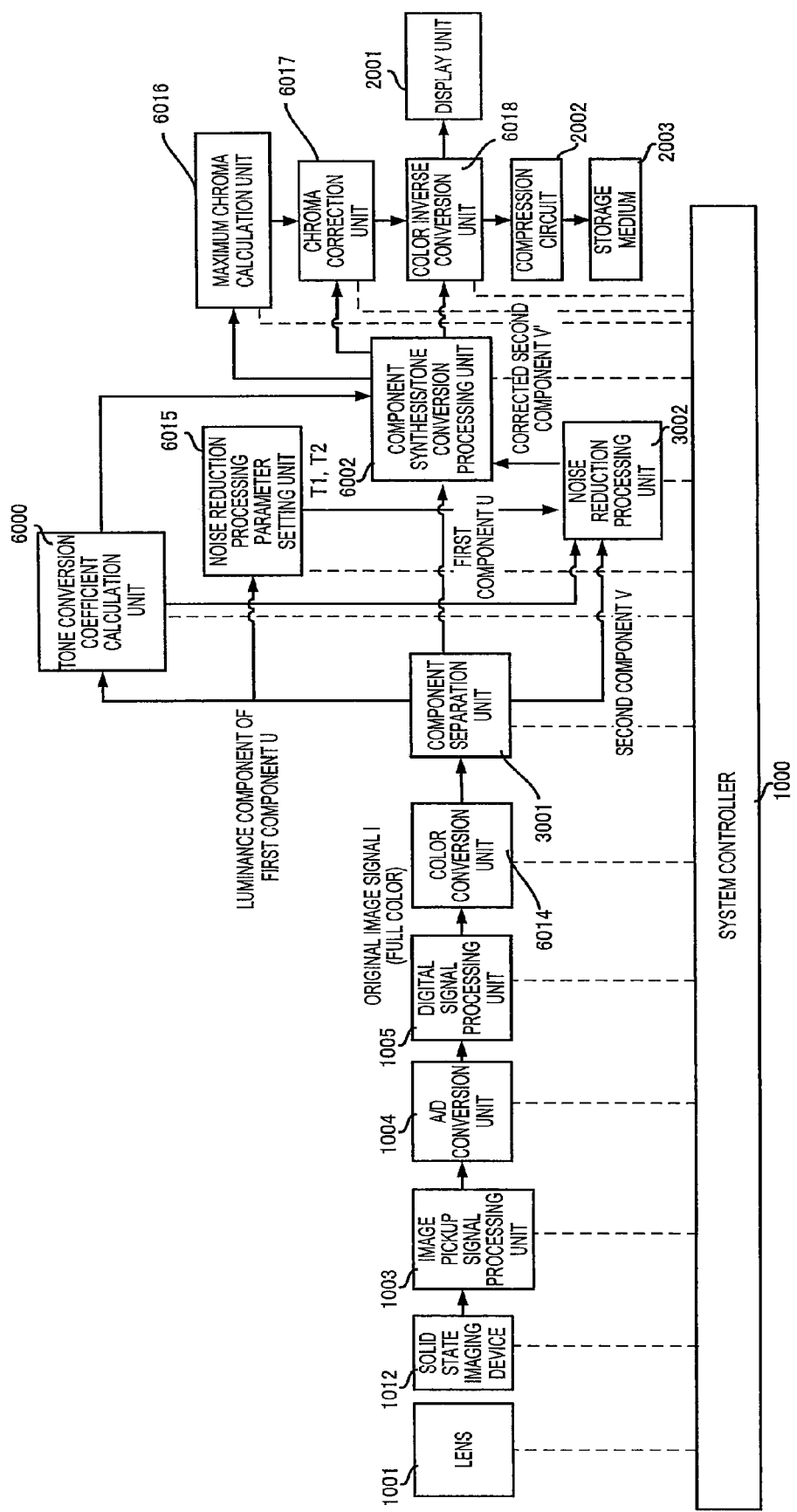
FIG. 31 is a system diagram showing an imaging apparatus according to an eighth embodiment.

FIG. 31 is a system diagram showing an imaging apparatus according to an eighth embodiment. Identical reference symbols have been allocated to constitutions that are identical to the constitutions of the preceding embodiments, and description thereof has been omitted.

The digital signal processing unit 1005 is connected to the component separation unit 3001 via a color conversion unit 6014. The component separation unit 3001 is connected to the tone conversion coefficient calculation unit 6000, a noise reduction processing parameter setting unit 6015, the component synthesis/tone conversion processing unit 6002, and the noise reduction processing unit 3002. The tone conversion coefficient calculation unit 6000 is connected to the component synthesis/tone conversion processing unit 6002 and the noise reduction processing unit 3002. The noise reduction processing parameter setting unit 6015 is connected to the noise reduction processing unit 3002. The noise reduction processing unit 3002 is connected to the component synthesis/tone conversion processing unit 6002. The component synthesis/tone conversion processing unit 6002 is connected to a maximum chroma calculation unit 6016, a chroma correction unit 6017, and a color inverse conversion unit 6018. The maximum chroma calculation unit 6016 is connected to the chroma correction unit 6017. The chroma correction unit 6017 is connected to the color inverse conversion unit. The color inverse conversion unit 6018 is connected to the display unit 2001 and the compression circuit 2002.

Next, a signal flow of the imaging apparatus shown in FIG. 31 will be described.

Image data generated by the digital signal processing unit 1005 are transmitted to the color conversion unit 6014 and converted into a signal in a predetermined color space. In this embodiment, a YCbCr color space is used as the color space, and conversion from an RGB signal to the YCbCr color space is performed on the basis of Equation (22). Further, the color conversion unit 6014 calculates a luminance signal V', a hue signal H, and a chroma signal C in the YCbCr color space on the basis of the following Equation (25).

$$V'=Y$$

$$H=\tan^{-1}(Cb/Cr)$$

$$C=(Cb^2+Cr^2)^{(1/2)} \qquad (25)$$

As shown in Equation (25), the luminance signal V' is equivalent to Y of the YCbCR color space, and therefore the luminance signal will be indicated by Y hereafter. The luminance signal, hue signal, and chroma signal converted by the color conversion unit 6014 are set as Yorg, Horg and Corg, respectively.

An image signal Iorg including the luminance signal Yorg, the hue signal Horg and the chroma signal Corg is transmitted from the color conversion unit 6014 to the component separation unit 3001. The component separation unit 3001 separates each of the signals included in the image signal Iorg into the first component U and the second component V. Following the separation processing, a first component U_Yorg of the luminance signal is transmitted to the tone conversion coefficient calculation unit 6000 and the noise reduction processing parameter setting unit 6015. Further, first components U_Yorg, U_Horg, U_Corg of the luminance signal, the hue signal, and the chroma signal are transmitted to the component synthesis/tone conversion processing unit 6002, while second components V_Yorg, V_Horg, V_Corg of the luminance signal, the hue signal, and the chroma signal are transmitted to the noise reduction processing unit 3002.

The tone conversion coefficient calculation unit 6000 extracts a local region of a predetermined size centering on a target pixel from the first component U_Yorg of the luminance signal and calculates a histogram in the local region on the basis of a signal level. The tone conversion coefficient calculation unit 6000 then sets a tone curve on the basis of the calculated histogram, calculates a tone conversion coefficient to be applied to each pixel during tone conversion processing based on the conversion curve, and transmits the calculated tone conversion coefficient to the component synthesis/tone conversion processing unit 6002 and the noise reduction processing unit 3002.

Figure 32:
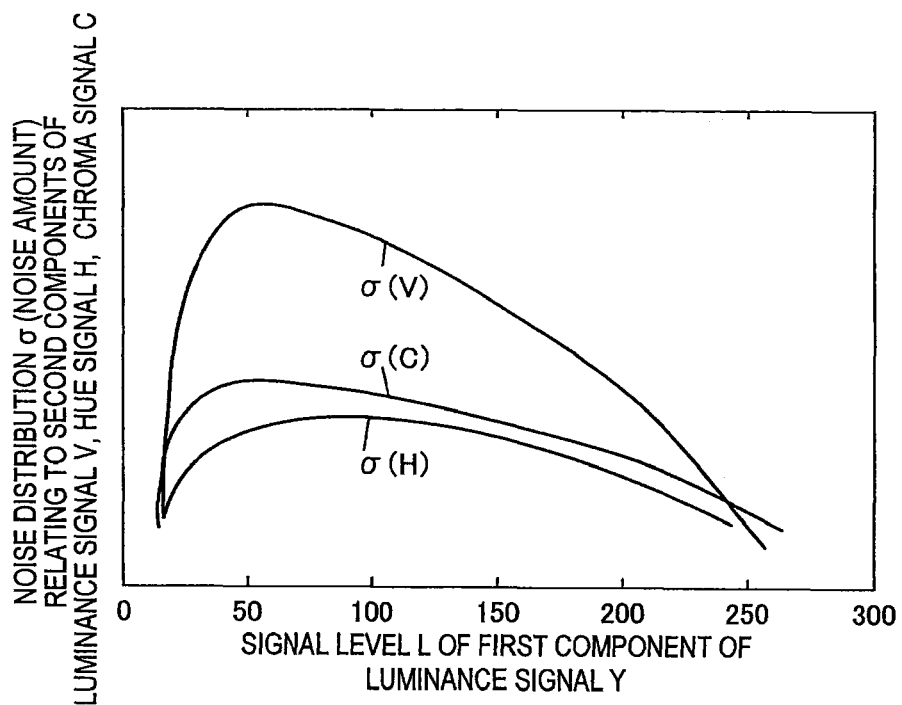
FIG. 32 is a model of noise distribution in a luminance signal V, a hue signal H, and a chroma signal C relative to the signal level of the luminance signal Y.

The noise reduction processing parameter setting unit 6015 obtains the noise distribution σ relating to the second components of the luminance signal, the hue signal, and the chroma signal in accordance with the signal level of the luminance signal Y by referring to a noise level-noise distribution model shown in FIG. 32 or approximation data thereof. The noise reduction processing parameter setting unit 6015 then sets the noise reduction processing parameters T1, T2 corresponding to the respective signals, and transmits the set parameters T1, T2 to the noise reduction processing unit 3002. The noise reduction processing parameters T1, T2 are set at values corresponding to the noise distribution σ of the corresponding signal, for example values commensurate with the noise distribution σ.

The noise reduction processing unit 3002 performs soft-thresholding processing (coring processing) on the second components V_Yorg, V_Horg, V_Corg using the noise reduction processing parameters T1, T2 of each signal and the tone conversion coefficient. The noise included in the second components V_Yorg, V_Horg, V_Corg can be reduced effectively by this processing. Obtained values are then transmitted to the component synthesis/tone conversion processing unit 6002 as corrected second components V'_Yorg, V'_Horg, V'_Corg of the luminance signal, the hue signal, and the chroma signal.

The component synthesis/tone conversion processing unit 6002 multiplies the first component U_Yorg by the tone conversion coefficient calculated by the tone conversion coefficient calculation unit 6000. The tone conversion coefficient calculation unit 6000 may also perform chroma adjustment by multiplying the first component U_Corg of the chroma signal by a predetermined coefficient obtained by weighting the tone conversion coefficient. A tone-converted first component U'_Yorg and the first components U_Horg, U_Corg are then synthesized with the corrected second components V'_Yorg, V'_Horg, V'_Corg at a predetermined ratio, for example 1:1, to obtain synthesized components Ytra, Htra, Ctra of the luminance signal, the hue signal, and the chroma signal having reduced noise relative to the original image signal I. The component synthesis/tone conversion processing unit 6002 transmits the synthesized components Ytra, Htra of the luminance signal and the hue signal to the color inverse conversion unit 6018 and the maximum chroma calculation unit 6016, and transmits the chroma signal Ctra to the chroma correction unit 6017. Further, the component synthesis/tone conversion processing unit 6002 calculates the pre-tone conversion luminance signal Yorg by adding together V_Yorg and U_Yorg, and transmits the calculated luminance signal Yorg to the maximum chroma calculation unit 6016.

The maximum chroma calculation unit 6016 calculates a first maximum chroma value maxCorg of the chroma signal relative to the luminance signal Yorg and the hue signal Htra, and a second maximum chroma value maxCtra of the chroma signal relative to the luminance signal Ytra and the hue signal Htra. A calculation method will be described in detail below. The first maximum chroma value maxCorg and second maximum chroma value maxCtra calculated by the maximum chroma calculation unit 6016 are transmitted to the chroma correction unit 6017. The chroma correction unit 6017 calculates a correction coefficient Kc for the chroma signal Ctra using the first maximum chroma value maxCorg and second maximum chroma value maxCtra, as shown in Equation (26).

$$Kc = \text{max}Ctra/\text{max}Corg \tag{26}$$

The chroma correction unit 6017 then calculates a corrected chroma signal Ctra' by multiplying the calculated correction coefficient Kc by the chroma signal Ctra transmitted from the component synthesis/tone conversion processing unit 6002. Further, an upper limit is applied to the corrected chroma signal Ctra' to ensure that it does not exceed the second maximum chroma value maxCtra, whereupon the corrected chroma signal Ctra' is transmitted to the color inverse conversion unit 6018. The color inverse conversion unit 6018 calculates a YCbCr signal on the basis of Ytra, Htra from the component synthesis/tone conversion processing unit 6002 and Ctra' from the chroma correction unit 6017, as shown in Equation (27).

$$Y = Ytra$$

$$Cb = Ctra' \cdot \sin(Htra)$$

$$Cr = Ctra' \cdot \cos(Htra) \tag{27}$$

Further, the color inverse conversion unit 6018 converts the YCbCr signal into an RGB signal using Equation (24), and then transmits the RGB signal to the display unit 2001 and the compression circuit 2002.

Figure 35:
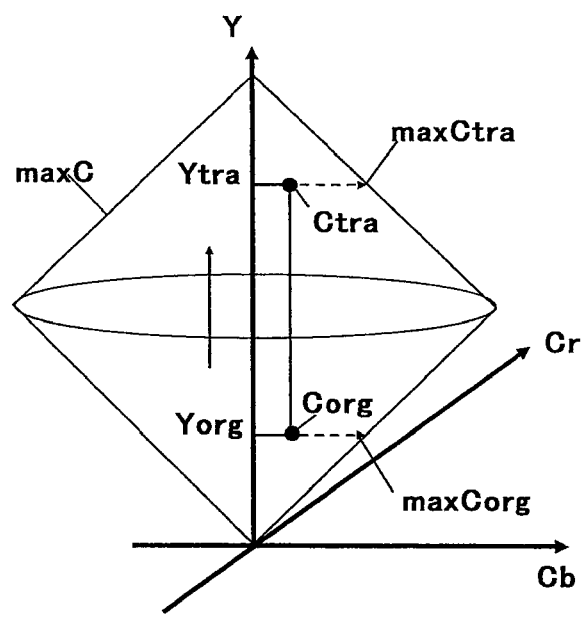
FIG. 35 is a view illustrating chroma signal correction in a YCbCr color space.

Next, referring to FIG. 35, an outer form of the YCbCr color space and the correction coefficient Kc shown in Equation (26) will be described.

When the luminance and hue in the YCbCr color space are determined (shown in the illustrated example as the luminance signal Yorg and the hue signal Horg of the input signal, the chroma signal of the input signal at this time being set as Corg), the maximum chroma value maxCorg that can be obtained within the range of the luminance signal Yorg and the hue signal Horg is determined. The maximum chroma value maxCorg is a value of C at a point where a half line, which is obtained by extending a line segment linking a first point at which (Y, H, C)=(Yorg, 0, 0) and a second point at which (Y, H, C)=(Yorg, Horg, Corg) in the direction of the second point, intersects an outer contour of the YCbCr color space. When the chroma signal Ctra obtained in a case where the luminance signal is converted from Yorg to Ytra but the hue remains constant is corrected such that a ratio thereof to the maximum chroma value is constant, natural color reproduction is obtained. In other words, when the luminance signal Ytra and the hue signal Horg are applied, the maximum chroma value maxCtra at that time is determined in the manner described above. Accordingly, the chroma signal Ctra for obtaining natural color reproduction preferably satisfies a relationship shown in a following Equation (28).

$$Corg : \text{max}Corg = Ctra : \text{max}Ctra \tag{28}$$

In other words, $$Ctra = (\text{max}Ctra/\text{max}Corg) \times Corg = Kc \times Corg \tag{29}$$

By multiplying the correction coefficient Kc by the chroma signal Corg, as shown in Equation (29), the luminance signal can be corrected while being modified.

Figure 33:
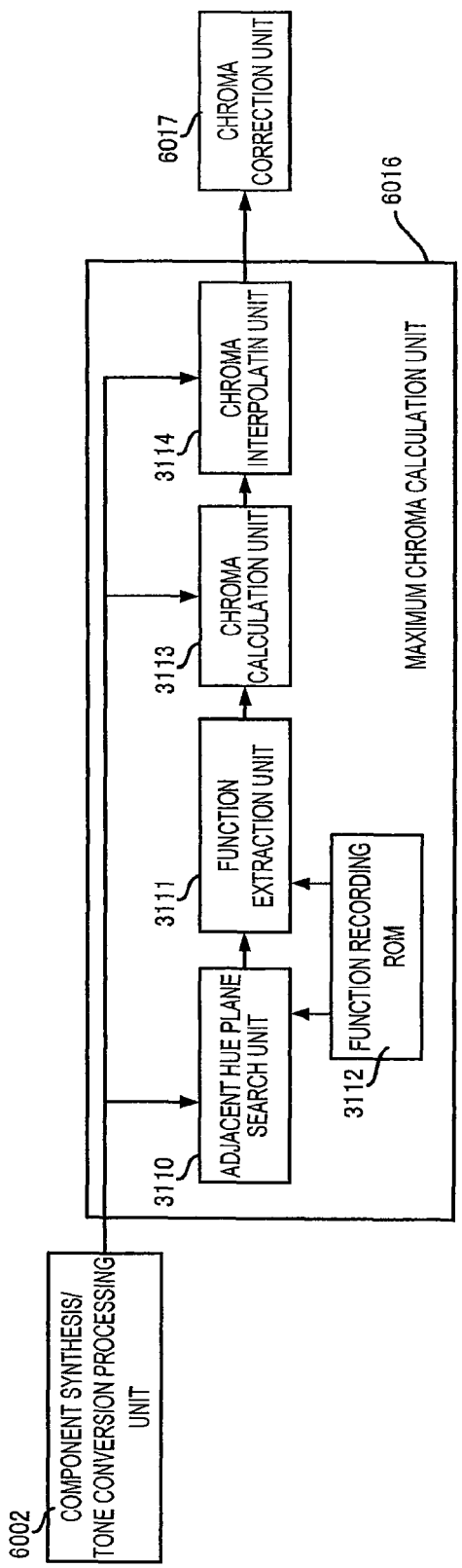
FIG. 33 is a constitutional diagram of a maximum chroma calculation unit.

Next, referring to FIG. 33, an example of the constitution of the maximum chroma calculation unit 6016 will be described in more detail.

The maximum chroma calculation unit 6016 comprises an adjacent hue plane search unit 3110 which searches a function recording ROM 3112, to be described below, for two hues that are adjacent to the hue signal Htra transmitted from the component synthesis/tone conversion processing unit 6002, a function extraction unit 3111 reads parameters and so on of a function corresponding to the two hues transmitted from the adjacent hue plane search unit 3110 from the function recording ROM 3112 to be described below, the function recording ROM 3112 in which parameters of functions for modeling maximum chroma values of a plurality of hue planes in the YCbCr color space are stored in advance, a chroma calculation unit 3113 which calculates maximum chroma values relating to the two hues on the basis of the luminance signals Yorg, Ytra from the component synthesis/tone conversion processing unit 6002 and the parameters from the function extraction unit 3111, and a chroma interpolation unit 3114 which determines a maximum chroma value relating to the hue signal Horg from the component synthesis/tone conversion processing unit 6002 through interpolation using the maximum chroma values relating to the two hues calculated by the chroma calculation unit 3113, and transmits the determined maximum chroma value to the chroma correction unit 6017.

Referring to FIGS. 36A-36F, function information relating to a maximum chroma value maxC of the YCbCr color space, which is recorded in the function recording ROM 3112, will now be described.

FIGS. 36B-36F are views respectively showing cross-sections of the chroma signal C and the luminance signal Y on respective hue planes of red (R), magenta (Ma), blue (B), cyan (Cy), green (G), and yellow (Ye) in the YCbCr color space. FIG. 36G is a view showing an arrangement of the respective hue planes on a plane. FIG. 36H is a view illustrating calculation of the maximum chroma value maxC through interpolation.

FIG. 36A is a view illustrating the maximum chroma value on each hue plane. Using a luminance Ti (i=R, Ma, B, Cy, G, Ye) (notations and so on in the drawing abbreviate Ma to M, Cy to C, and Ye to Y where appropriate) corresponding to a maximum chroma value on each hue plane as a threshold, a maximum chroma value maxCi is modeled by a high luminance function in parts where the luminance Y is equal to or greater than the luminance Ti and modeled by a low luminance function in parts where the luminance Y is equal to or smaller than the luminance Ti. It should be noted that the high luminance function and the low luminance function are set to give an identical maximum chroma value maxCi at the luminance Ti. Here, linear functions such as those shown in a following Equation (30) are used in the YCbCr color space as the function relating to the maximum chroma value maxC.

$$\mathrm{max}Ci = \alpha hi Y + \beta hi (Y \geq Ti)$$

$$\mathrm{max}Ci = \alpha li Y + \beta li (Y \leq Ti) \quad (30)$$

A hue Hi, the threshold luminance Ti, parameters αhi, βhi of the high luminance function, and parameters αli, βli of the low luminance function are stored in advance in the function recording ROM 3112.

Next, actions of the maximum chroma calculation unit 6016 shown in FIG. 33 will be described.

The adjacent hue plane search unit 3110 reads the hue signal Hi recorded in the function recording ROM 3112 and compares the read hue signal Hi with the hue signal Horg obtained from the component synthesis/tone conversion processing unit 6002. Then, as shown in FIG. 36H, the adjacent hue plane search unit 3110 searches for two hue signals Hj, Hk (j, k=R, Ma, B, Cy, G, Ye j≠k) located adjacent to the hue signal Horg on either side thereof, and transmits these two hues to the function extraction unit 3111. The function extraction unit 3111 extracts luminances Tj, Tk corresponding to the two hues, parameters αhj, βhj, αhk, βhk of the high luminance function, and parameters αlj, βlj, αlk, βlk of the low luminance function from the function recording ROM 3112 and transmits the extracted information to the chroma calculation unit 3113. The chroma calculation unit 3113 calculates maximum chroma values maxCorgj, maxCorg_k or maxCtra_j, maxCtra_k relating to the two hue signals Hj, Hk on the basis of the parameters and so on from the function extraction unit 3111 and the luminance signal Yorg from the color conversion unit 6014 or the luminance signal Ytra from the component synthesis/tone conversion processing unit 6002. Subsequent processing is identical whether performed on the luminance signal Yorg or the luminance signal Ytra, and therefore the two maximum chroma values are set as maxCj, maxCk. The maximum chroma values maxCj, maxCk calculated by the chroma calculation unit 3113 are transmitted to the chroma interpolation unit 3114. The chroma interpolation unit 3114 uses the maximum chroma values maxCj, maxCk to calculate through interpolation a maximum chroma value maxC relating to the hue signal Horg from the component synthesis/tone conversion processing unit 6002 in accordance with Equation (31), as shown in FIG. 36H.

$$\mathrm{max}C = \mathrm{max}Cj(\mathrm{Horg}-Hk)/(Hj-Hk) + \mathrm{max}Ck(Hj-\mathrm{Horg})/(Hj-Hk) \quad (31)$$

It is assumed that the hue has a relationship of Hj>Horg>Hk.

The maximum chroma value is calculated using Equation (31) on the luminance signals Yorg and Ytra from the component synthesis/tone conversion processing unit 6002, and is therefore performed twice. As a result, the first maximum chroma value maxCorg and second maximum chroma value maxCtra are calculated. The first maximum chroma value maxCorg and second maximum chroma value maxCtra calculated in this manner are transmitted from the chroma interpolation unit 3114 to the chroma correction unit 6017.

Figure 34:
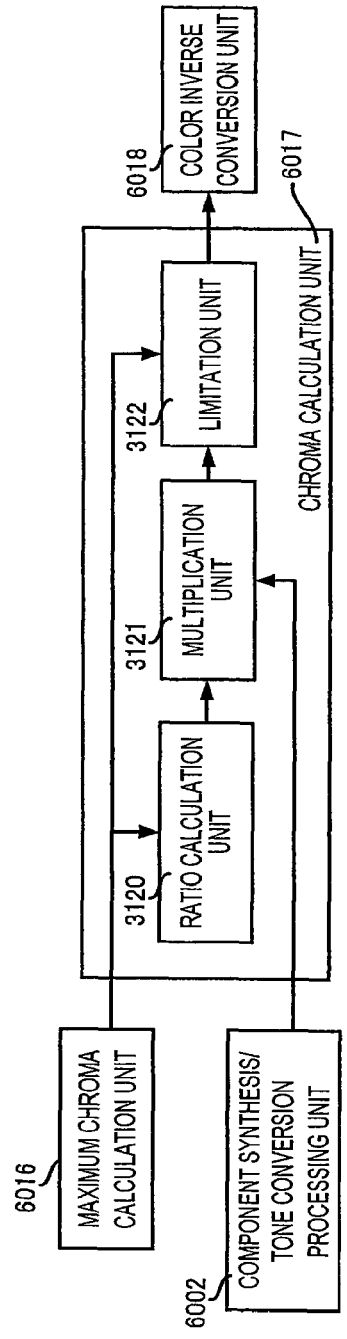
FIG. 34 is a constitutional diagram of a chroma correction unit.

Next, referring to FIG. 34, an example of the constitution of the chroma correction unit 6017 will be described in more detail. The chroma correction unit 6017 comprises a ratio calculation unit 3120 which calculates the correction coefficient Kc on the basis of the first maximum chroma value maxCorg and second maximum chroma value maxCtra transmitted from the maximum chroma calculation unit 6016, as shown in Equation (26), a multiplication unit 3121 which calculates the chroma signal Ctra' that has been corrected by multiplying the correction coefficient Kc calculated by the ratio calculation unit 3120 by the chroma signal Ctra from the component synthesis/tone conversion processing unit 6002, and a limitation unit 3122 which limits the chroma signal Ctra' calculated by the multiplication unit 3121 so that it does not exceed the second maximum chroma value maxCtra calculated by the maximum chroma calculation unit 6016 and transmits the limited chroma signal Ctra' to the color inverse conversion unit 6018.

Here, the limitation unit 3122 replaces the chroma signal Ctra' with the second maximum chroma value maxCtra when the chroma signal Ctra' exceeds the second maximum chroma value maxCtra after being multiplied by the correction coefficient Kc in the multiplication unit 3121.

The limitation unit 3122 may also converts the chroma signal Ctra' into a value between the second maximum chroma value maxCtra and a predetermined threshold not exceeding the second maximum chroma value maxCtra when the chroma signal Ctra' exceeds the threshold after being multiplied by the correction coefficient Kc in the multiplication unit 3121.

Figure 37:
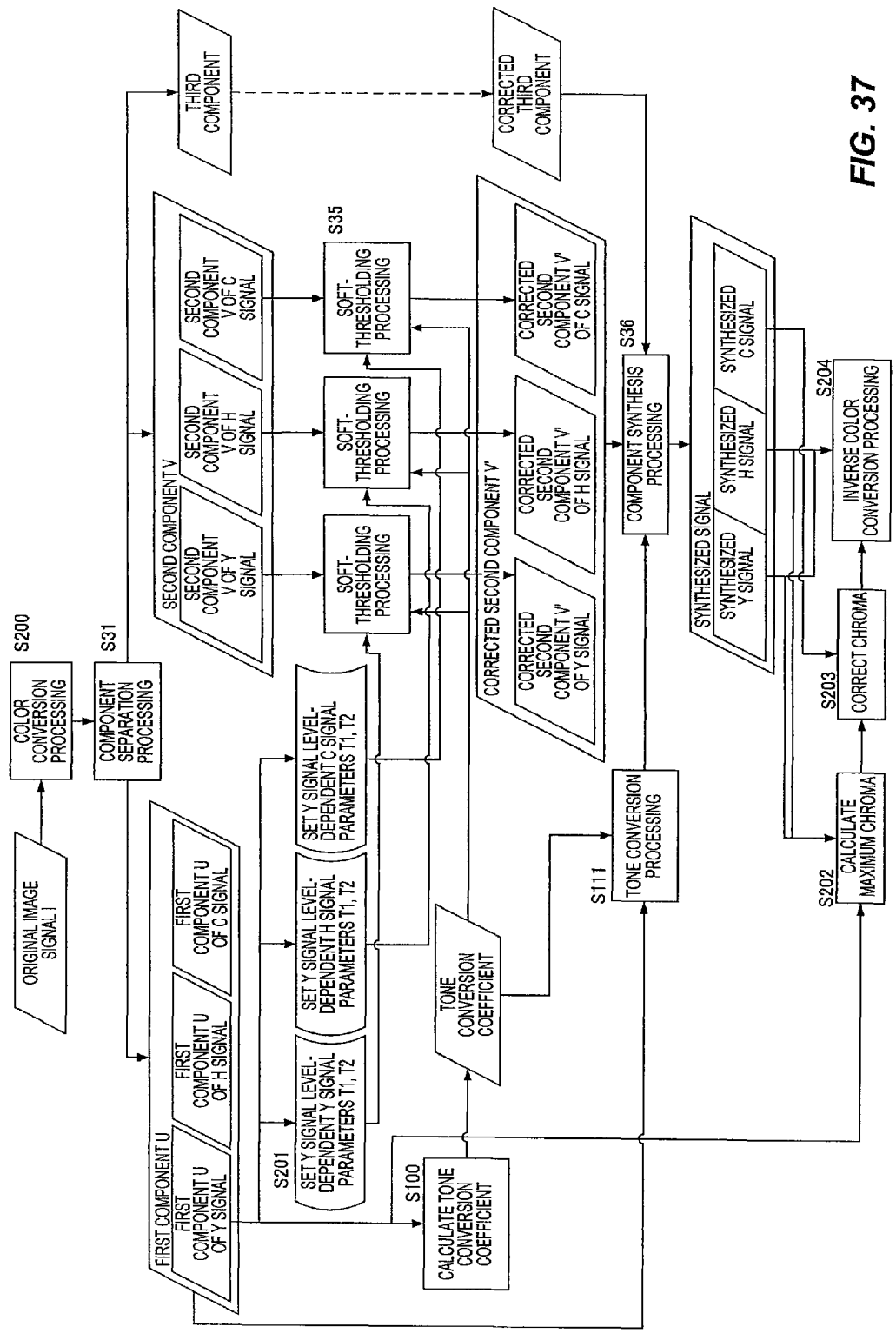
FIG. 37 is a flowchart corresponding to processing performed from a color conversion unit to a color inverse convention unit according to the eighth embodiment.

FIG. 37 shows a flow executed when the processing from the color conversion unit 6014 to the color inverse conversion unit 6018 is realized by software processing. A software program is stored on a computer-readable storage medium or in a ROM of a computer, and the stored program is read to a RAM and executed by a CPU of the computer. For reference, processing performed in a case where the original image signal I is separated into three components is indicated in FIG. 37 by broken lines, but here, a case in which the original image signal I is separated into two components will be described.

In a step S200, the original image signal I is separated into the luminance signal V' (Y hereafter), the hue signal H, and the chroma signal C.

In the step S31, the luminance signal Y, the hue signal H, and the chroma signal C are respectively separated into the first component U and the second component V.

In a step S201, the noise distribution σ is obtained in accordance with the signal level of the luminance component Y of the first component U by referring to the signal level-noise distribution model shown in FIG. 32 or approximation data thereof. The noise reduction processing parameters T1, T2 are then set relative to the luminance signal Y, the hue signal H, and the chroma signal C, respectively, in accordance with the noise distribution σ.

In the step S100, a local region of a predetermined size centering on a target pixel is extracted from the first component U of the luminance signal Y, and a histogram is calculated in the local region on the basis of a signal level. A tone curve is then set on the basis of the calculated histogram, whereupon a tone conversion coefficient to be applied to each pixel during tone conversion processing based on the conversion curve is calculated.

In the step S35, soft-thresholding processing using the noise reduction processing parameters T1, T2 set in the step S201 and the tone conversion coefficient calculated in the step S100 is performed individually on the respective second components V of the luminance signal Y, hue signal H and chroma signal C, whereby the corrected second component V' is obtained in relation to each of the luminance signal Y, the hue signal H, and the chroma signal C.

In the step S111, tone conversion processing is performed by multiplying the tone conversion coefficient by the first component of the luminance signal Y.

In the step S36, the tone conversion-processed first components U and the corrected second components V' are synthesized to obtain tone conversion-processed and noise reduction-processed synthesized components relating respectively to the luminance signal Y, the hue signal H, and the chroma signal C.

In a step S202, a maximum chroma value is calculated on the basis of the pre- and post-tone conversion luminance signal Y and the hue signal H.

In a step S203, the chroma signal C is corrected on the basis of the maximum chroma value calculated in S202.

In a step S204, an RGB signal is generated from the respective synthesized components of the luminance signal Y, hue signal H, and chroma signal C on the basis of Equation (24).

According to the eighth embodiment, the luminance signal is processed independently of the chroma signal and so on, and therefore picture forming processing and correction processing can be performed such that no artificiality occurs in the color signals. Furthermore, by processing the luminance signal alone, color noise amplification caused by the tone conversion processing can be suppressed in relation to color noise that is mistakenly separated into the first component U in cases where it is difficult to distinguish the color noise from an edge structure, such as color noise formed on a cluster, and as a result, high-quality noise reduction processing can be realized.

A linear function is used as the function of the maximum chroma value recorded in the function recording ROM 3112, but this invention is not limited thereto, and an arbitrary function such as a polynomial function, a power function, or a spline function may be employed in accordance with the required precision.

Here, six hue planes, namely red (R), magenta (Ma), blue (B), cyan (Cy), green (G) and yellow (Ye), are used as the functionalized hue planes, but this invention is not limited thereto, and various constitutions may be employed in accordance with the application, aim, and so on. For example, three hue planes, namely red (R), blue (B) and green (G), may be used when prioritizing cost reduction, and 12 hue planes obtained by adding intermediate hue planes to the six hue planes described above may be employed when prioritizing precision.

Further, a table may be used instead of a function during color space conversion.

Furthermore, a YCbCr color space is used as the color space, but this invention is not limited thereto, and any other color space capable of defining a luminance signal, a chroma signal and a hue signal, such as a CIE Lab color space or an HSL color space, may be used instead.

For example, when a CIE Lab color space is used, the luminance signal V is defined by a lightness index L while the hue signal H and chroma signal C are defined using perceived colors a, b, as shown in Equation (32).

$$V = L$$

$$H = \tan^{-1}(b/a)$$

$$C = (a \cdot a + b \cdot b)^{(1/2)} \quad (32)$$

When an HSL color space is used, the luminance signal V is defined using a luminance L, the hue signal H is defined using a hue H, and the chroma signal C is defined using a chroma S.

Either addition type separation or multiplication type separation may be used as the component separation method. Moreover, the noise reduction processing executed on the second component V is not limited to soft-thresholding processing, and any signal level-dependent signal processing method may be applied.

Further, similarly to the first embodiment, second tone conversion processing, which is different to the tone conversion processing performed on the first component U, may be performed on the second component V or the corrected second component V'. By performing tone conversion processing on the second component V or corrected second component V' also, a more natural image is obtained.

[Ninth Embodiment]

Figure 38:
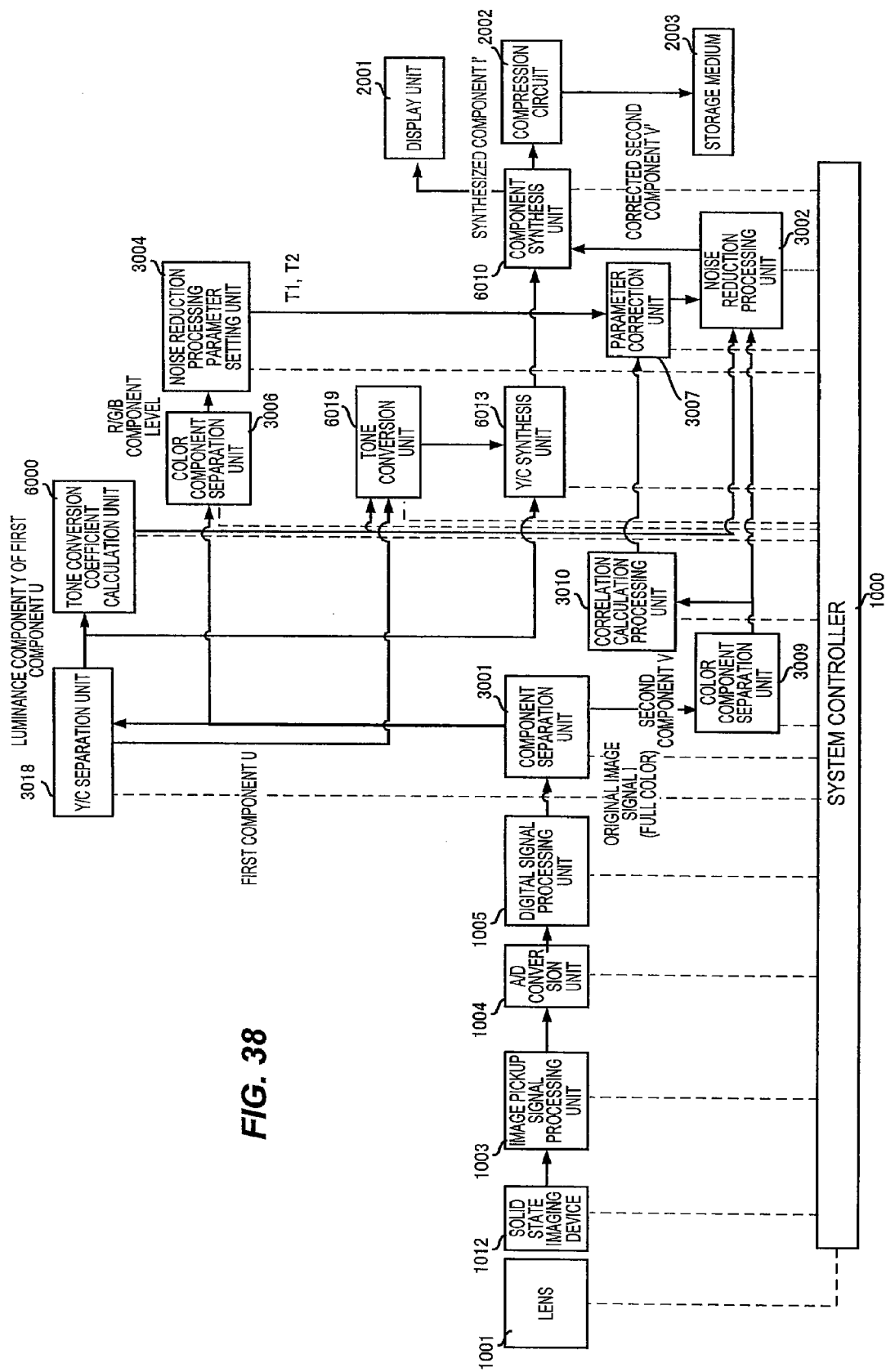
FIG. 38 is a system diagram showing an imaging apparatus according to a ninth embodiment.

FIG. 38 is a system diagram showing an imaging apparatus according to a ninth embodiment.

Identical reference symbols have been allocated to constitutions that are identical to the constitutions of the preceding embodiments, and description thereof has been omitted.

In the ninth embodiment, correction of the noise reduction processing parameters T1, T2 in accordance with the correlation between the color components and soft-thresholding processing are performed in an identical manner to the fifth embodiment, but in contrast to the fifth embodiment, tone conversion is performed on the luminance signal Y of the first component U.

The Y/C separation unit 3018 is connected to the tone conversion coefficient calculation unit 6000, a tone conversion unit 6019, and the Y/C synthesis unit 6013. The tone conversion unit 6019 is connected to the Y/C synthesis unit 6013. The Y/C synthesis unit 6013 is connected to a component synthesis unit 6010. The component synthesis unit 6010 is connected to the display unit 2001 and the compression circuit 2002.

Next, a signal flow of the imaging apparatus shown in FIG. 38 will be described.

The first component U separated from the original image signal I by the component separation unit 3001 is transmitted to the Y/C separation unit 3018 and the color component separation unit 3006.

The Y/C separation unit 3018 converts the transmitted signal into a signal of a predetermined color space. In this embodiment, a YCbCr color space is used as the color space, and conversion from an RGB signal to the YCbCr color space is performed on the basis of Equation (22).

A luminance signal and color difference signals output from the Y/C separation unit 3018 are set as U_Yorg, U_Cborg, and U_Crorg, respectively.

The luminance signal U_Yorg is transmitted to the tone conversion coefficient calculation unit 6000 and the tone conversion unit 6019, while the color difference signals U_Cborg and U_Crorg are transmitted to the Y/C synthesis unit 6013.

The tone conversion coefficient calculation unit 6000 extracts a local region of a predetermined size centering on a target pixel from the luminance signal U_Yorg and calculates a histogram in the local region on the basis of a signal level. The tone conversion coefficient calculation unit 6000 then sets a tone curve on the basis of the calculated histogram, calculates a tone conversion coefficient to be applied to each pixel during tone conversion processing based on the conversion curve, and transmits the calculated tone conversion coefficient to the tone conversion unit 6019 and the noise reduction processing unit 3002.

The tone conversion unit 6019 performs tone conversion processing on the luminance signal U_Yorg of the first component by multiplying the luminance signal U_Yorg by the tone conversion coefficient calculated by the tone conversion coefficient calculation unit 6000. The tone conversion-processed luminance signal U_Yorg is then transmitted to the Y/C synthesis unit 6013.

The Y/C synthesis unit 6013 calculates an RGB signal on the basis of the luminance signal U_Yorg from the tone conversion unit 6019 and the color difference signals U_Cborg, U_Crorg from the Y/C separation unit 3018 in accordance with Equation (24), and transmits the calculated RGB signal to the component synthesis unit 6010.

The color component separation unit 3006 obtains the signal level of each color component. The noise reduction processing parameter setting unit 3004 obtains the noise distribution σ of each color component on the basis of the signal level of each color component by referring to a signal level-noise distribution model. The noise reduction processing parameters T1, T2 of each color component are then set at values corresponding to the noise distribution σ of the corresponding color component, for example values commensurate with the noise distribution σ.

The second component V separated from the original image signal I is separated into its respective color components by the color component separation unit 3009 and then transmitted to the correlation calculation processing unit 3010. The correlation calculation processing unit 3010 calculates the minimum correlation coefficient r by performing correlation calculation processing on each color signal of the second component V in a similar manner to the fifth embodiment.

The parameter correction unit 3007 calculates the correction coefficient Ct of the noise reduction processing parameters T1, T2 on the basis of the minimum correlation coefficient r, and multiplies the calculated correction coefficient Ct by the noise reduction processing parameters T1, T2 of each color component to correct the noise reduction processing parameters T1, T2 of each color component.

The noise reduction processing unit 3002 performs soft-thresholding processing using the corrected noise reduction processing parameters T1, T2 and the tone conversion coefficient individually on each color component of the second component V transmitted from the color component separation unit 3009 to reduce the noise included in each color component. The noise reduction processing unit 3002 then outputs an obtained signal to the component synthesis unit 6010 as the corrected second component V'.

The component synthesis unit 6010 synthesizes the tone-converted first component U with the corrected second component V' at a predetermined ratio, for example 1:1, to obtain the synthesized component I' subjected to noise reduction and tone conversion processing relative to the original image signal I.

Figure 39:
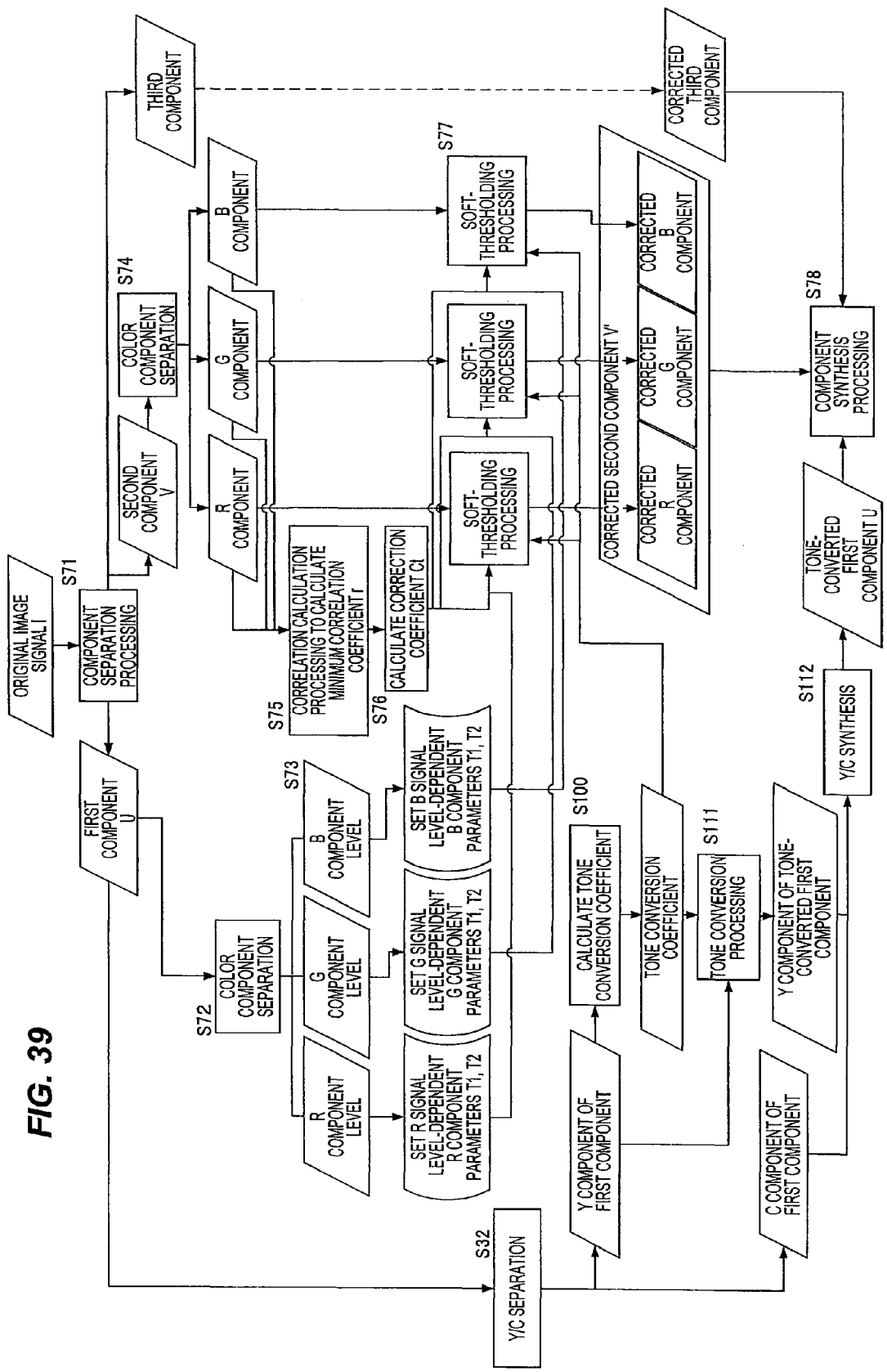
FIG. 39 is a flowchart corresponding to processing performed from a component separation unit to a component synthesis unit according to the ninth embodiment.

FIG. 39 shows a flow executed when the processing from the component separation unit 3001 to the component synthesis unit 6010 is realized by software processing. A software program is stored on a computer-readable storage medium or in a ROM of a computer, and the stored program is read to a RAM and executed by a CPU of the computer. For reference, processing performed in a case where the original image signal I is separated into three components is indicated in FIG. 39 by broken lines, but here, a case in which the original image signal I is separated into two components will be described.

In the step S71, the original image signal I is separated into the first component U and the second component V.

In the step S72, the first component is separated into its respective color components and the signal level of each color component is obtained.

In the step S73, the noise distribution σ is obtained on the basis of the signal level of each color component by referring to the signal level-noise distribution model shown in FIG. 3 or approximation data thereof. The noise reduction processing parameters T1, T2 are then set for each color component in accordance with the noise distribution σ.

In the step S74, the second component V is separated into its respective color components.

In the step S75, the correlation between the color components of the second component V is calculated, whereupon the minimum correlation coefficient r is calculated.

In the step S76, the correction coefficient Ct of the noise reduction processing parameters T1, T2 of each of the color signals obtained in the step S73 is calculated on the basis of the minimum correlation coefficient r.

In the step S32, the first component U is separated into the luminance signal U_Yorg and the color difference signals U_Cborg, U_Crorg.

In the step S100, a local region of a predetermined size centering on a target pixel is extracted from the luminance signal U_Yorg of the first component U, and a histogram is calculated in the local region on the basis of a signal level. A tone curve is then set on the basis of the calculated histogram, whereupon a tone conversion coefficient to be applied to each pixel during tone conversion processing based on the conversion curve is calculated.

In the step S77, the noise reduction processing parameters T1, T2 are corrected by multiplying the correction coefficient Ct by the noise reduction processing parameters T1, T2. Soft-thresholding processing using the corrected noise reduction processing parameters T1, T2 is then performed on each color component of the second component V to obtain the corrected second component V'.

In the step S111, tone conversion processing is performed by multiplying the tone conversion coefficient by the luminance signal U_Yorg of the first component U.

In the step S112, an RGB signal of the first component U is generated from the tone-converted luminance signal U_Yorg and color difference signals U_Cborg, U_Crorg of the first component U on the basis of Equation (24).

In the step S78, the tone-converted first component U and the corrected second component V' are synthesized to obtain the synthesized component I' relative to the original image signal I.

According to the ninth embodiment, the luminance signal of the first component U is processed independently of the chroma signal and so on, and therefore picture forming processing and correction processing can be performed such that no artificiality occurs in the color signals. Furthermore, by processing the luminance signal alone, color noise amplification caused by the tone conversion processing can be suppressed in relation to color noise that is mistakenly separated into the first component U in cases where it is difficult to distinguish the color noise from an edge structure, such as color noise formed on a cluster, and as a result, high-quality noise reduction processing can be realized.

Either addition type separation or multiplication type separation may be used as the component separation method. Moreover, the noise reduction processing executed on the second component V is not limited to soft-thresholding processing, and any signal level-dependent signal processing method may be applied.

It should be noted that here, the noise distribution σ is obtained on the basis of the signal level of each color signal of the first component U, and the noise reduction processing parameters T1, T2 are set in accordance therewith. However, the signal level of the luminance component Y separated from the first component U or the signal level of a signal obtained by interpolating the G component, which most closely reflects the luminance component Y, may be used instead of the signal level of each color signal of the first component U.

Furthermore, here, the tone conversion coefficient is calculated on the basis of the signal level of the luminance component Y of the first component U. However, the signal level of a signal obtained by interpolating the G component, which most closely reflects the luminance component Y, may be used instead of the signal level of the luminance component Y of the first component U.

Here, a YCbCr color space is used as the color space, but this invention is not limited thereto, and any other color space capable of defining a luminance signal, such as a CIE Lab color space or an HSL color space, may be used instead.

For example, when a CIE Lab color space is used, the luminance signal is defined by a lightness index L, and when an HSL color space is used, the luminance signal is defined using a luminance L.

Further, similarly to the first embodiment, second tone conversion processing, which is different to the tone conversion processing performed on the first component U, may be performed on the second component V or the corrected second component V'. By performing tone conversion processing on the second component V or corrected second component V' also, a more natural image is obtained.

[Tenth Embodiment]

Figure 40:
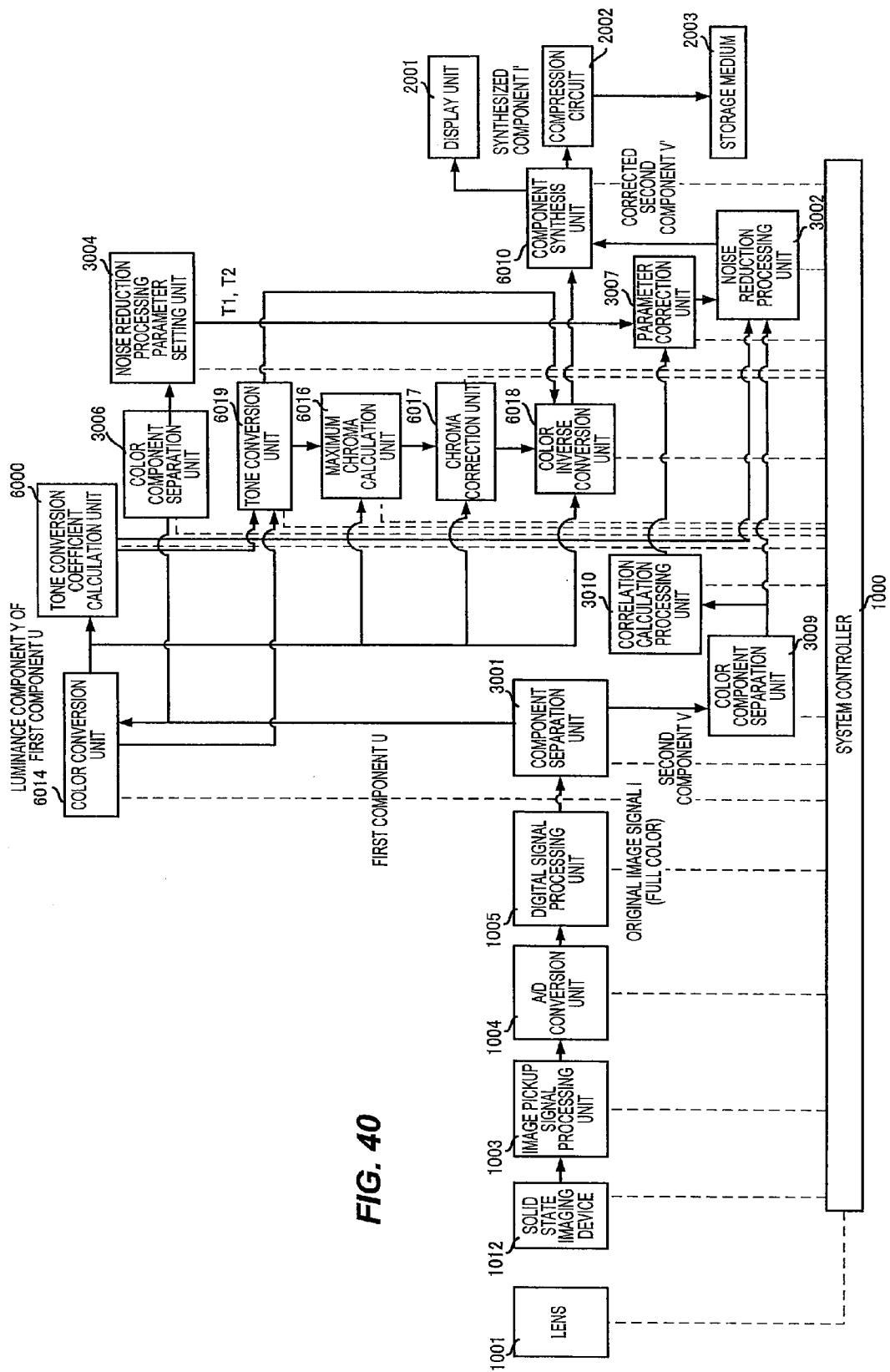
FIG. 40 is a system diagram showing an imaging apparatus according to a tenth embodiment.

FIG. 40 is a system diagram showing an imaging apparatus according to a tenth embodiment.

Identical reference symbols have been allocated to constitutions that are identical to the constitutions of the preceding embodiments, and description thereof has been omitted.

In the tenth embodiment, correction of the noise reduction processing parameters T1, T2 in accordance with the correlation between the color components and soft-thresholding processing are performed in an identical manner to the fifth embodiment, but in contrast to the fifth embodiment, tone conversion is performed on the luminance signal Y of the first component U.

The component separation unit 3001 is connected to the color conversion unit 6014, the color component separation unit 3006, and the color component separation unit 3009. The color conversion unit 6014 is connected to the tone conversion coefficient calculation unit 6000, the tone conversion unit 6019, the maximum chroma calculation unit 6016, the chroma correction unit 6017, and the color inverse conversion unit 6018. The tone conversion unit 6019 is connected to the maximum chroma calculation unit 6016 and the color inverse conversion unit 6018. The maximum chroma calculation unit 6016 is connected to the chroma correction unit 6017. The chroma correction unit 6017 is connected to the color inverse conversion unit 6018. The color inverse conversion unit 6018 and the noise reduction processing unit 3002 are connected to the component synthesis unit 6010. The component synthesis unit 6010 is connected to the display unit 2001 and the compression circuit 2002.

Next, a signal flow of the imaging apparatus shown in FIG. 40 will be described.

In the component separation unit 3001, the first component U separated from the original image signal I is transmitted to the color conversion unit 6014, the color component separation unit 3006, and the color component separation unit 3009.

The color conversion unit 6014 converts the first component U into a signal of a predetermined color space.

In this embodiment, a YCbCr color space is used as the color space, and conversion from an RGB signal to the YCbCr color space is performed on the basis of Equation (22). Further, the color conversion unit 6014 calculates the luminance signal V, the hue signal H, and the chroma signal C in the YCbCr color space on the basis of Equation (25).

As shown in Equation (25), the luminance signal V is equivalent to Y of the YCbCR color space, and therefore the luminance signal will be indicated by Y hereafter. The separated luminance signal, hue signal, and chroma signal are set as U_Yorg, U_Horg and U_Corg, respectively.

The luminance signal U_Yorg is transmitted to the tone conversion coefficient calculation unit 6000, the tone conversion unit 6019, and the color inverse conversion unit 6018. The hue signal U_Horg is transmitted to the maximum chroma calculation unit 6016 and the color inverse conversion unit 6018. The chroma signal U_Corg is transmitted to the maximum chroma calculation unit 6016 and the chroma correction unit 6017.

The tone conversion coefficient calculation unit 6000 extracts a local region of a predetermined size centering on a target pixel from the first component U_Yorg of the luminance signal and calculates a histogram in the local region on the basis of a signal level. The tone conversion coefficient calculation unit 6000 then sets a tone curve on the basis of the calculated histogram, calculates a tone conversion coefficient to be applied to each pixel during tone conversion processing based on the conversion curve, and transmits the calculated tone conversion coefficient to the tone conversion unit 6019 and the noise reduction processing unit 3002.

The tone conversion unit 6019 performs tone conversion processing on the luminance signal U_Yorg of the first component by multiplying the luminance signal U_Yorg by the tone conversion coefficient calculated by the tone conversion coefficient calculation unit 6000. A tone conversion-processed luminance signal U_Ytra is transmitted to the maximum chroma calculation unit 6016 and the color inverse conversion unit 6018.

The maximum chroma calculation unit 6016 calculates the first maximum chroma value maxCorg of the chroma signal relative to the luminance signal U_Yorg and the hue signal U_Horg of the first component, and the second maximum chroma value maxCtra of the chroma signal relative to the tone-converted luminance signal U_Ytra and the hue signal U_Horg.

The first maximum chroma value maxCorg and second maximum chroma value maxCtra calculated by the maximum chroma calculation unit 6016 are transmitted to the chroma correction unit 6017. The chroma correction unit 6017 calculates the correction coefficient Kc for the chroma signal U_Corg using the first maximum chroma value max-Corg and second maximum chroma value maxCtra, as shown in Equation (26).

The chroma correction unit 6017 then calculates a corrected chroma signal U_Ctra by multiplying the calculated correction coefficient Kc by the chroma signal U_Corg transmitted from the color conversion unit 6014. Further, an upper limit is applied to the corrected chroma signal U_Ctra to ensure that it does not exceed the second maximum chroma value maxCtra, whereupon the corrected chroma signal U_Ctra is transmitted to the color inverse conversion unit 6018.

The color inverse conversion unit 6018 calculates a YCbCr signal on the basis of U_Horg from the color conversion unit 6014, U_Ytra from the tone conversion unit 6019, and U_Ctra from the chroma correction unit 6017 using Equation (27).

Further, the color inverse conversion unit 6018 converts the YCbCr signal into an RGB signal using Equation (24), and then transmits the RGB signal to the component synthesis unit 6010.

The color component separation unit 3006 obtains the signal level of each color component. The noise reduction processing parameter setting unit 3004 obtains the noise distribution σ of each color component on the basis of the signal level of each color component by referring to a noise level-noise distribution model, similarly to the fifth embodiment. The noise reduction processing parameters T1, T2 of each color component are then set at values corresponding to the noise distribution σ of the corresponding color component, for example values commensurate with the noise distribution σ.

The second component V separated from the original image signal I is separated into its respective color components by the color component separation unit 3009 and then transmitted to the correlation calculation processing unit 3010. The correlation calculation processing unit 3010 calculates the minimum correlation coefficient r by performing correlation calculation processing on each color signal of the second component V in a similar manner to the fifth embodiment.

The parameter correction unit 3007 calculates the correction coefficient Ct of the noise reduction processing parameters T1, T2 on the basis of the minimum correlation coefficient r, and multiplies the calculated correction coefficient Ct by the noise reduction processing parameters T1, T2 of each color component to correct the noise reduction processing parameters T1, T2 of each color component.

The noise reduction processing unit 3002 performs soft-thresholding processing using the corrected noise reduction processing parameters T1, T2 and the tone conversion coefficient individually on each color component of the second component V transmitted from the color component separation unit 3009 to reduce the noise included in each color component. The noise reduction processing unit 3002 then outputs an obtained signal to the component synthesis unit 6010 as the corrected second component V'.

The component synthesis unit 6010 synthesizes the tone-converted first component U with the corrected second component V' at a predetermined ratio, for example 1:1, to obtain the synthesized component I' subjected to noise reduction and tone conversion processing relative to the original image signal I.

Figure 41:
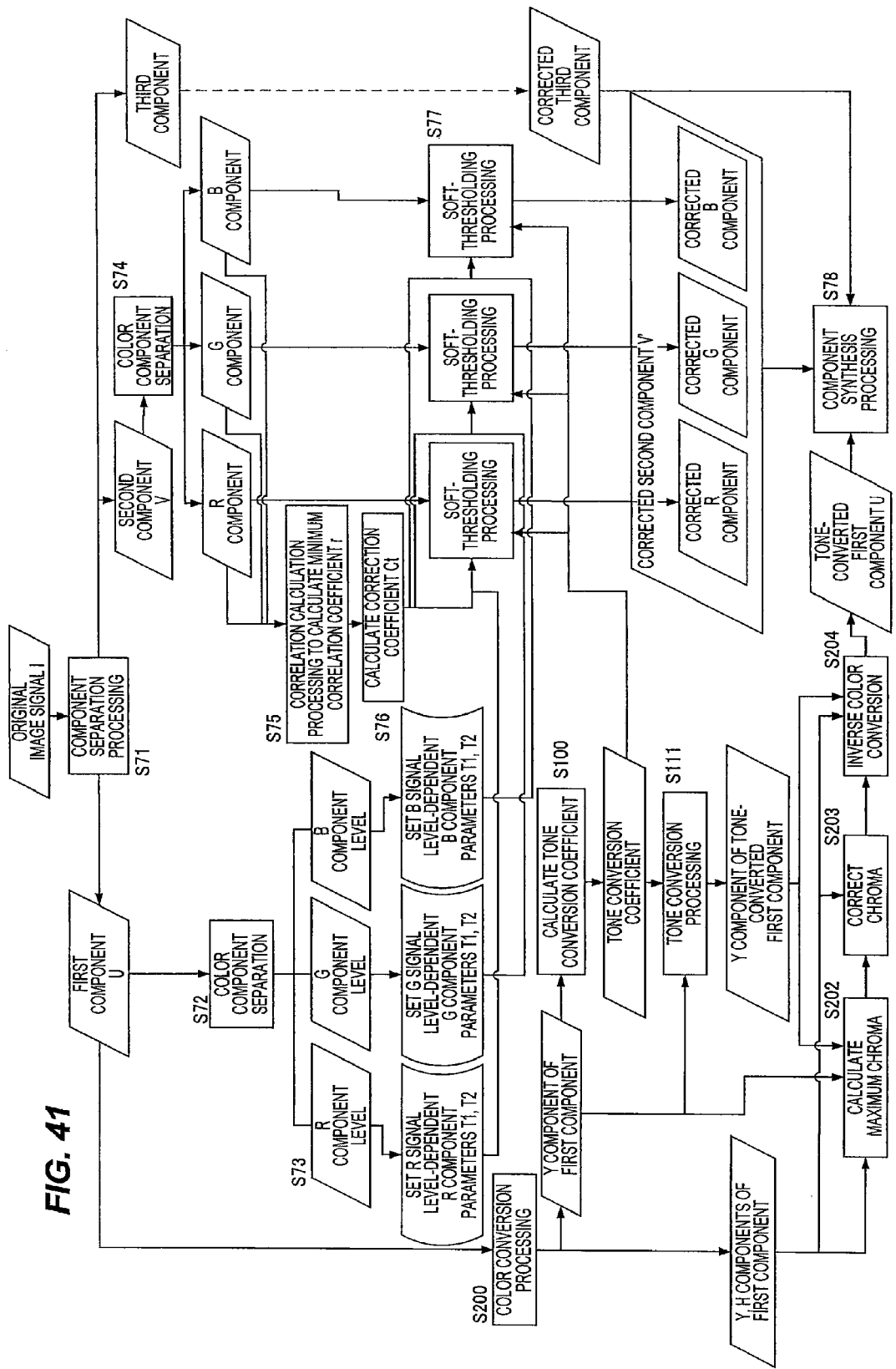
FIG. 41 is a flowchart corresponding to processing performed from a component separation unit to a component synthesis unit according to the tenth embodiment.

FIG. 41 shows a flow executed when the processing from the component separation unit 3001 to the component synthesis unit 6010 is realized by software processing. A software program is stored on a computer-readable storage medium or in a ROM of a computer, and the stored program is read to a RAM and executed by a CPU of the computer. For reference, processing performed in a case where the original image signal I is separated into three components is indicated in FIG. 41 by broken lines, but here, a case in which the original image signal I is separated into two components will be described.

In the step S71, the original image signal I is separated into the first component U and the second component V.

In the step S72, the first component U is separated into its respective color components, and the signal level of each color component is obtained.

In the step S73, the noise distribution σ is obtained on the basis of the signal level of each color component by referring to the signal level-noise distribution model shown in FIG. 3 or approximation data thereof. The noise reduction processing parameters T1, T2 are then set in relation to each color component in accordance with the noise distribution σ.

In the step S74, the second component V is separated into its respective color components.

In the step S75, the correlation between the respective color components of the second component V is calculated, whereupon the minimum correlation coefficient r is calculated.

In the step S76, the correction coefficient Ct of the noise reduction processing parameters T1, T2 of each color signal obtained in the step S73 is calculated on the basis of the minimum correlation coefficient r.

In the step S200, the first component U is separated into the luminance signal U_Yorg, the hue signal U_Horg, and the chroma signal U_Corg.

In the step S100, a local region of a predetermined size centering on a target pixel is extracted from the luminance signal U_Yorg of the first component U, and a histogram is calculated in the local region on the basis of a signal level. A tone curve is then set on the basis of the calculated histogram, whereupon a tone conversion coefficient to be applied to each pixel during tone conversion processing based on the conversion curve is calculated.

In the step S77, the noise reduction processing parameters T1, T2 are corrected by multiplying the correction coefficient Ct by the noise reduction processing parameters T1, T2. The corrected second component V' is then obtained by performing soft-thresholding processing using the corrected noise reduction processing parameters T1, T2 on each color component of the second component V.

In the step S111, tone conversion processing is performed by multiplying the tone conversion coefficient by the luminance signal U_Yorg of the first component U.

In the step S202, the maximum chroma value is calculated on the basis of the pre- and post-tone conversion luminance signal Y and the hue signal H.

In the step S203, the chroma signal U_Corg is corrected on the basis of the maximum chroma value calculated in S202, whereby the luminance signal U_Ctra is generated.

In the step S204, an RGB signal is generated from the luminance signal U_Ytra, the hue signal U_Horg, and the chroma signal U_Ctra on the basis of Equation (24).

In the step S78, the tone-converted first component U and the corrected second component V' are synthesized to obtain the synthesized component I' relating to the original image signal I.

According to the tenth embodiment, the luminance signal of the first component U is processed independently of the chroma signal and so on, and therefore picture forming processing and correction processing can be performed such that no artificiality occurs in the color signals. Furthermore, by processing the luminance signal alone, color noise amplification caused by the tone conversion processing can be suppressed in relation to color noise that is mistakenly separated into the first component U in cases where it is difficult to distinguish the color noise from an edge structure, such as color noise formed on a cluster, and as a result, high-quality noise reduction processing can be realized.

Either addition type separation or multiplication type separation may be used as the component separation method. Moreover, the noise reduction processing executed on the second component V is not limited to soft-thresholding processing, and any signal level-dependent signal processing method may be applied.

Furthermore, here, the noise distribution σ is obtained on the basis of the signal level of each color component of the first component U, and the noise reduction processing parameters T1, T2 are set in accordance therewith. However, the signal level of the luminance component Y separated from the first component U or the signal level of a signal obtained by interpolating the G component, which most closely reflects the luminance component Y, may be used instead of the signal level of each color signal of the first component U.

Further, here, the tone conversion coefficient is calculated on the basis of the signal level of the luminance component Y of the first component U, but the signal level of a signal obtained by interpolating the G component, which most closely reflects the luminance component Y, may be used instead of the signal level of the luminance component Y of the first component U.

Furthermore, here, a YCbCr color space is used as the color space, but this invention is not limited thereto, and any other color space capable of defining a luminance signal, a chroma signal, and a hue signal, such as a CIE Lab color space or an HSL color space, may be used instead.

For example, when a CIE Lab color space is used, the luminance signal V is defined by a lightness index L while the hue signal H and chroma signal C are defined using perceived colors a, b, as shown in Equation (32).

When an HSL color space is used, the luminance signal V is defined using a luminance L, the hue signal H is defined using a hue H, and the chroma signal C is defined using a chroma S.

Further, similarly to the first embodiment, second tone conversion processing, which is different to the tone conversion processing performed on the first component U, may be performed on the second component V or the corrected second component V'. By performing tone conversion processing on the second component V or corrected second component V' also, a more natural image is obtained.

Embodiments of this invention were described above, but the above embodiments merely illustrate examples of application of this invention, and the technical scope of this invention is not limited to the specific constitutions of the above embodiments.

What is claimed is:

1. An image processing device comprising:
   a component separation unit which separates an original image signal into a plurality of components including a first component and a second component obtained after the first component is separated from the original image signal, wherein the first component is a skeleton component of the original image signal and contains a gently varying component and an edge component, and wherein the second component is a residual component obtained after the first component is separated from the original image signal and contains texture components and noise;
   a tone conversion signal level acquisition unit which obtains a signal level of one of the first component and the original image signal;
   a tone conversion coefficient setting unit which sets a tone conversion coefficient to be applied during tone conversion based on the signal level of the one of the first component and the original image signal obtained by the tone conversion signal level acquisition unit, and not based on a signal level of the second component;
   a tone conversion unit which performs tone conversion processing on the first component using the tone conversion coefficient;
   a noise reduction signal level acquisition unit which obtains the signal level of the first component;
   a parameter setting unit which obtains a noise distribution corresponding to the signal level of the first component, and sets a noise reduction processing parameter corresponding to the obtained noise distribution; and
   a noise reduction processing unit which reduces a noise of the second component using the noise reduction processing parameter and the tone conversion coefficient.

2. The image processing device as defined in claim 1, wherein the noise reduction processing unit reduces the noise of the second component based on a comparison result between a threshold set in accordance with the noise reduction processing parameter and the second component, and the tone conversion coefficient.

3. The image processing device as defined in claim 1, wherein the noise reduction processing unit reduces the noise of the second component based on the noise reduction processing parameter and a comparison result between a threshold set in accordance with the tone conversion coefficient and the second component.

4. The image processing device as defined in claim 1, wherein the original image signal is monochrome, and the first component and the second component are both luminance components.

5. The image processing device as defined in claim 1, wherein:
   the original image signal comprises a plurality of color components,
   the noise reduction signal level acquisition unit obtains a signal level of each color component of the first component,
   the parameter setting unit obtains a respective noise distribution corresponding to the signal level of each color component of the first component, and sets a noise reduction processing parameter corresponding to each color component of the second component corresponding to the respective noise distribution of each color component of the first component, and
   the noise reduction processing unit reduces a noise of each color component of the second component using the noise reduction processing parameter of the corresponding color component.

6. The image processing device as defined in claim 1, wherein:
   the original image signal comprises a plurality of color components,
   the noise reduction signal level acquisition unit obtains one of (i) a signal level of a luminance component of the first component and (ii) a signal level of a signal obtained by interpolating a G component, the parameter setting unit obtains a noise distribution corresponding to the signal level obtained by the noise reduction signal level acquisition unit, and sets a noise reduction processing parameter corresponding to each color component of the second component corresponding to the obtained noise distribution, and the noise reduction processing unit reduces a noise of each color component of the second component using the noise reduction processing parameter of the corresponding color component.

7. The image processing device as defined in claim 1, wherein:

the original image signal comprises a plurality of color components, the image processing device further comprises a color space conversion unit which converts each color component of the first component into a signal of a color space comprising a luminance signal and a color signal, the tone conversion signal level acquisition unit obtains a signal level of the luminance signal of the first component, the tone conversion coefficient calculation unit sets the tone conversion coefficient based on the signal level of the luminance signal of the first component, the tone conversion unit performs tone conversion on the luminance signal of the first component based on the tone conversion coefficient, the noise reduction signal level acquisition unit obtains the signal level of the luminance signal of the first component, the parameter setting unit obtains a noise distribution corresponding to the signal level of the luminance signal of the first component, and sets a noise reduction processing parameter corresponding to each color component of the second component corresponding to the obtained noise distribution, and the noise reduction processing unit reduces a noise of each color component of the second component using the noise reduction processing parameter of the corresponding color component.

8. The image processing device as defined in claim 1, wherein:

the original image signal comprises a plurality of color components, the image processing device further comprises a color space conversion unit which converts each color component of the first component into a signal of a color space comprising a luminance signal and a color signal, the component separation unit separates the luminance signal and the color signal into a first component and a second component of the luminance signal and a first component and a second component of the color signal, the tone conversion signal level acquisition unit obtains a signal level of the first component of the luminance signal, the tone conversion coefficient calculation unit sets the tone conversion coefficient based on the signal level of the first component of the luminance signal, the tone conversion unit performs tone conversion on the first component of the luminance signal based on the tone conversion coefficient, the noise reduction signal level acquisition unit obtains the signal level of the first component of the luminance signal, the parameter setting unit obtains a noise distribution corresponding to the signal level of the first component of the luminance signal, and sets a noise reduction processing parameter corresponding to the second component of the luminance signal and the second component of the color signal corresponding to the obtained noise distribution, and the noise reduction processing unit reduces a noise of the second component of the luminance signal and the second component of the color signal using the corresponding noise reduction processing parameter.

9. The image processing device as defined in claim 5, further comprising:

a correlation calculation processing unit which calculates an inter-color component correlation coefficient in a neighborhood region including a target pixel in relation to the second component; and a parameter correction unit which corrects the noise reduction processing parameter based on the correlation coefficient.

10. The image processing device as defined in claim 9, wherein the parameter correction unit calculates a correction coefficient having a negative correlation to the inter-color component correlation coefficient in the neighborhood region including the target pixel, and corrects the noise reduction processing parameter by multiplying the noise reduction processing parameter by the correction coefficient.

11. The image processing device as defined in claim 10, wherein the parameter correction unit calculates the correction coefficient using a following equation:

$$C=(1-r)^2,$$

where r is the inter-color component correlation coefficient in the neighborhood region including the target pixel.

12. The image processing device as defined in claim 9, wherein the correlation calculation processing unit selects a minimum value from a plurality of inter-color component correlation coefficients as the correlation coefficient.

13. The image processing device as defined in claim 6, further comprising:

a correlation calculation processing unit which calculates an inter-color component correlation coefficient in a neighborhood region including a target pixel in relation to the second component; and a parameter correction unit which corrects the noise reduction processing parameter on the basis of the correlation coefficient.

14. The image processing device as defined in claim 13, wherein the parameter correction unit calculates a correction coefficient having a negative correlation to the inter-color component correlation coefficient in the neighborhood region including the target pixel, and corrects the noise reduction processing parameter by multiplying the noise reduction processing parameter by the correction coefficient.

15. The image processing device as defined in claim 14, wherein the parameter correction unit calculates the correction coefficient using a following equation:

$$C=(1-r)^2,$$

where r is the inter-color component correlation coefficient in the neighborhood region including the target pixel.

16. The image processing device as defined in claim 13, wherein the correlation calculation processing unit selects a minimum value from a plurality of inter-color component correlation coefficients as the correlation coefficient.

17. The image processing device as defined in claim 7, further comprising:

a correlation calculation processing unit which calculates an inter-color component correlation coefficient in a neighborhood region including a target pixel in relation to the second component; and a parameter correction unit which corrects the noise reduction processing parameter on the basis of the correlation coefficient.

18. The image processing device as defined in claim 17, wherein the parameter correction unit calculates a correction coefficient having a negative correlation to the inter-color component correlation coefficient in the neighborhood region including the target pixel, and corrects the noise reduction processing parameter by multiplying the noise reduction processing parameter by the correction coefficient.

19. The image processing device as defined in claim 18, wherein the parameter correction unit calculates the correction coefficient using a following equation:

$$C = (1-r)^2,$$

where r is the inter-color component correlation coefficient in the neighborhood region including the target pixel.

20. The image processing device as defined in claim 17, wherein the correlation calculation processing unit selects a minimum value from a plurality of inter-color component correlation coefficients as the correlation coefficient.

21. The image processing device as defined in claim 1, further comprising a second tone conversion unit which performs second tone conversion processing, which is different than the tone conversion processing performed by the tone conversion unit, on the second component following the noise reduction processing.

22. The image processing device as defined in claim 1, wherein the tone conversion coefficient setting unit comprises:
a histogram calculation unit which calculates a histogram in each of a plurality of neighborhood regions including a target pixel in relation to one of the original image signal and the first component;
a tone curve setting unit which sets a tone curve based on the histogram; and
a tone conversion coefficient calculation unit which calculates the tone conversion coefficient based on the tone curve.

23. The image processing device as defined in claim 1, wherein the tone conversion coefficient setting unit comprises:
a division unit which divides one of the original image signal and the first component into at least one region;
a histogram calculation unit which calculates a histogram in the at least one region in relation to one of the original image signal and the first component;
a tone curve setting unit which sets a tone curve in the at least one region based on the histogram; and
a tone conversion coefficient calculation unit which calculates the tone conversion coefficient for the at least one region based on the tone curve.

24. The image processing device as defined in claim 1, wherein the tone conversion coefficient setting unit comprises:
a tone curve setting unit which sets a predetermined tone curve in each pixel of one of the original image signal and the first component; and
a tone conversion coefficient calculation unit which calculates the tone conversion coefficient for each pixel based on the tone curve.

25. The image processing device as defined in claim 1, wherein the tone conversion coefficient setting unit comprises:
a division unit which divides one of the original image signal and the first component into at least one region;
a tone curve setting unit which sets a predetermined tone curve in the at least one region; and
a tone conversion coefficient calculation unit which calculates the tone conversion coefficient for the at least one region based on the tone curve.

26. The image processing device as defined in claim 1, wherein the tone conversion unit comprises a multiplication unit which multiplies a tone conversion coefficient by one of (i) each pixel and (ii) each region of the first component.

27. The image processing device as defined in claim 1, further comprising a synthesis unit which synthesizes the first component following the tone conversion processing with the second component following the noise reduction processing.

28. The image processing device as defined in claim 7, wherein the color space conversion unit uses one of a YCbCr color space, a CIE Lab color space, and an HSL color space as the color space.

29. The image processing device as defined in claim 8, wherein the color space conversion unit uses one of a YCbCr color space, a CIE Lab color space, and an HSL color space as the color space.

30. An image processing method comprising:
separating an original image signal into a plurality of components including a first component and a second component obtained after the first component is separated from the original image signal, wherein the first component is a skeleton component of the original image signal and contains a gently varying component and an edge component, and wherein the second component is a residual component obtained after the first component is separated from the original image signal and contains texture components and noise;
obtaining a signal level of one of the first component and the original image signal;
setting a tone conversion coefficient to be applied during tone conversion based on the obtained signal level of the one of the first component and the original image signal, and not based on a signal level of the second component;
performing tone conversion processing on the first component using the tone conversion coefficient;
obtaining the signal level of the first component;
obtaining a noise distribution corresponding to the signal level of the first component, and setting a noise reduction processing parameter corresponding to the obtained noise distribution; and
reducing a noise of the second component using the noise reduction processing parameter and the tone conversion coefficient.

31. A computer-readable storage device storing an image processing program thereon, the image processing program being adapted to control a computer to perform functions comprising:
separating an original image signal into a plurality of components including a first component and a second component obtained after the first component is separated from the original image signal, wherein the first component is a skeleton component of the original image signal and contains a gently varying component and an edge component, and wherein the second component is a residual component obtained after the first component is separated from the original image signal and contains texture components and noise;
obtaining a signal level of one of the first component and the original image signal;

setting a tone conversion coefficient to be applied during tone conversion based on the obtained signal level of the one of the first component and the original image signal, and not based on a signal level of the second component;

performing tone conversion processing on the first component using the tone conversion coefficient;

obtaining the signal level of the first component;

obtaining a noise distribution corresponding to the signal level of the first component, and setting a noise reduction processing parameter corresponding to the obtained noise distribution; and reducing a noise of the second component using the noise reduction processing parameter and the tone conversion coefficient.

\* \* \* \* \*